US012699493B2

(12) United States Patent
Kim et al.

(10) Patent No.: US 12,699,493 B2
(45) Date of Patent: Aug. 4, 2026

(54) ELECTRONIC DEVICE

(71) Applicant: Samsung Display Co., Ltd., Yongin-si (KR)

(72) Inventors: Hyungbae Kim, Yongin-si (KR); Young-Seok Seo, Yongin-si (KR); Sanghyun Lim, Yongin-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 0 days.

(21) Appl. No.: 19/248,104

(22) Filed: Jun. 24, 2025

(65) Prior Publication Data

US 2026/0029887 A1 Jan. 29, 2026

(30) Foreign Application Priority Data

Jul. 24, 2024 (KR) ........................ 10-2024-0097775

(51) Int. Cl.
| | |
|---|---|
| *G06F 3/044* | (2006.01) |
| *G06F 3/041* | (2006.01) |
| G06F 3/0354 | (2013.01) |
| H04M 1/02 | (2006.01) |

(52) U.S. Cl.
CPC ........ *G06F 3/0446* (2019.05); *G06F 3/04164* (2019.05); *G06F 3/04166* (2019.05); *G06F 3/03545* (2013.01); *G06F 2203/04106* (2013.01); *G06F 2203/04111* (2013.01); *H04M 1/0268* (2013.01)

(58) Field of Classification Search
CPC .............. G06F 3/0446; G06F 3/04166; G06F 3/04164; G06F 3/03545; G06F 2203/04106; G06F 2203/04111; H04M 1/0268
See application file for complete search history.

(56) References Cited

U.S. PATENT DOCUMENTS

| | | | |
|---|---|---|---|
| 8,674,967 B2 | 3/2014 | Fukushima et al. | |
| 2022/0019331 A1* | 1/2022 | Park ........................ | G06F 3/044 |
| 2023/0409142 A1 | 12/2023 | Lim | |

FOREIGN PATENT DOCUMENTS

KR 10-2023-0172643 A 12/2023

* cited by examiner

*Primary Examiner* — Michael A Faragalla
(74) *Attorney, Agent, or Firm* — Womble Bond Dickinson (US) LLP

(57) ABSTRACT

An electronic device includes: a sensor layer; and a sensor driving circuit. The sensor layer includes: third electrodes; a loop trace line electrically connected to the third electrodes; and charging pads. The sensor driving circuit is to output a first signal to "X" first charging drive pads among the charging pads, output a second signal different from the first signal to "Y" second charging drive pads among the charging pads, and sequentially form charging loops one by one on the sensor layer, where "X" and "Y" are integers greater than or equal to 1. The sensor driving circuit is to not output a signal to "Z" gap pads between the "X" first charging drive pads and the "Y" second charging drive pads among the charging pads, where "Z" is an integer greater than or equal to 1, and at least one of "X," "Y," or "Z" is a variable value.

20 Claims, 28 Drawing Sheets

| | 232tP | 230P1 | 230P2 | 230P3 | 230P4 | 230P5 | 230P6 | 230P7 | 230P8 | 230P9 | 233tP |
|---|---|---|---|---|---|---|---|---|---|---|---|
| t1 | SG2 | X | X | SG1 | SG1 | X | X | X | X | X | X |
| t2 | SG2 | SG2 | X | X | SG1 | SG1 | X | X | X | X | X |
| t3 | X | SG2 | SG2 | X | X | SG1 | SG1 | X | X | X | X |
| t4 | X | X | SG2 | SG2 | X | X | SG1 | SG1 | X | X | X |
| t5 | X | X | X | SG2 | SG2 | X | X | SG1 | SG1 | X | X |
| t6 | X | X | X | X | SG2 | SG2 | X | X | SG1 | SG1 | X |
| t7 | X | X | X | X | X | SG2 | SG2 | X | X | SG1 | SG1 |
| t8 | X | X | X | X | X | X | SG2 | SG2 | X | X | SG1 |

FIG. 16B

|  | 232tP | 230P1 | 230P2 | 230P3 | 230P4 | 230P5 | 230P6 | 230P7 | 230P8 | 230P9 | 233tP |
|---|---|---|---|---|---|---|---|---|---|---|---|
| t1 | SG2 | X | X | SG1 | SG1 | X | X | X | X | X | X |
| t2 | X | SG2 | SG2 | X | SG1 | SG1 | X | X | X | X | X |
| t3 | X | X | SG2 | SG2 | X | SG1 | SG1 | X | X | X | X |
| t4 | X | X | X | SG2 | SG2 | X | SG1 | SG1 | X | X | X |
| t5 | X | X | X | X | SG2 | SG2 | X | SG1 | SG1 | X | X |
| t6 | X | X | X | X | X | SG2 | SG2 | X | SG1 | SG1 | X |
| t7 | X | X | X | X | X | X | SG2 | SG2 | X | X | SG1 |

ELECTRONIC DEVICE

CROSS-REFERENCE TO RELATED APPLICATION

The present application claims priority to and the benefit of Korean Patent Application No. 10-2024-0097775, filed on Jul. 24, 2024, in the Korean Intellectual Property Office, the entire disclosure of which is incorporated by reference herein.

BACKGROUND

Aspects of embodiments of the present disclosure relate to an electronic device that may sense an input by a pen.

Multimedia electronic devices, such as a television (TV), a mobile phone, a tablet computer, a laptop, a navigation system, and a game console, include a display device for displaying an image. In addition to a general input method, such as a button, a keyboard, and a mouse, electronic devices may include a sensor layer (e.g., an input sensor) capable of providing a touch-based input method that allows a user to input information or commands more easily and intuitively. The sensor layer may sense a touch or pressure by the user. As such, a demand for the use of a pen for a more detailed touch input for users accustomed to inputting information using a writing instrument or a specific application (e.g., an application for sketching or drawing) is increasing.

The above information disclosed in this Background section is for enhancement of understanding of the background of the present disclosure, and therefore, it may contain information that does not constitute prior art.

SUMMARY

Embodiments of the present disclosure may be directed to an electronic device that may sense an input by a pen.

According to one or more embodiments of the present disclosure, an electronic device includes: a sensor layer; and a sensor driving circuit configured to drive the sensor layer, and selectively operate in a first mode for sensing a touch input and a second mode for sensing a pen input by a pen, the second mode including a charging drive mode and a pen sensing drive mode. The sensor layer includes: a plurality of first electrodes along a first direction; a plurality of second electrodes along a second direction crossing the first direction; a plurality of third electrodes along the first direction, and overlapping with the plurality of first electrodes; a loop trace line electrically connected to the plurality of third electrodes, and including a first line portion electrically connected to the plurality of third electrodes, a second line portion extending from a first end of the first line portion in the second direction, and a third line portion extending from a second end of the first line portion in the second direction; and a plurality of charging pads electrically connected to the second line portion, the plurality of third electrodes, and the third line portion. In the charging drive mode, the sensor driving circuit is configured to output a first signal to "X" first charging drive pads among the plurality of charging pads, output a second signal different from the first signal to "Y" second charging drive pads among the plurality of charging pads, and sequentially form a plurality of charging loops one by one on the sensor layer, where "X" and "Y" are integers greater than or equal to 1. In the charging drive mode, the sensor driving circuit is configured to not output a signal to "Z" gap pads between the "X" first charging drive pads and the "Y" second charging drive pads among the plurality of charging pads, where "Z" is an integer greater than or equal to 1, and at least one of "X," "Y," or "Z" is a variable value.

In an embodiment, the plurality of charging loops may include a first charging loop, and a second charging loop shifted in the first direction with respect to the first charging loop. A number of the "Y" second charging drive pads of the second charging loop may be greater than a number of the "Y" second charging drive pads of the first charging loop.

In an embodiment, the number of the "Y" second charging drive pads of the first charging loop may be one, and the "Y" second charging drive pads may be electrically connected to the second line portion.

In an embodiment, a number of the "Z" gap pads of the second charging loop may be smaller than a number of the "Z" gap pads of the first charging loop.

In an embodiment, the charging drive mode may include a first drive mode, and a second drive mode having a higher sensitivity than that of the first drive mode. The plurality of charging loops may include a first charging loop, and a second charging loop shifted in the first direction with respect to the first charging loop.

In an embodiment, a number of the "X" first charging drive pads of the first charging loop in the second drive mode may be greater than a number of the "X" first charging drive pads of the first charging loop in the first drive mode.

In an embodiment, a number of the "X" first charging drive pads of the second charging loop in the second drive mode may be greater than a number of the "X" first charging drive pads of the second charging loop in the first drive mode. A number of the "Y" second charging drive pads of the second charging loop in the second drive mode may be greater than a number of the "Y" second charging drive pads of the second charging loop in the first drive mode.

In an embodiment, a number of the "Z" gap pads of the first charging loop in the second drive mode may be greater than a number of the "Z" gap pads of the first charging loop in the first drive mode. A number of the "Z" gap pads of the second charging loop in the second drive mode may be greater than a number of the "Z" gap pads of the second charging loop in the first drive mode.

In an embodiment, a number of the "Z" gap pads of the first charging loop in the second drive mode may be smaller than a number of the "Z" gap pads of the first charging loop in the first drive mode. A number of the "Z" gap pads of the second charging loop in the second drive mode may be smaller than a number of the "Z" gap pads of the second charging loop in the first drive mode.

In an embodiment, the sensor driving circuit may be configured to operate in the second drive mode when the pen is not sensed.

In an embodiment, the sensor driving circuit may be configured to operate in the second drive mode when the pen is located within a distance section on the sensor layer for a period of time.

In an embodiment, the sensor driving circuit may be configured to operate in the first drive mode when determined that the pen deviates from the distance section.

In an embodiment, the charging drive mode may further include a third drive mode having a higher sensitivity than that of the first drive mode and different from the second drive mode, and the sensor driving circuit may be configured to operate in the third drive mode when determined that the pen deviates from the distance section and becomes closer to the sensor layer than to the distance section.

According to one or more embodiments of the present disclosure, an electronic device includes: a sensor layer; and a sensor driving circuit configured to drive the sensor layer, and selectively operate in a first mode for sensing a touch input and a second mode for sensing a pen input by a pen, the second mode including a charging drive mode and a pen sensing drive mode. The sensor layer includes: a plurality of first electrodes; a plurality of second electrodes crossing the plurality of first electrodes; a plurality of third electrodes overlapping with the plurality of first electrodes; a first loop trace line electrically connected to all of one ends of the plurality of third electrodes; a plurality of second loop trace lines electrically connected to other ends of the plurality of third electrodes in a one-to-one correspondence; and a plurality of charging pads electrically connected to opposite ends of the first loop trace line and to the plurality of second loop trace lines in one-to-one correspondence. In the charging drive mode, the sensor driving circuit is configured to output a first signal to "X" first charging drive pads among the plurality of charging pads, output a second signal different from the first signal to "Y" second charging drive pads among the plurality of charging pads, and sequentially form a plurality of charging loops one by one on the sensor layer, where "X" and "Y" are integers greater than or equal to 1. In the charging drive mode, the sensor driving circuit is configured to not output a signal to "Z" gap pads between the "X" first charging drive pads and the "Y" second charging drive pads among the plurality of charging pads, where "Z" is an integer greater than or equal to 1. The plurality of charging loops includes a first charging loop, and a second charging loop different from the first charging loop, and at least one of "X," "Y," or "Z" is a variable value.

In an embodiment, a number of the "Y" second charging drive pads of the first charging loop may be one, a number of the "Y" second charging drive pads of the second charging loop may be greater than the number of the "Y" second charging drive pads of the first charging loop, and a number of the "Z" gap pads of the second charging loop may be smaller than a number of the "Z" gap pads of the first charging loop.

In an embodiment, the charging drive mode may include a first drive mode, and a second drive mode having a higher sensitivity than that of the first drive mode. A number of the "X" first charging drive pads of the first charging loop in the second drive mode may be greater than a number of the "X" first charging drive pads of the first charging loop in the first drive mode, a number of the "X" first charging drive pads of the second charging loop in the second drive mode may be greater than a number of the "X" first charging drive pads of the second charging loop in the first drive mode, and a number of the "Y" second charging drive pads of the second charging loop in the second drive mode may be greater than a number of the "Y" second charging drive pads of the second charging loop in the first drive mode.

In an embodiment, a number of the "Z" gap pads of the first charging loop in the second drive mode may be greater than a number of the "Z" gap pads of the first charging loop in the first drive mode, and a number of the "Z" gap pads of the second charging loop in the second drive mode may be greater than a number of the "Z" gap pads of the second charging loop in the first drive mode.

In an embodiment, a number of the "Z" gap pads of the first charging loop in the second drive mode may be smaller than a number of the "Z" gap pads of the first charging loop in the first drive mode, and a number of the "Z" gap pads of the second charging loop in the second drive mode may be smaller than a number of the "Z" gap pads of the second charging loop in the first drive mode.

In an embodiment, the sensor driving circuit may be configured to operate in the second drive mode when the pen is located within a distance section on the sensor layer for a period of time.

In an embodiment, the charging drive mode may further include a third drive mode having a higher sensitivity than that of the first drive mode and different from the second drive mode, and the sensor driving circuit may be configured to operate in the third drive mode when determined that the pen deviates from the distance section and becomes closer to the sensor layer than to the distance section.

However, the present disclosure is not limited to the above aspects and features, and the above and additional aspects and features will be set forth, in part, in the detailed description that follows with reference to the drawings, and in part, may be apparent therefrom, or may be learned by practicing one or more of the presented embodiments of the present disclosure.

BRIEF DESCRIPTION OF THE DRAWINGS

The above and other aspects and features of the present disclosure will be more clearly understood from the following detailed description of the illustrative, non-limiting embodiments with reference to the accompanying drawings.

FIG. 16A is a table representing signals provided to the sensor layer according to an embodiment of the present disclosure.

FIG. 16B is a table representing signals provided to the sensor layer according to an embodiment of the present disclosure.

DETAILED DESCRIPTION

Figure 1A:
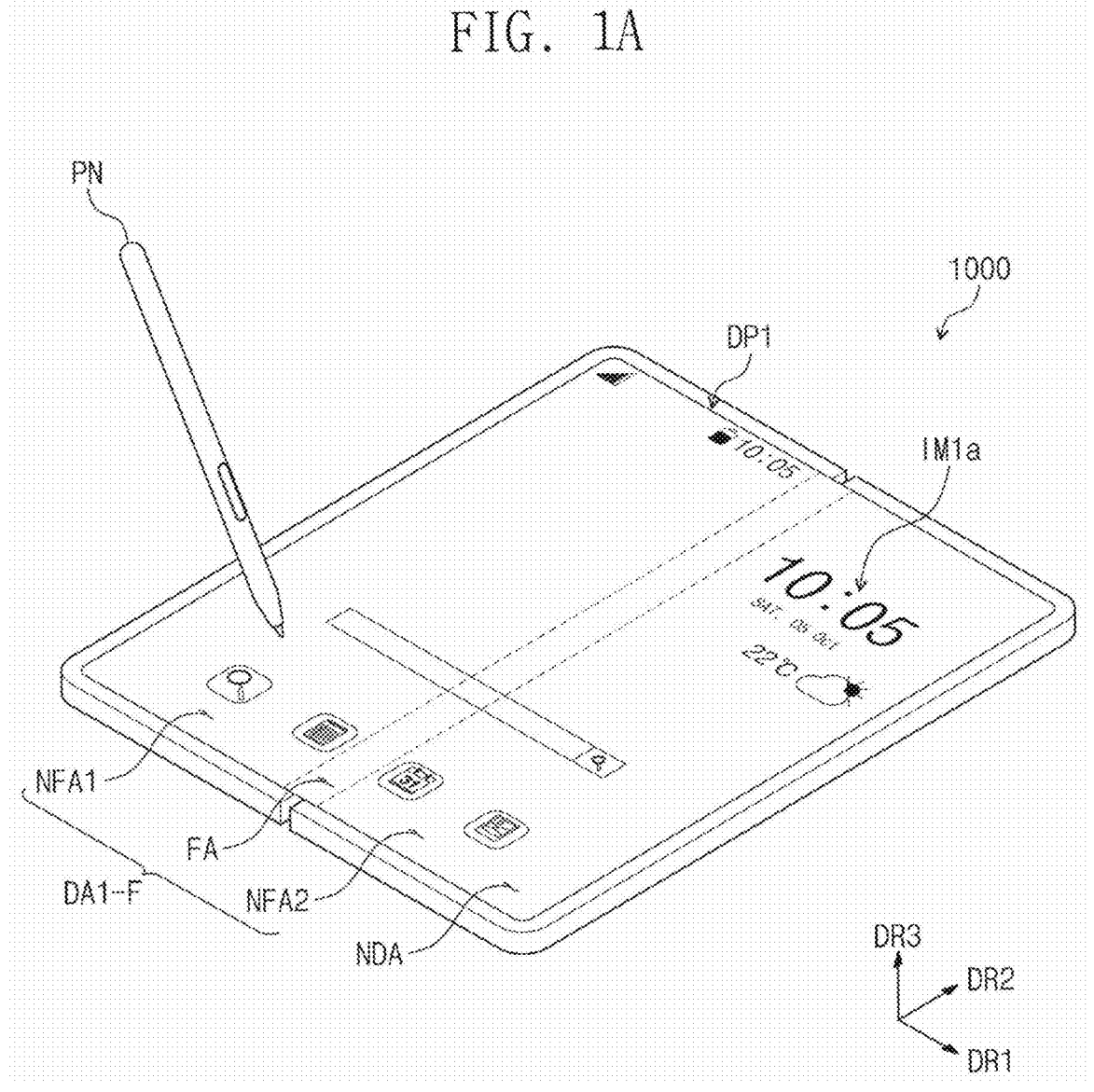
FIG. 1A is a perspective view of an electronic device according to an embodiment of the present disclosure.

Hereinafter, embodiments will be described in more detail with reference to the accompanying drawings, in which like reference numbers refer to like elements throughout. The present disclosure, however, may be embodied in various different forms, and should not be construed as being limited to only the illustrated embodiments herein. Rather, these embodiments are provided as examples so that this disclosure will be thorough and complete, and will fully convey the aspects and features of the present disclosure to those skilled in the art. Accordingly, processes, elements, and techniques that are not necessary to those having ordinary skill in the art for a complete understanding of the aspects and features of the present disclosure may not be described. Unless otherwise noted, like reference numerals denote like elements throughout the attached drawings and the written description, and thus, redundant description thereof may not be repeated.

When a certain embodiment may be implemented differently, a specific process order may be different from the described order. For example, two consecutively described processes may be performed at the same or substantially at the same time, or may be performed in an order opposite to the described order.

Further, as would be understood by a person having ordinary skill in the art, in view of the present disclosure in its entirety, each suitable feature of the various embodiments of the present disclosure may be combined or combined with each other, partially or entirely, and may be technically interlocked and operated in various suitable ways, and each embodiment may be implemented independently of each other or in conjunction with each other in any suitable manner, unless otherwise stated or implied.

In the drawings, the relative sizes, thicknesses, and ratios of elements, layers, and regions may be exaggerated and/or simplified for clarity. Spatially relative terms, such as "beneath," "below," "lower," "under," "above," "upper," and the like, may be used herein for ease of explanation to describe one element or feature's relationship to another element(s) or feature(s) as illustrated in the figures. It will be understood that the spatially relative terms are intended to encompass different orientations of the device in use or in operation, in addition to the orientation depicted in the figures. For example, if the device in the figures is turned over, elements described as "below" or "beneath" or "under" other elements or features would then be oriented "above" the other elements or features. Thus, the example terms "below" and "under" can encompass both an orientation of above and below. The device may be otherwise oriented (e.g., rotated 90 degrees or at other orientations) and the spatially relative descriptors used herein should be interpreted accordingly.

Further, it should be expected that the shapes shown in the figures may vary in practice depending, for example, on tolerances and/or manufacturing techniques. Accordingly, the embodiments of the present disclosure should not be construed as being limited to the specific shapes shown in the figures, and should be construed considering changes in shapes that may occur, for example, as a result of manufacturing. As such, the shapes shown in the drawings may not depict the actual shapes of areas of the device, and the present disclosure is not limited thereto.

In the figures, the x-axis, the y-axis, and the z-axis are not limited to three axes of the rectangular coordinate system, and may be interpreted in a broader sense. For example, the x-axis, the y-axis, and the z-axis may be perpendicular to or substantially perpendicular to one another, or may represent different directions from each other that are not perpendicular to one another.

It will be understood that, although the terms "first," "second," "third," etc., may be used herein to describe various elements, components, regions, layers and/or sections, these elements, components, regions, layers and/or sections should not be limited by these terms. These terms are used to distinguish one element, component, region, layer or section from another element, component, region, layer or section. Thus, a first element, component, region, layer or section described below could be termed a second element, component, region, layer or section, without departing from the spirit and scope of the present disclosure.

It will be understood that when an element or layer is referred to as being "on," "connected to," or "coupled to" another element or layer, it can be directly on, connected to, or coupled to the other element or layer, or one or more intervening elements or layers may be present. Similarly, when a layer, an area, or an element is referred to as being "electrically connected" to another layer, area, or element, it may be directly electrically connected to the other layer, area, or element, and/or may be indirectly electrically connected with one or more intervening layers, areas, or elements therebetween. In addition, it will also be understood that when an element or layer is referred to as being "between" two elements or layers, it can be the only element or layer between the two elements or layers, or one or more intervening elements or layers may also be present.

The terminology used herein is for the purpose of describing particular embodiments and is not intended to be limiting of the present disclosure. As used herein, the singular forms "a" and "an" are intended to include the plural forms as well, unless the context clearly indicates otherwise. It will be further understood that the terms "comprises," "comprising," "includes," "including," "has," "have," and "having," when used in this specification, specify the presence of the stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. For example, the expression "A and/or B" denotes A, B, or A and B. Expressions such as "at least one of," when preceding a list of elements, modify the entire list of elements and do not modify the individual elements of the list. For example, the expression "at least one of a, b, or c," "at least one of a, b, and c," and "at least one selected from the group consisting of a, b, and c" indicates only a, only b, only c, both a and b, both a and c, both b and c, all of a, b, and c, or variations thereof.

As used herein, the term "substantially," "about," and similar terms are used as terms of approximation and not as terms of degree, and are intended to account for the inherent variations in measured or calculated values that would be recognized by those of ordinary skill in the art. Further, the use of "may" when describing embodiments of the present disclosure refers to "one or more embodiments of the present disclosure." As used herein, the terms "use," "using," and "used" may be considered synonymous with the terms "utilize," "utilizing," and "utilized," respectively.

Terms such as "part" and "unit" may refer to a software component or a hardware component that performs a specific function. The hardware component may include, for example, a field-programmable gate array (FPGA) or an application-specific integrated circuit (ASIC). The software component may refer to an executable code and/or data used by the executable code in an addressable storage medium. Thus, the software components may be, for example, object-oriented software components, class components, and task components, and may include processes, functions, attributes, procedures, subroutines, program code segments, drivers, firmware, microcode, circuits, data, databases, data structures, tables, arrays, and/or variables.

Unless otherwise defined, all terms (including technical and scientific terms) used herein have the same meaning as commonly understood by one of ordinary skill in the art to which the present disclosure belongs. It will be further understood that terms, such as those defined in commonly used dictionaries, should be interpreted as having a meaning that is consistent with their meaning in the context of the relevant art and/or the present specification, and should not be interpreted in an idealized or overly formal sense, unless expressly so defined herein.

Figure 1B:
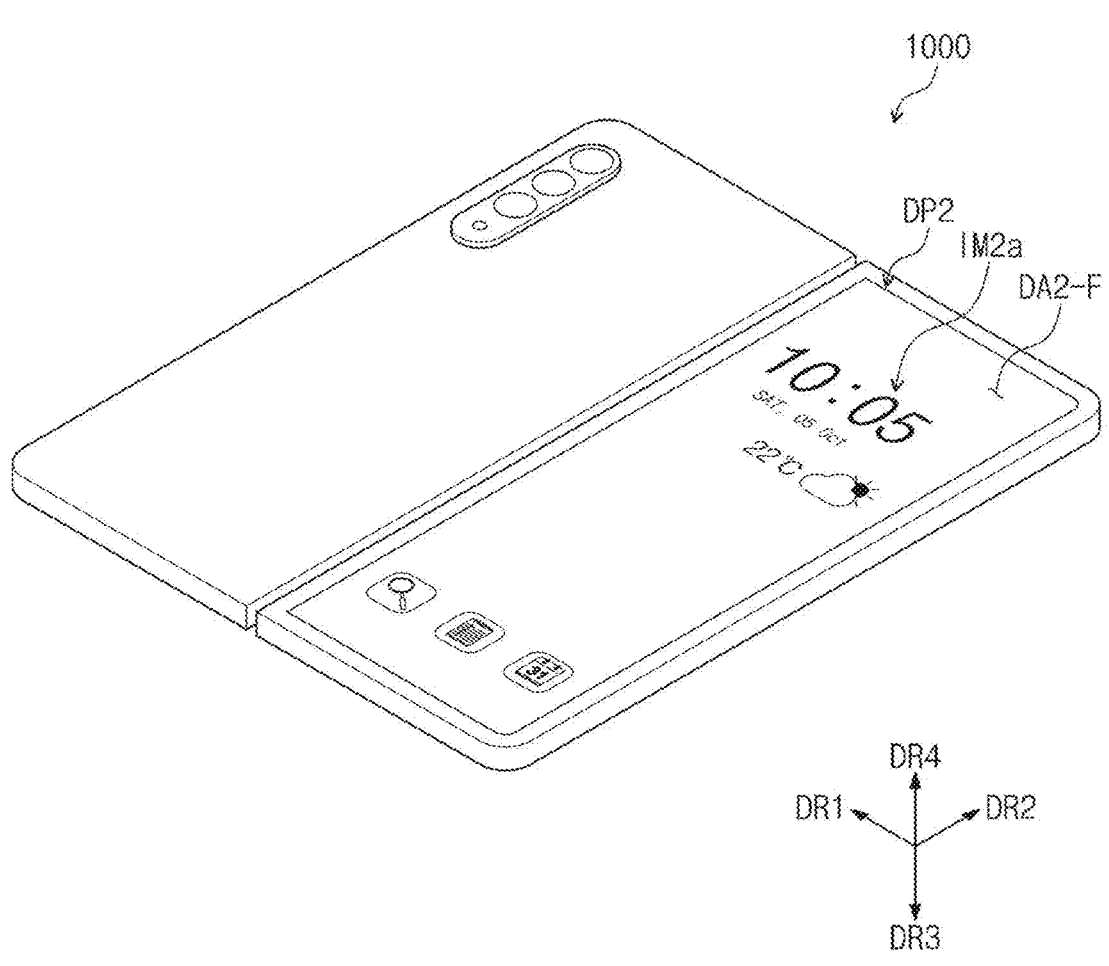
FIG. 1B is a rear perspective view of the electronic device according to an embodiment of the present disclosure.

FIG. 1A is a perspective view of an electronic device 1000 according to an embodiment of the present disclosure. FIG. 1B is a rear perspective view of the electronic device 1000 according to an embodiment of the present disclosure.

Referring to FIGS. 1A and 1B, the electronic device 1000 may be a device that is activated according to an electrical signal. For example, the electronic device 1000 may display an image, and may sense external inputs applied from the outside. The external input may be an input of the user. The input of the user may include various suitable kinds of external inputs, such as a portion of a human body of the user, a pen PN, light, heat, or pressure.

The electronic device 1000 may include a first display panel DP1 and a second display panel DP2. The first display panel DP1 and the second display panel DP2 may be separate panels that are distinct (e.g., that are separated or spaced apart) from each other. The first display panel DP1 may be referred to as a main display panel, and the second display panel DP2 may be referred to as an auxiliary display panel or an external display panel.

The first display panel DP1 may include a first display unit (e.g., a first display or a first touch-display) DA1-F, and the second display panel DP2 may include a second display unit (e.g., a second display or a second touch-display) DA2-F. An area of the second display panel DP2 may be smaller than an area of the first display panel DP1. Corresponding to the sizes of the first display panel DP1 and the second display panel DP2, an area of the first display unit DA1-F may be larger than an area of the second display unit DA2-F.

In a state in which the electronic device 1000 is unfolded, the first display unit DA1-F may have a plane that is parallel to or substantially parallel to a first direction DR1 and a second direction DR2. A thickness direction of the electronic device 1000 may be parallel to or substantially parallel to a third direction DR3 intersecting or crossing the first direction DR1 and the second direction DR2. Thus, front surfaces (e.g., upper surfaces) and rear surfaces (e.g., lower surfaces) of the members constituting the electronic device 1000 may be defined based on the third direction DR3.

The first display panel DP1 or the first display unit DA1-F may include a folding area FA that may be folded or unfolded, and a plurality of non-folding areas NFA1 and NFA2 spaced apart from each other with the folding area FA interposed therebetween. The second display panel DP2 may overlap with one of the plurality of non-folding areas NFA1 and NFA2. For example, the second display panel DP2 may overlap with the first non-folding area NFA1.

A display direction of a first image IM1*a* displayed on a portion of the first display panel DP1, for example, such as on the first non-folding area NFA1, may be opposite to a display direction of a second image IM2*a* displayed on the second display panel DP2. For example, the first image IM1*a* may be displayed in the third direction DR3, and the second image IM2*a* may be displayed in a fourth direction DR4 that is opposite to the third direction DR3.

In an embodiment of the present disclosure, the folding area FA may be bent with respect to a folding axis extending in a direction parallel to or substantially parallel to the long sides of the electronic device 1000, for example, such as in a direction parallel to or substantially parallel to the second direction DR2. In a state in which the electronic device 1000 is folded, the folding area FA has a suitable curvature (e.g., a predetermined curvature) and a suitable radius of curvature (e.g., a predetermined radius of curvature). The first non-folding area NFA1 and the second non-folding area NFA2 may face each other, and the electronic device 1000 may be inner-folded so that the first display unit DA1-F is prevented from being exposed to the outside.

In an embodiment of the present disclosure, the electronic device 1000 may be outer-folded so that the first display unit DA1-F is exposed to the outside. In an embodiment of the present disclosure, the electronic device 1000 may be both inner-folded or outer-folded from an unfolded state, but the present disclosure is not limited thereto.

FIG. 1A illustratively shows one folding area FA defined in (e.g., provided in or included in) the electronic device 1000, but the present disclosure is not limited thereto. For example, a plurality of folding axes and a plurality of folding areas corresponding thereto may be defined in the electronic device 1000, and the electronic device 1000 may be inner-folded and/or outer-folded from a state in which each of the plurality of folding areas is unfolded.

In an embodiment of the present disclosure, at least one of the first display panel DP1 or the second display panel DP2 may sense an input by the pen PN, even when a digitizer is not included. Thus, because the digitizer for sensing the pen PN may be omitted, an increase in a thickness, an increase in a weight, and a decrease in flexibility of the electronic device 1000 that may be caused by the addition of a digitizer may not occur. Thus, the second display panel DP2 as well as the first display panel DP1 may be designed to sense the pen PN.

Figure 2:
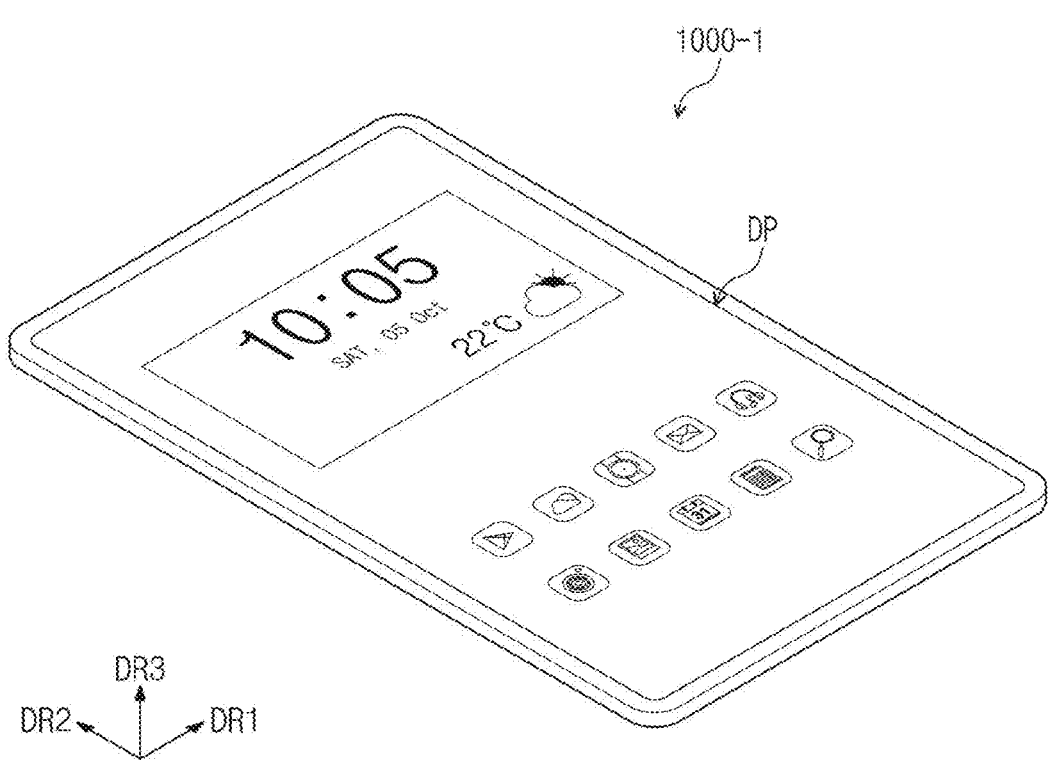
FIG. 2 is a perspective view of an electronic device according to an embodiment of the present disclosure.
Figure 3:
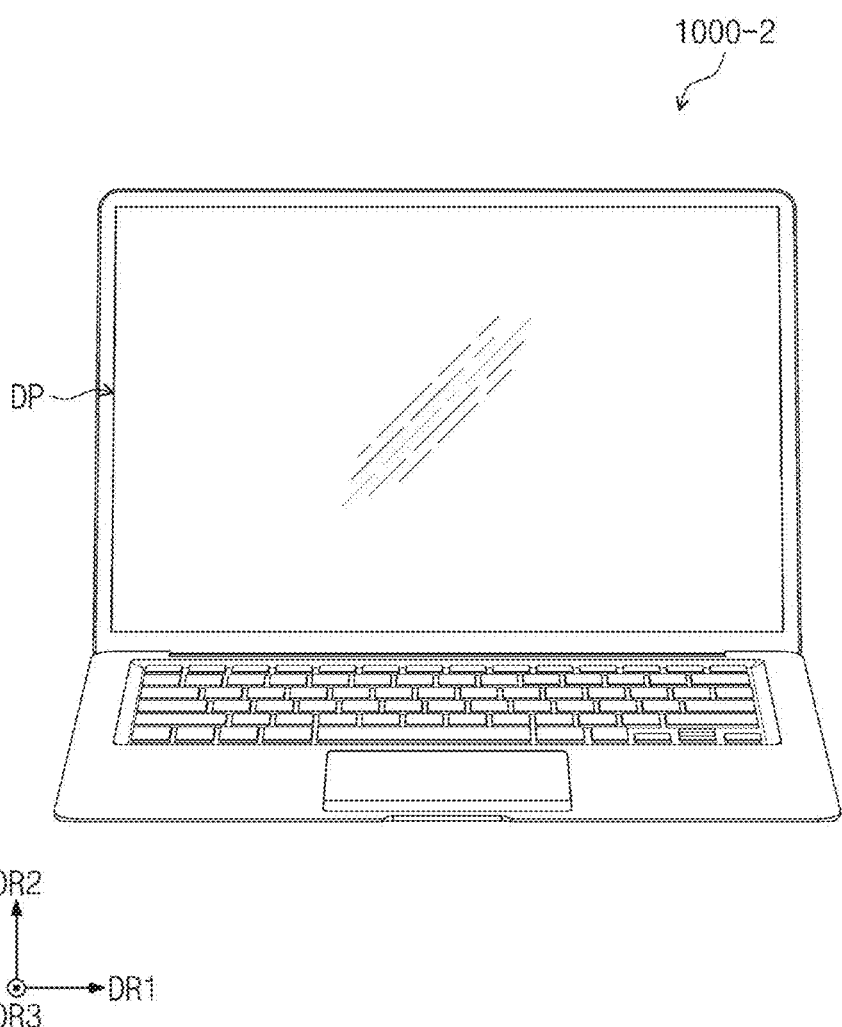
FIG. 3 is a perspective view of an electronic device according to an embodiment of the present disclosure.

FIG. 2 is a perspective view of an electronic device 1000-1 according to an embodiment of the present disclosure. FIG. 3 is a perspective view of an electronic device 1000-2 according to an embodiment of the present disclosure.

FIG. 2 illustratively shows that the electronic device 1000-1 is a mobile phone, and the electronic device 1000-1 may include a display panel DP. FIG. 3 illustratively shows that the electronic device 1000-2 is a laptop, and the electronic device 1000-2 may include the display panel DP.

In an embodiment of the present disclosure, the display panel DP may sense external inputs applied from the outside. The external input may be an input of the user. The input of the user may include various suitable kinds of external inputs, such as the portion of the human body of the user, the pen PN (e.g., see FIG. 1A), light, heat, or pressure.

In an embodiment of the present disclosure, the display panel DP may sense the input by the pen PN even when the digitizer is not included. Thus, because the digitizer for sensing the pen PN may be omitted, an increase in the thickness and an increase in the weight of the electronic device 1000-1 or 1000-2 that may be caused by the addition of a digitizer may not occur.

FIG. 1A illustratively shows a foldable-kind of electronic device 1000, and FIG. 2 illustratively shows a bar-kind of electronic device 1000-1, but the present disclosure is not limited thereto. For example, the embodiments of the present disclosure described herein may be applied to various suitable kinds of electronic devices, such as a rollable-kind of electronic device, a slidable-kind of electronic device, and a stretchable-kind of electronic device.

Figure 4:
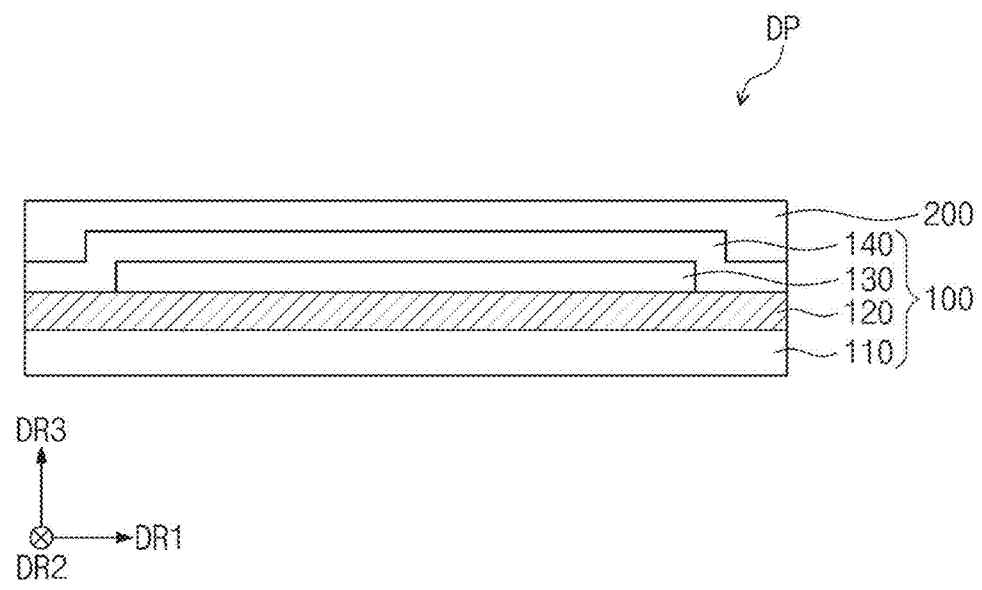
FIG. 4 is a schematic cross-sectional view of a display panel according to an embodiment of the present disclosure.

FIG. 4 is a schematic cross-sectional view of the display panel DP according to an embodiment of the present disclosure.

Referring to FIG. 4, the display panel DP may include a display layer 100 and a sensor layer 200.

The display layer 100 may be a component that generates or substantially generates an image. The display layer 100 may be a light emitting display layer. For example, the display layer 100 may be an organic light emitting display layer, an inorganic light emitting display layer, an organic-inorganic light emitting display layer, a quantum dot display layer, a micro-light emitting diode (LED) display layer, or a nano-LED display layer. The display layer 100 may include a base layer 110, a circuit layer 120, a light emitting element layer 130, and an encapsulation layer 140.

The base layer 110 may be a member that provides a base surface on which the circuit layer 120 is disposed. The base layer 110 may have a multi-layered structure or a single-layer structure. The base layer 110 may be a glass substrate, a metal substrate, a silicon substrate, a polymer substrate, or the like, but the present disclosure is not particularly limited thereto.

The circuit layer 120 may be disposed on the base layer 110. The circuit layer 120 may include an insulating layer, a semiconductor pattern, a conductive pattern, a signal line, and the like. The insulating layer, a semiconductor layer, and a conductive layer may be formed on the base layer 110 in a suitable manner, such as coating and deposition, and the insulating layer, the semiconductor layer, and the conductive layer may be selectively patterned through a plurality of photolithography processes.

The light emitting element layer 130 may be disposed on the circuit layer 120. The light emitting element layer 130 may include a light emitting element. For example, the light emitting element layer 130 may include an organic light emitting material, an inorganic light emitting material, an organic-inorganic light emitting material, a quantum dot, a quantum rod, a micro-LED, or a nano-LED.

The encapsulation layer 140 may be disposed on the light emitting element layer 130. The encapsulation layer 140 may protect the light emitting element layer 130 from moisture, oxygen, and foreign substances, such as dust particles.

The sensor layer 200 may be disposed on the display layer 100. The sensor layer 200 may sense an external input applied from an external unit or device. The sensor layer 200 may be an integrated sensor formed continuously during a process of manufacturing the display layer 100, or the sensor layer 200 may be an external sensor that is attached to the display layer 100. The sensor layer 200 may be referred to as a sensor, an input sensing layer, an input sensing panel, an electronic device for sensing input coordinates, or the like.

In an embodiment of the present disclosure, the sensor layer 200 may sense both inputs of a passive kind of input means, such as the human body of the user, and an input device that generates a magnetic field having a suitable resonance frequency (e.g., a predetermined resonance frequency). The input device may be referred to as a pen, an input pen, a magnetic pen, a stylus pen, or an electromagnetic resonance pen.

Figure 5:
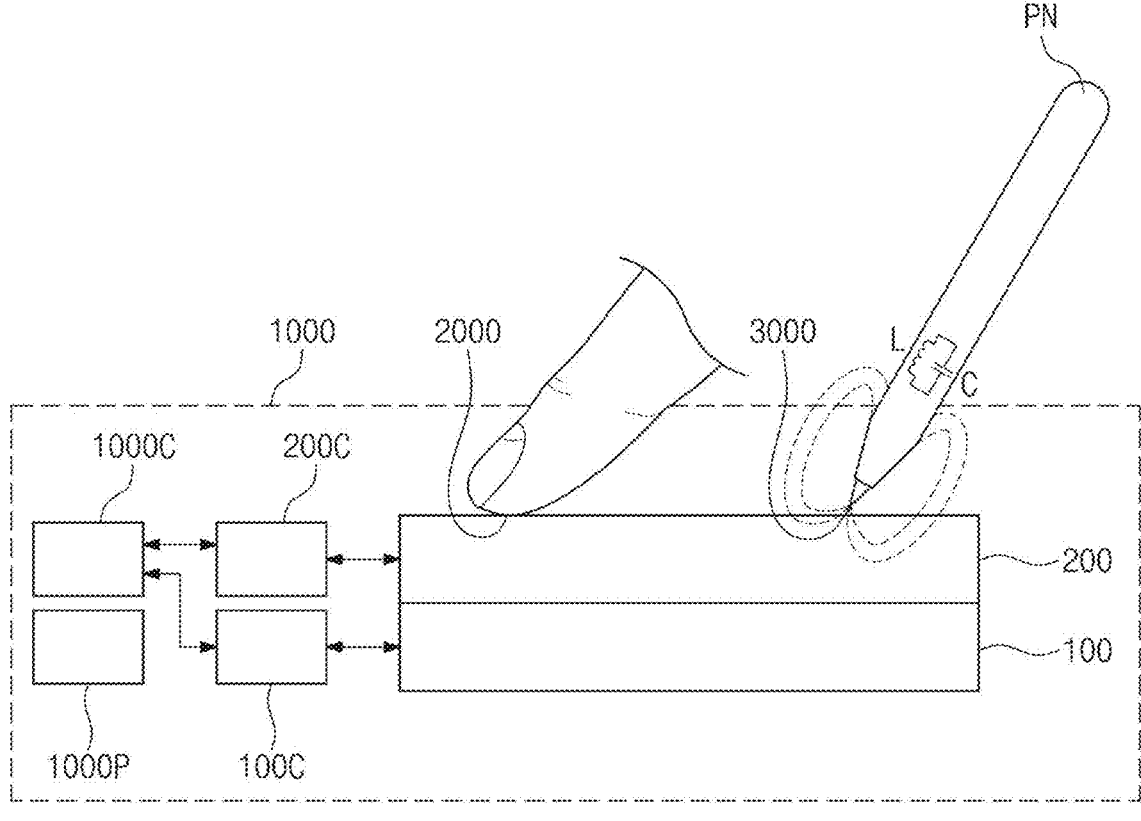
FIG. 5 is a view illustrating an operation of the electronic device according to an embodiment of the present disclosure.

FIG. 5 is a view illustrating an operation of the electronic device 1000 according to an embodiment of the present disclosure.

Referring to FIG. 5, the electronic device 1000 may include the display layer 100, the sensor layer 200, a display driving unit (e.g., a display driver or a display driving circuit) 100C, a sensor driving circuit 2000, a main driving unit (e.g., a main driver or a main driving circuit) 1000C, and a power circuit 1000P.

The sensor layer 200 may sense a first input 2000, or a second input 3000 applied from an external unit or device. The first input 2000 and the second input 3000 may be input means that may provide a change in a capacitance of the sensor layer 200, or may be input means that may cause an induced current in the sensor layer 200. For example, the first input 2000 may be a passive-kind of input means, such as the human body of the user. The second input 3000 may be an input by the pen PN, or an input by a radio frequency integrated circuit (RFIC) tag. For example, the pen PN may be a passive pen or an active pen.

In an embodiment of the present disclosure, the pen PN may be a device that generates a magnetic field having a predetermined resonant frequency. The pen PN may be configured to transmit an output signal based on an electromagnetic resonance method. The pen PN may be referred to as an input device, an input pen, a magnetic pen, a stylus pen, or an electromagnetic resonance pen.

The pen PN may include an RLC resonant circuit, and the RLC resonant circuit may include an inductor L and a capacitor C. In an embodiment of the present disclosure, the RLC resonant circuit may be a variable resonant circuit having a variable resonant frequency. In this case, the inductor L may be a variable inductor and/or the capacitor C may be a variable capacitor, but the present disclosure is not particularly limited thereto.

The inductor L generates a current by a magnetic field formed in the electronic device 1000, for example, such as in the sensor layer 200. However, the present disclosure is not particularly limited thereto. For example, when the pen PN operates as an active kind, the pen PN may generate a current even when the pen PN does not receive a magnetic field from an external unit or device. The generated current is transmitted to the capacitor C. The capacitor C charges a current input from the inductor L, and discharges the charged current to the inductor L. Thereafter, the inductor L may emit a magnetic field having a resonant frequency. The induced current may flow in the sensor layer 200 by the magnetic field emitted by the pen PN, and the induced current may be transmitted to the sensor driving circuit 2000 as a reception signal (e.g., a sensing signal).

The main driving unit 1000C may control the overall operations of the electronic device 1000. For example, the main driving unit 1000C may control operations of the display driving unit 100C and the sensor driving circuit 2000. The main driving unit 1000C may include at least one microprocessor, and may further include a graphics controller. The main driving unit 1000C may be referred to as an application processor, a central processing unit, or a main processor.

The display driving unit 1000 may drive the display layer 100. The display driving unit 100C may receive image data and a control signal from the main driving unit 1000C. The control signal may include various suitable signals. For example, the control signal may include an input vertical synchronization signal, an input horizontal synchronization signal, a main clock signal, a data enable signal, or the like.

The sensor driving circuit 2000 may drive the sensor layer 200. The sensor driving circuit 2000 may receive the control signal from the main driving unit 1000C. The control signal may include a clock signal of the sensor driving circuit 2000. Further, the control signal may further include a mode determining signal that determines driving modes of the sensor driving circuit 2000 and the sensor layer 200.

The sensor driving circuit 2000 may be implemented as an integrated circuit IC, and may be electrically connected to the sensor layer 200. For example, the sensor driving circuit 2000 may be directly mounted on a suitable area (e.g., a predetermined area) of the display panel, or may be mounted on a separate printed circuit board using a chip on film (COF) method and electrically connected to the sensor layer 200.

The sensor driving circuit 2000 and the sensor layer 200 may be selectively operated in a first mode or a second mode. For example, the first mode may be a mode for sensing a touch input, for example, such as the first input 2000. The second mode may be a mode for sensing the second input 3000, for example, such as the input by the pen PN. The first mode may be referred to as a touch sensing mode, and the second mode may be referred to as a pen sensing mode.

Switching between the first mode and the second mode may be performed in various suitable manners. For example, the sensor driving circuit 2000 and the sensor layer 200 may be driven in the first mode and the second mode in a time division manner, and may sense the first input 2000 and the second input 3000. As another example, the switching between the first mode and the second mode may be generated by a selection by the user or by a specific action (e.g., an input) of the user, any one of the first mode or the second mode may be activated or deactivated by activating or deactivating a specific application, or a current mode may be switched from one mode to the other mode of the first mode and the second mode. As another example, while the sensor driving circuit 2000 and the sensor layer 200 are alternately operated in the first mode and the second mode, when the first input 2000 is sensed, the first mode may be maintained, or when the second input 3000 is sensed, the second mode may be maintained.

The sensor driving circuit 2000 may calculate coordinate information of the input based on a signal received from the sensor layer 200, and may provide a coordinate signal having the coordinate information to the main driving unit 1000C. The main driving unit 1000C executes an operation corresponding to the input of the user based on the coordinate signal. For example, the main driving unit 1000C may operate the display driving unit 1000 so that a new application image is displayed on the display layer 100.

The power circuit 1000P may include a power management integrated circuit (PMIC). The power circuit 1000P may generate a plurality of driving voltages for driving the display layer 100, the sensor layer 200, the display driving unit 100C, and the sensor driving circuit 2000. For example, the plurality of driving voltages may include a gate-high voltage, a gate-low voltage, a first driving voltage (e.g., an ELVSS voltage), a second driving voltage (e.g., an ELVDD voltage), an initialization voltage, and/or the like, but the present disclosure is not particularly limited thereto.

Figure 6A:
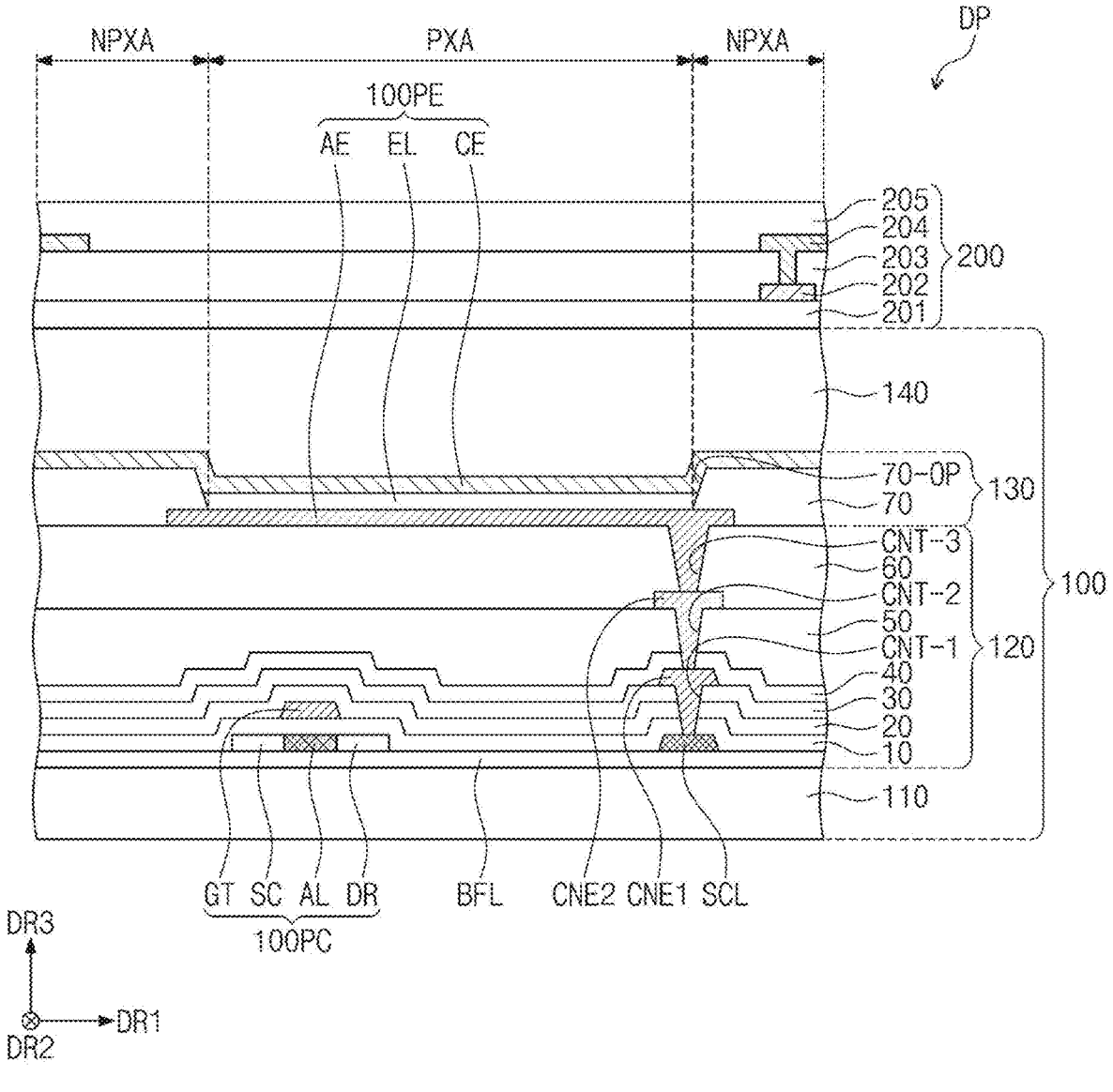
FIG. 6A is a cross-sectional view of the display panel according to an embodiment of the present disclosure.

FIG. 6A is a cross-sectional view of the display panel DP according to an embodiment of the present disclosure.

Referring to FIG. 6A, at least one buffer layer BFL is formed on an upper surface of the base layer 110. The buffer layer BFL may improve a coupling force between the base layer 110 and a semiconductor pattern. The buffer layer BFL may be formed in multiple layers. As another example, the display layer 100 may further include a barrier layer. The buffer layer BFL may include at least one of a silicon oxide, a silicon nitride, or a silicon oxy nitride. For example, the buffer layer BFL may include a suitable structure in which silicon oxide layers and silicon nitride layers are alternately laminated.

Semiconductor patterns SC, AL, DR, and SCL may be arranged on the buffer layer BFL. The semiconductor patterns SC, AL, DR, and SCL may include polysilicon. However, the present disclosure is not limited thereto, and the semiconductor patterns SC, AL, DR, and SCL may also include an amorphous silicon, a low-temperature polycrystalline silicon, or an oxide semiconductor.

FIG. 6A illustrates some of the semiconductor patterns SC, AL, DR, and SCL, and the semiconductor pattern may be further arranged in other areas in other views. The semiconductor patterns SC, AL, DR, and SCL may be arranged in a suitable rule (e.g., a specific or predetermined rule) across pixels. The semiconductor patterns SC, AL, DR, and SCL may have different electrical properties depending on whether or not the semiconductor patterns SC, AL, DR, and SCL are doped. The semiconductor patterns SC, AL, DR, and SCL may include first areas SC, DR, and SCL having a higher conductivity, and a second area AL having a lower conductivity. The first areas SC, DR, and SCL may be doped with an N-type dopant or a P-type dopant. A P-type transistor may include a doped area doped with the P-type dopant, and an N-type transistor may include a doped area doped with the N-type dopant. The second area AL may be a non-doped area, or an area that is doped at a lower concentration than that of the first areas SC, DR, and SCL.

A conductivity of the first areas SC, DR, and SCL may be greater than a conductivity of the second area AL, and the first areas SC, DR, and SCL may serve or substantially serve as an electrode or a signal line. The second area AL may correspond to or substantially correspond to an active area AL (e.g., a channel) of a transistor 100PC. In other words, a part (e.g., AL) of the semiconductor patterns SC, AL, DR, and SCL may be the active area AL of the transistor 100PC, other parts (e.g., SC and DR) may be a source area SC or a drain area DR of the transistor 100PC, and another part (e.g., SCL) may be a connection electrode or a connection signal line SCL.

Each of the pixels may have an equivalent circuit including a plurality of transistors, at least one capacitor, and at least one light emitting element, but the present disclosure is not limited thereto, and the equivalent circuit of the pixel may be variously modified as needed or desired as would be understood by those having ordinary skill in the art. FIG. 6A illustratively shows one transistor 100PC and one light emitting element 100PE included in a pixel.

The source area SC, the active area AL, and the drain area DR of the transistor 100PC may be formed from the semiconductor patterns SC, AL, DR, and SCL. The source area SC and the drain area DR may extend from the active area AL in opposite directions from each other on a cross section. FIG. 6A illustrates a portion of the connection signal line SCL formed from the semiconductor patterns SC, AL, DR, and SCL. The connection signal line SCL may be connected to the drain area DR of the transistor 100PC on a plane (e.g., in a plan view).

A first insulating layer 10 may be disposed on the buffer layer BFL. The first insulating layer 10 may commonly overlap with the plurality of pixels, and may cover the semiconductor patterns SC, AL, DR, and SCL. The first insulating layer 10 may be an inorganic layer and/or an organic layer, and may have a single-layer structure or a multi-layered structure. The first insulating layer 10 may include at least one of an aluminum oxide, a titanium oxide, a silicon oxide, a silicon nitride, a silicon oxy nitride, a zirconium oxide, or a hafnium oxide. In an embodiment, the first insulating layer 10 may be a single-layer silicon oxide layer. The first insulating layer 10 and an insulating layer of the circuit layer 120, which will be described in more detail below, may be an inorganic layer and/or an organic layer, and may have a single-layer structure or a multi-layered structure. The inorganic layer may include at least one of the above-described inorganic materials, but the present disclosure is not limited thereto.

A gate GT of the transistor 100PC is disposed on the first insulating layer 10. The gate GT may be a portion of a metal pattern. The gate GT may overlap with the active area AL. In a process of doping or reducing the semiconductor patterns SC, AL, DR, and SCL, the gate GT may function as a mask.

A second insulating layer 20 may be disposed on the first insulating layer 10, and may cover the gate GT. The second insulating layer 20 may commonly overlap with the pixels. The second insulating layer 20 may be an inorganic layer and/or an organic layer, and may have a single-layer structure or a multi-layered structure. The second insulating layer 20 may include at least one of a silicon oxide, a silicon nitride, or a silicon oxy nitride. In an embodiment, the second insulating layer 20 may have a multi-layered structure including a silicon oxide layer and a silicon nitride layer.

A third insulating layer 30 may be disposed on the second insulating layer 20. The third insulating layer 30 may have a single-layer structure or a multi-layered structure. For example, the third insulating layer 30 may have a multi-layered structure including a silicon oxide layer and a silicon nitride layer.

A first connection electrode CNE1 may be disposed on the third insulating layer 30. The first connection electrode CNE1 may be electrically connected to the connection signal line SCL through a contact hole CNT-1 passing through (e.g., penetrating) the first insulating layer 10, the second insulating layer 20, and the third insulating layer 30.

A fourth insulating layer 40 may be disposed on the third insulating layer 30. The fourth insulating layer 40 may be a single-layer silicon oxide layer. A fifth insulating layer 50 may be disposed on the fourth insulating layer 40. The fifth insulating layer 50 may be an organic layer.

A second connection electrode CNE2 may be disposed on the fifth insulating layer 50. The second connection electrode CNE2 may be electrically connected to the first connection electrode CNE1 through a contact hole CNT-2 passing through (e.g., penetrating) the fourth insulating layer 40 and the fifth insulating layer 50.

A sixth insulating layer 60 may be disposed on the fifth insulating layer 50 to cover the second connection electrode CNE2. The sixth insulating layer 60 may be an organic layer.

The light emitting element layer 130 may be disposed on the circuit layer 120. The light emitting element layer 130 may include the light emitting element 100PE. For example, the light emitting element layer 130 may include an organic light emitting material, an inorganic light emitting material, an organic-inorganic light emitting material, a quantum dot, a quantum rod, a micro-LED, or a nano-LED. Hereinafter, for convenience of illustration, the light emitting element 100PE may be described in more detail in the context of an organic light emitting element, but the present disclosure is not particularly limited thereto.

The light emitting element 100PE may include a first electrode AE, a light emitting layer EL, and a second electrode CE.

The first electrode AE may be disposed on the sixth insulating layer 60. The first electrode AE may be electrically connected to the second connection electrode CNE2 through a contact hole CNT-3 passing through (e.g., penetrating) the sixth insulating layer 60.

A pixel defining film 70 may be disposed on the sixth insulating layer 60, and may cover a portion of the first electrode AE. An opening 70-OP is defined in the pixel defining film 70. The opening 70-OP of the pixel defining film 70 exposes at least a portion of the first electrode AE.

The first display unit DA1-F (e.g., see FIG. 1A) may include a light emitting area PXA, and a non-light emitting area NPXA adjacent to the light emitting area PXA. The non-light emitting area NPXA may surround (e.g., around a periphery of) the light emitting area PXA. In an embodiment, the light emitting area PXA is defined to correspond to a partial area of the first electrode AE, which is exposed by the opening 70-OP.

The light emitting layer EL may be disposed on the first electrode AE. The light emitting layer EL may be disposed in an area corresponding to the opening 70-OP. FIG. 6A illustratively shows that the light emitting layer EL is disposed inside the opening 70-OP, but the present disclosure is not particularly limited thereto. For example, the light emitting layer EL may extend to cover portions of a side surface of the pixel defining film 70 that defines the opening 70-OP and an upper surface of the pixel defining film 70.

In an embodiment of the present disclosure, the light emitting layer EL may be formed separately for each of the pixels. When the light emitting layer EL is formed separately for each of the pixels, each of the light emitting layers EL may emit light having at least one of a blue color, a red color, or a green color. However, the present disclosure is not limited thereto, and the light emitting layer EL may have an integral shape, and may be commonly included in the plurality of pixels. In this case, the light emitting layer EL may provide a blue light or a white light.

The second electrode CE may be disposed on the light emitting layer EL. The second electrode CE may have an integral shape, and may be commonly included in the plurality of pixels.

In an embodiment of the present disclosure, a hole control layer may be disposed between the first electrode AE and the light emitting layer EL. The hole control layer may be commonly disposed in the light emitting area PXA and the non-light emitting area NPXA. The hole control layer may include a hole transport layer, and may further include a hole injection layer. An electron control layer may be disposed between the light emitting layer EL and the second electrode CE. The electron control layer may include an electron transport layer, and may further include an electron injection layer. The hole control layer and the electron control layer may be commonly formed in the plurality of pixels by using an open mask or an inkjet process.

The encapsulation layer 140 may be disposed on the light emitting element layer 130. The encapsulation layer 140 may include an inorganic layer, an organic layer, and an inorganic layer that are sequentially laminated, but the layers constituting the encapsulation layer 140 are not limited thereto. The inorganic layers may protect the light emitting element layer 130 from moisture and oxygen, and the organic layer may protect the light emitting element layer 130 from foreign substances such as dust particles. The inorganic layers may include a silicon nitride layer, a silicon oxy nitride layer, a silicon oxide layer, a titanium oxide layer, an aluminum oxide layer, or the like. The organic layer may include an acryl-based organic layer, but the present disclosure is not limited thereto.

The sensor layer 200 may include a base layer 201, a first conductive layer 202, an intermediate insulating layer 203, a second conductive layer 204, and a cover insulating layer 205.

The base layer 201 may be an inorganic layer including at least one of a silicon nitride, a silicon oxy nitride, or a silicon oxide. As another example, the base layer 201 may be an organic layer including an epoxy resin, an acryl-based resin, or an imide-based resin. The base layer 201 may have a single-layer structure, or may have a multi-layered structure in which a plurality of layers are laminated in the third direction DR3. In an embodiment of the present disclosure, the sensor layer 200 may not include the base layer 201.

Each of the first conductive layer 202 and the second conductive layer 204 may have a single-layer structure, or may have a multi-layered structure in which a plurality of layers are laminated in the third direction DR3.

Each of the first conductive layer 202 and the second conductive layer 204 having the single-layer structure may include a metal layer or a transparent conductive layer. The metal layer may include molybdenum, silver, titanium, copper, aluminum, or suitable alloys thereof. The transparent conductive layer may include a transparent conductive oxide, such as an indium tin oxide (ITO), an indium zinc oxide (IZO), a zinc oxide (ZnO), or an indium zinc tin oxide (IZTO). In addition, the transparent conductive layer may include a conductive polymer, such as poly(3,4-ethylenedi-oxythiophene) (PEDOT), a metal nanowire, graphene, or the like.

Each of the first conductive layer 202 and the second conductive layer 204 having the multi-layered structure may include a plurality of metal layers. The metal layers may have, for example, a three-layered structure of titanium/aluminum/titanium. The conductive layer having the multi-layered structure may include at least one metal layer and at least one transparent conductive layer.

In an embodiment of the present disclosure, a thickness of the first conductive layer 202 may be greater than or equal to a thickness of the second conductive layer 204. When the thickness of the first conductive layer 202 is greater than the thickness of the second conductive layer 204, a resistance of a component (e.g., an electrode, a pattern, a bridge pattern, or the like) included in the first conductive layer 202 may be decreased. Further, because the first conductive layer 202 may be disposed under the second conductive layer 204, even when the thickness of the first conductive layer 202 is increased, a probability that components included in the first conductive layer 202 are visually recognized due to a reflection of external light may be smaller than that of the second conductive layer 204.

At least one of the intermediate insulating layer 203 or the cover insulating layer 205 may include an inorganic film. The inorganic film may include at least one of an aluminum oxide, a titanium oxide, a silicon oxide, a silicon nitride, a silicon oxy nitride, a zirconium oxide, or a hafnium oxide.

At least one of the intermediate insulating layer 203 or the cover insulating layer 205 may include an organic film. The organic film may include at least one of an acryl-based resin, a methacrylate-based resin, a polyisoprene-based resin, a vinyl-based resin, an epoxy-based resin, a urethane-based resin, a cellulose-based resin, a siloxane-based resin, a polyimide-based resin, a polyamide-based resin, or a perylene-based resin.

The sensor layer 200 including the first conductive layer 202 and the second conductive layer 204, or in other words, a total of two conductive layers, has been described above, but the present disclosure is not particularly limited thereto. For example, the sensor layer 200 may include three or more conductive layers.

Figure 6B:
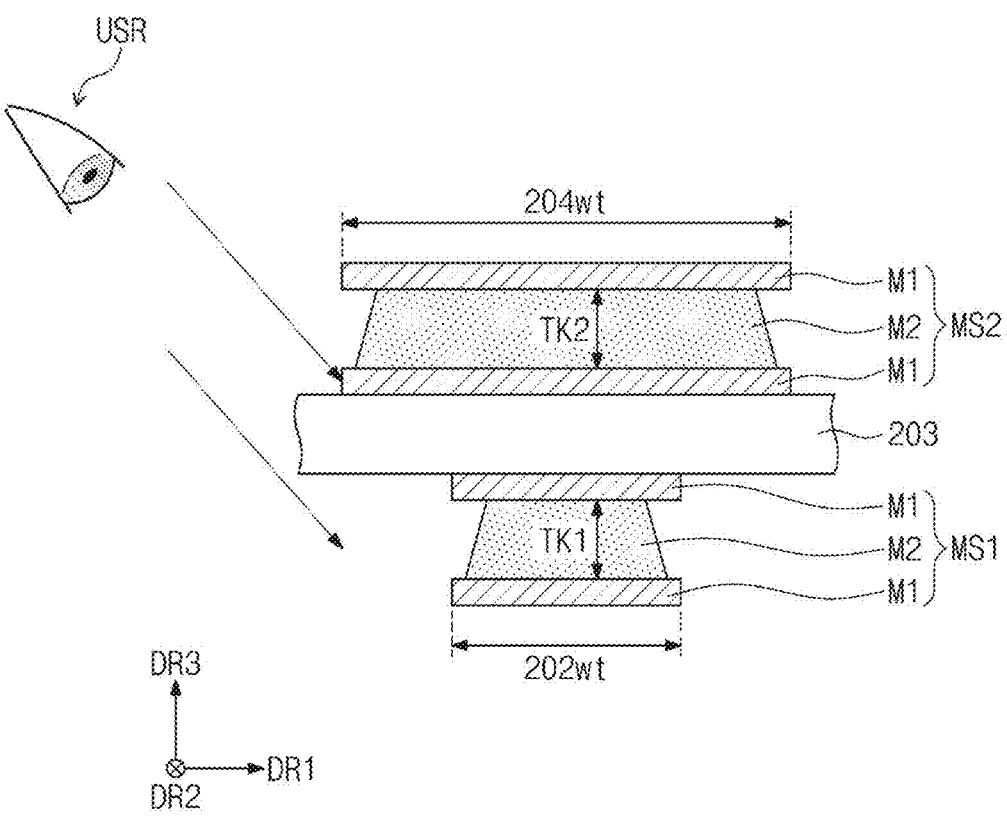
FIG. 6B is a cross-sectional view illustrating some components of a sensor layer according to an embodiment of the present disclosure.

FIG. 6B is a cross-sectional view illustrating some components of the sensor layer 200 according to an embodiment of the present disclosure.

Referring to FIGS. 6A and 6B, a second width 204$wt$ of a second mesh line MS2 included in the second conductive layer 204 may be greater than or equal to a first width 202$wt$ of a first mesh line MS1 included in the first conductive layer 202. When a user USR views the first mesh line MS1 and the second mesh line MS2 from a side surface, because the first mesh line MS1 has a width that is smaller than that of the second mesh line MS2, a probability that the first mesh line MS1 may be visually recognized by the user USR may be decreased.

Each of the first mesh line MS1 and the second mesh line MS2 may include first metal layers M1, and a second metal layer M2 disposed between the first metal layers M1. Illustratively, the first metal layers M1 may include titanium (Ti), and the second metal layer M2 may include aluminum (Al). However, the present disclosure is not particularly limited thereto.

In an embodiment of the present disclosure, a first thickness TK1 of the second metal layer M2 of the first mesh line MS1 may be the same or substantially the same as a second thickness TK2 of the second metal layer M2 of the second mesh line MS2, but the present disclosure is not particularly limited thereto. For example, the first thickness TK1 may be greater than the second thickness TK2. As another example, the second thickness TK2 may be greater than the first thickness TK1. In an embodiment of the present disclosure, each of the first thickness TK1 and the second thickness TK2 may be 1000 Å or more, for example, such as 6000 Å.

Figure 7:
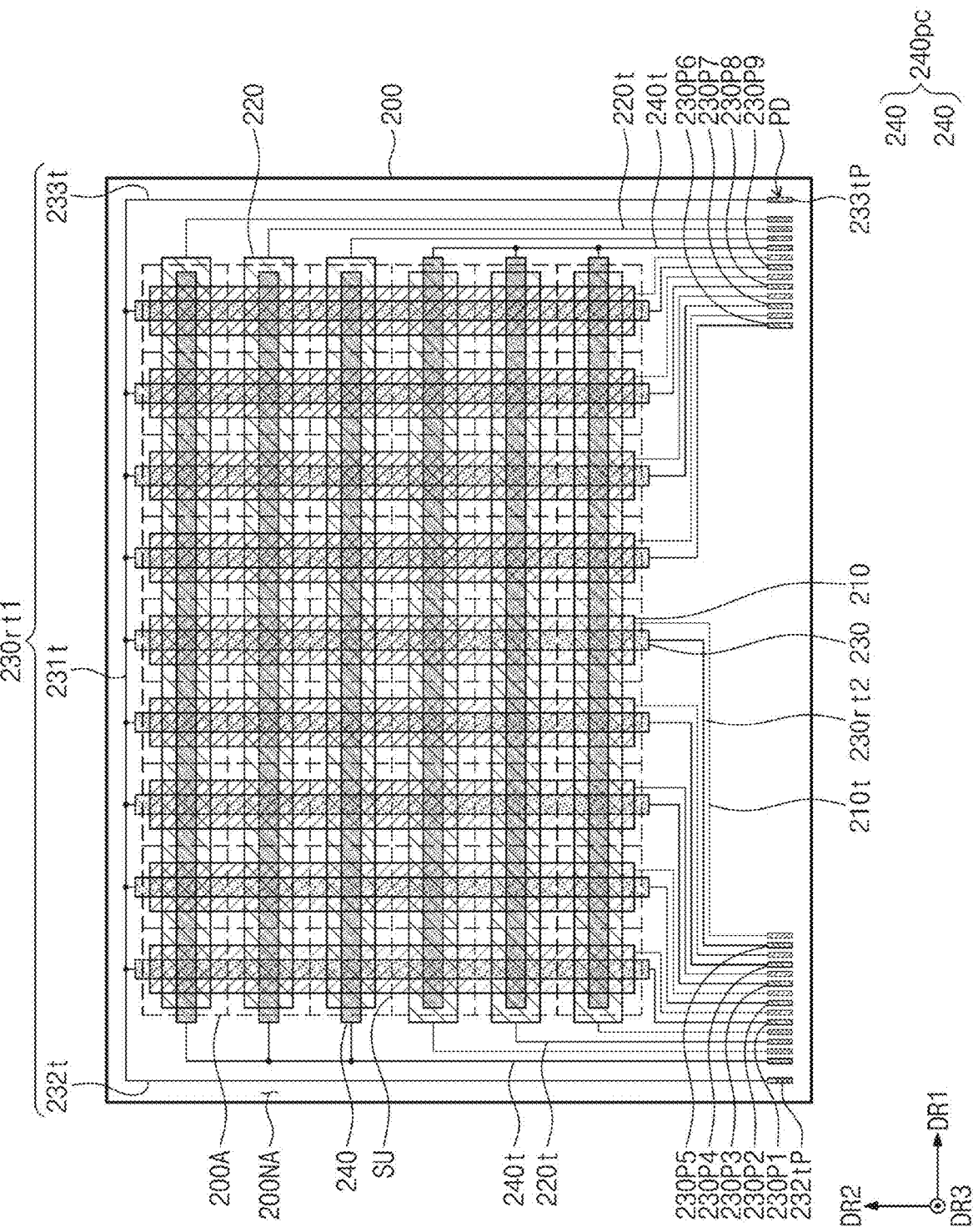
FIG. 7 is a plan view of the sensor layer according to an embodiment of the present disclosure.

FIG. 7 is a plan view of the sensor layer 200 according to an embodiment of the present disclosure.

Referring to FIG. 7, a sensing area 200A and a peripheral area 200NA adjacent to the sensing area 200A may be defined in the sensor layer 200.

The sensor layer 200 may include a plurality of first electrodes 210, a plurality of second electrodes 220, a plurality of third electrodes 230, and a plurality of fourth electrodes 240, which are arranged in the sensing area 200A. In an embodiment of the present disclosure, the fourth electrodes 240 may be omitted as needed or desired.

The first electrodes 210 may intersect or cross the second electrodes 220. Each of the first electrodes 210 may extend in the second direction DR2, and the first electrodes 210 may be arranged to be spaced apart from each other in the first direction DR1. Each of the second electrodes 220 may extend in the first direction DR1, and the second electrodes 220 may be arranged to be spaced apart from each other in the second direction DR2. A sensing unit (e.g., a sensing area) SU of the sensor layer 200 may be an area in which one first electrode 210 and one second electrode 220 intersect or cross each other.

FIG. 7 illustratively shows nine first electrodes 210 and six second electrodes 220, and thus, illustratively shows 54 sensing units SU, but the number of first electrodes 210 and the number of second electrodes 220 are not limited thereto.

In an embodiment of the present disclosure, a width of the sensing area 200A in the first direction DR1 may be greater than or equal to a width of the sensing area 200A in the second direction DR2. Thus, the number of first electrodes 210 arranged in the first direction DR1 may be greater than the number of second electrodes 220 arranged in the second direction DR2. However, the present disclosure is not particularly limited thereto, and the width of the sensing area 200A in the second direction DR2 may be greater than or equal to the width of the sensing area 200A in the first direction DR1. In this case, the number of first electrodes 210 arranged in the first direction DR1 may be smaller than the number of second electrodes 220 arranged in the second direction DR2.

Each of the third electrodes 230 may extend in the second direction DR2, and the third electrodes 230 may be arranged to be spaced apart from each other in the first direction DR1. One third electrode 230 may at least partially overlap with one first electrode 210. In an embodiment of the present disclosure, a capacitance (e.g., a coupling capacitance) between the one first electrode 210 and the one third electrode 230 may be adjusted by adjusting an overlapping area between the one first electrode 210 and the one third electrode 230.

The fourth electrodes 240 may be arranged along the second direction DR2, and the fourth electrodes 240 may extend in the first direction DR1. One fourth electrode 240 may at least partially overlap with one second electrode 220. In an embodiment of the present disclosure, a capacitance (e.g., a coupling capacitance) between the one second electrode 220 and the one fourth electrode 240 may be adjusted by adjusting an overlapping area between the one second electrode 220 and the one fourth electrode 240.

In an embodiment of the present disclosure, at least some of the fourth electrodes 240 may be electrically connected to each other to constitute one electrode group 240pc. For example, FIG. 7 illustratively shows that three fourth electrodes 240 are connected to the same one trace line, for example, such as an auxiliary trace line 240t, to constitute the one electrode group 240pc. Thus, FIG. 7 illustrates that two electrode groups 240pc are arranged along the second direction DR2. However, the number of fourth electrodes 240 constituting one electrode group 240pc is not limited thereto. For example, the number of fourth electrodes 240 constituting one electrode group 240pc may be six, and in this case, the sensor layer 200 may include only one electrode group 240pc.

The sensor layer 200 may further include a plurality of first trace lines 210t and a plurality of second trace lines 220t arranged in the peripheral area 200NA. The first trace lines 210t may be electrically connected to the first electrodes 210 in one-to-one correspondence. The second trace lines 220t may be electrically connected to the second electrodes 220 in one-to-one correspondence. Some of the second trace lines 220t and other second trace lines 220t may be spaced apart from each other with the sensing area 200A interposed therebetween.

The sensor layer 200 may further include a loop trace line 230rt1, a plurality of third trace lines 230rt2, and a plurality of auxiliary trace lines 240t arranged in the peripheral area 200NA. The loop trace line 230rt1 may be referred to as a first loop trace line 230rt1, and the third trace lines 230rt2 may be referred to as second loop trace lines 230rt2.

In an embodiment of the present disclosure, the loop trace line 230rt1 may be electrically connected to all of the third electrodes 230. For example, all of one ends of the third electrodes 230 may be electrically connected to the loop trace line 230rt1. The loop trace line 230rt1 may include a first line portion 231t extending in the first direction DR1 and electrically connected to the third electrodes 230, a second line portion 232t extending in the second direction DR2 from a first end of the first line portion 231t, and a third line portion 233t extending in the second direction DR2 from a second end of the first line portion 231t.

In an embodiment of the present disclosure, the second line portion 232t and the third line portion 233t may serve as the third electrodes 230, and thus, the same effect as a state in which the third electrodes 230 are also arranged in the peripheral area 200NA may be obtained. For example, any one of the second line portion 232t or 1 the third line portion 233t and any one of the third electrodes 230 may form a coil. Thus, the pen PN (e.g., see FIG. 5) located in an area adjacent to the peripheral area 200NA may also be sufficiently charged by a loop including the second line portion 232t or the third line portion 233t.

In an embodiment of the present disclosure, the loop trace line 230rt1 may have a suitable shape surrounding (e.g., around a periphery of) at least a portion of the sensing area 200A. The second line portion 232t and the third line portion 233t may be spaced apart from each other with the sensing area 200A interposed therebetween, and may be arranged in the peripheral area 200NA.

In an embodiment of the present disclosure, the third trace lines 230rt2 may be electrically connected to the third electrodes 230 in one-to-one correspondence. For example, FIG. 7 illustratively shows nine third electrodes 230. Thus, nine third trace lines 230rt2 that one-to-one correspond to the nine third electrodes 230 may be provided.

The loop trace line 230$rt$1 may be electrically connected to one end of one third electrode 230, and one third trace line 230$rt$2 may be electrically connected to another end of the one third electrode 230.

The auxiliary trace lines 240$t$ may be spaced apart from each other with the sensing area 200A interposed therebetween. The auxiliary trace lines 240$t$ may be electrically connected to the electrode groups 240$pc$ in one-to-one correspondence. FIG. 7 illustratively shows that the two electrode groups 240$pc$ are arranged. Thus, the auxiliary trace line 240$t$ connected to the one electrode group 240$pc$ and the auxiliary trace line 240$t$ connected to the other one electrode group 240$pc$ may be spaced apart from each other with the sensing area 200A interposed therebetween. However, the present disclosure is not particularly limited thereto.

The sensor layer 200 may further include a plurality of pads PD arranged in the peripheral area 200NA. FIG. 7 illustratively shows that the pads PD are arranged in one row in the first direction DR1, but the present disclosure is not particularly limited thereto. For example, the pads PD may be arranged in a plurality of rows. The pads PD may be electrically connected to the first trace lines 210$t$, the second trace lines 220$t$, both ends of the loop trace line 230$rt$1, the third trace lines 230$rt$2, and the auxiliary trace lines 240$t$, in a one-to-one correspondence.

The pads PD may include a plurality of charging pads 232$t$P, 230P1, 230P2, 230P3, 230P4, 230P5, 230P6, 230P7, 230P8, 230P9, and 233$t$P. The charging pads 232$t$P, 230P1, 230P2, 230P3, 230P4, 230P5, 230P6, 230P7, 230P8, 230P9, and 233$t$P may be electrically connected to both ends of the loop trace line 230$rt$1 and the third trace lines 230$rt$2 in a one-to-one correspondence. In other words, the charging pads may be electrically connected to the second line portion 232$t$ of the loop trace line 230$rt$1, the third trace lines 230$rt$2, and the third line portion 233$t$ of the loop trace line 230$rt$1 in a one-to-one correspondence.

Figure 8A:
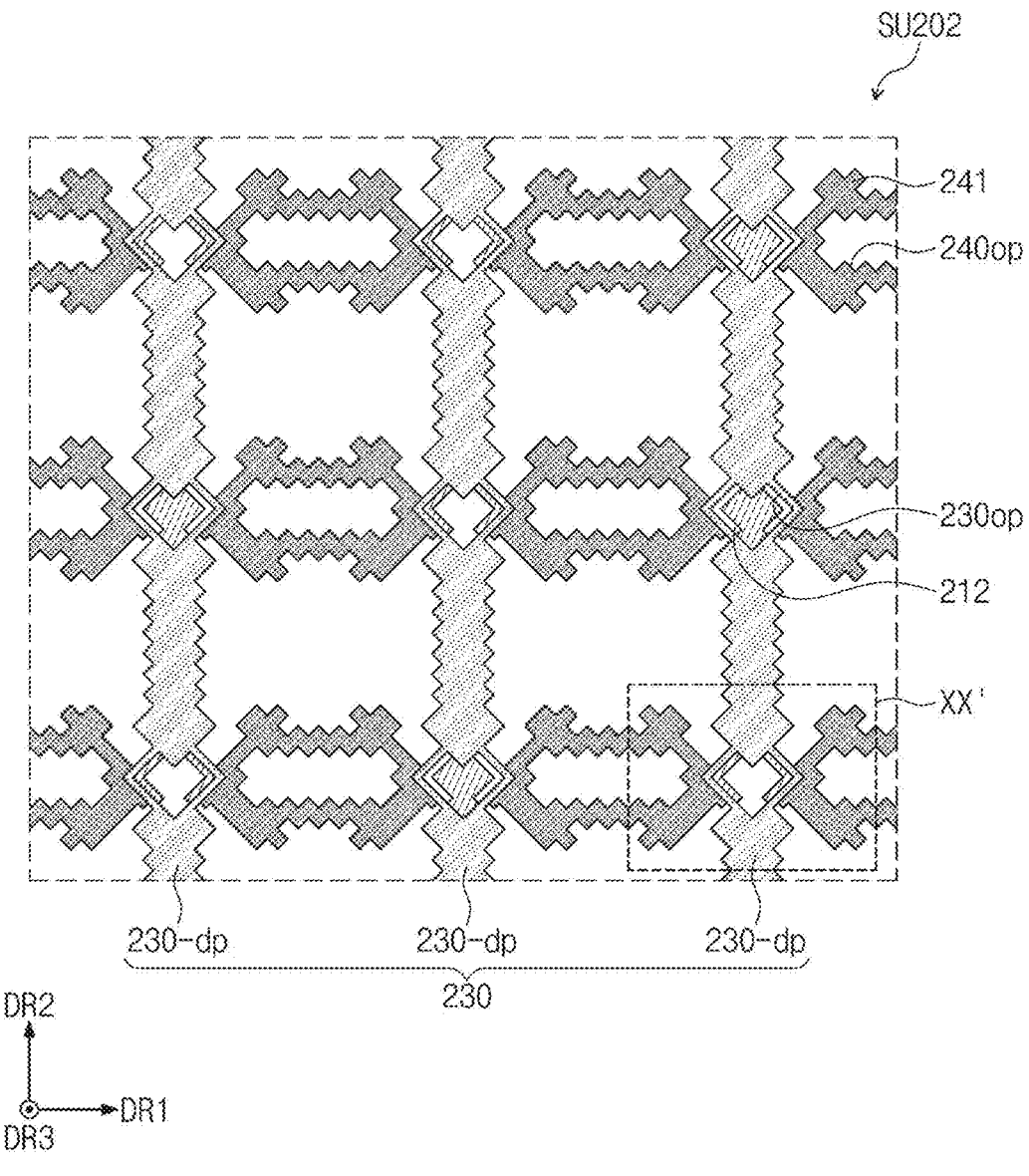
FIG. 8A is a plan view illustrating a first conductive layer of a sensing unit according to an embodiment of the present disclosure.
Figure 8B:
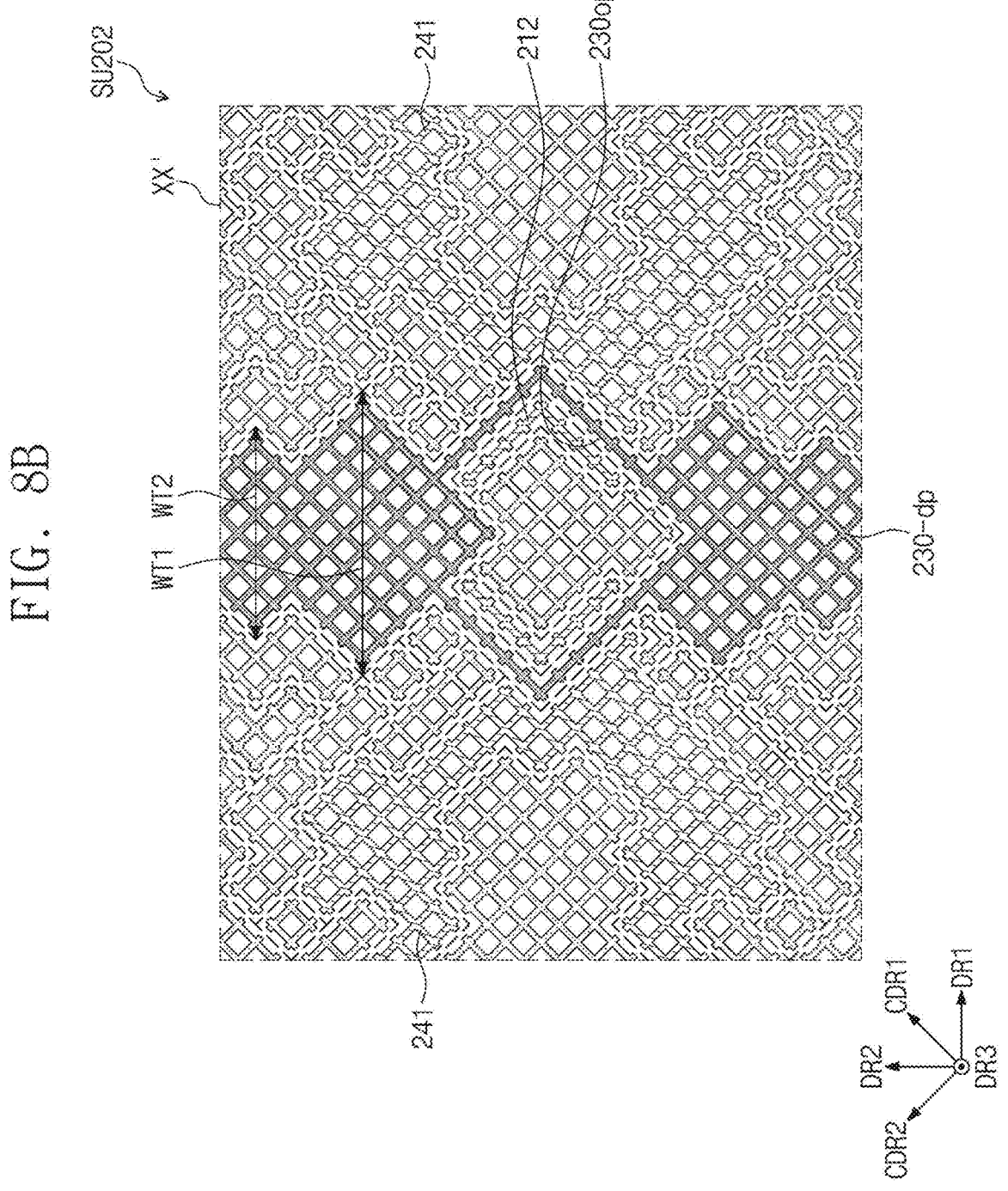
FIG. 8B is an enlarged plan view of the area XX' illustrated in FIG. 8A.
Figure 9A:
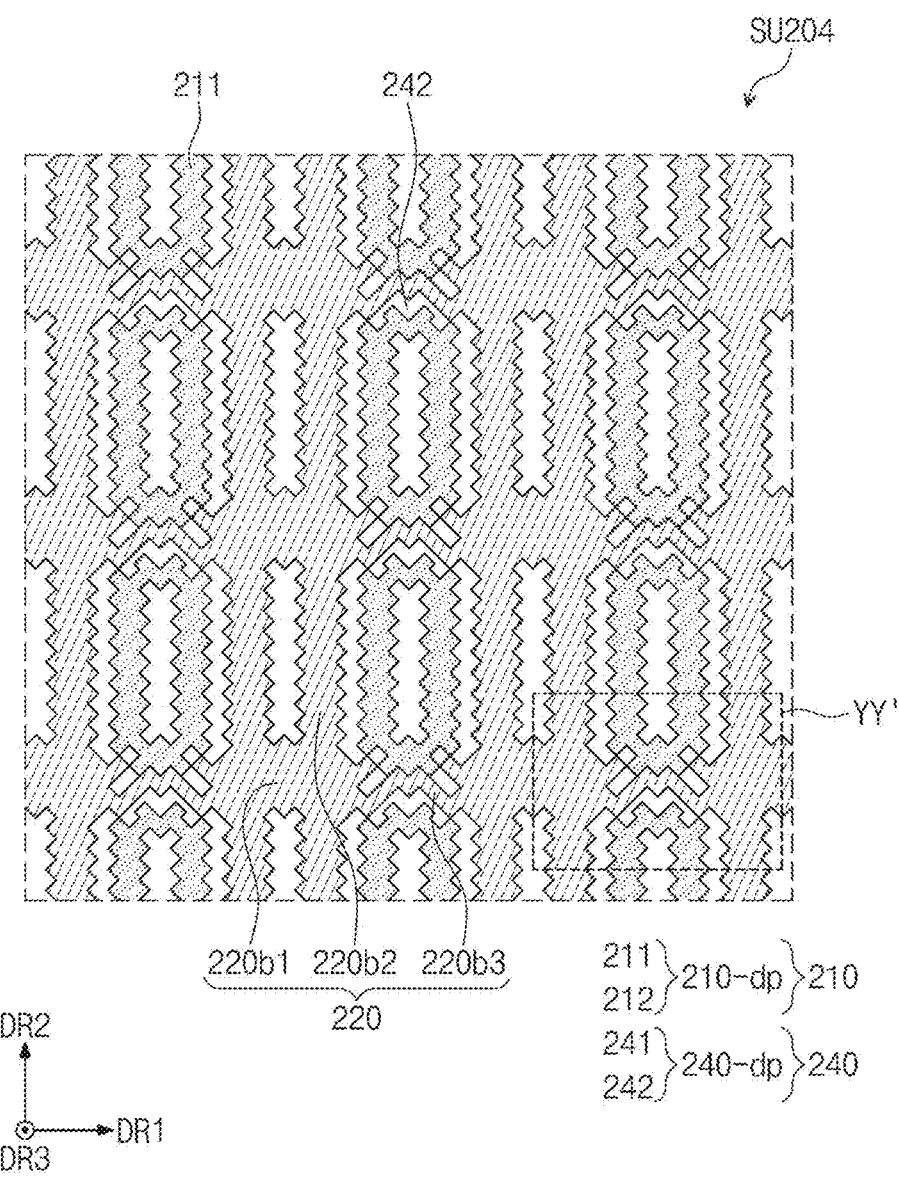
FIG. 9A is a plan view illustrating a second conductive layer of the sensing unit according to an embodiment of the present disclosure.
Figure 9B:
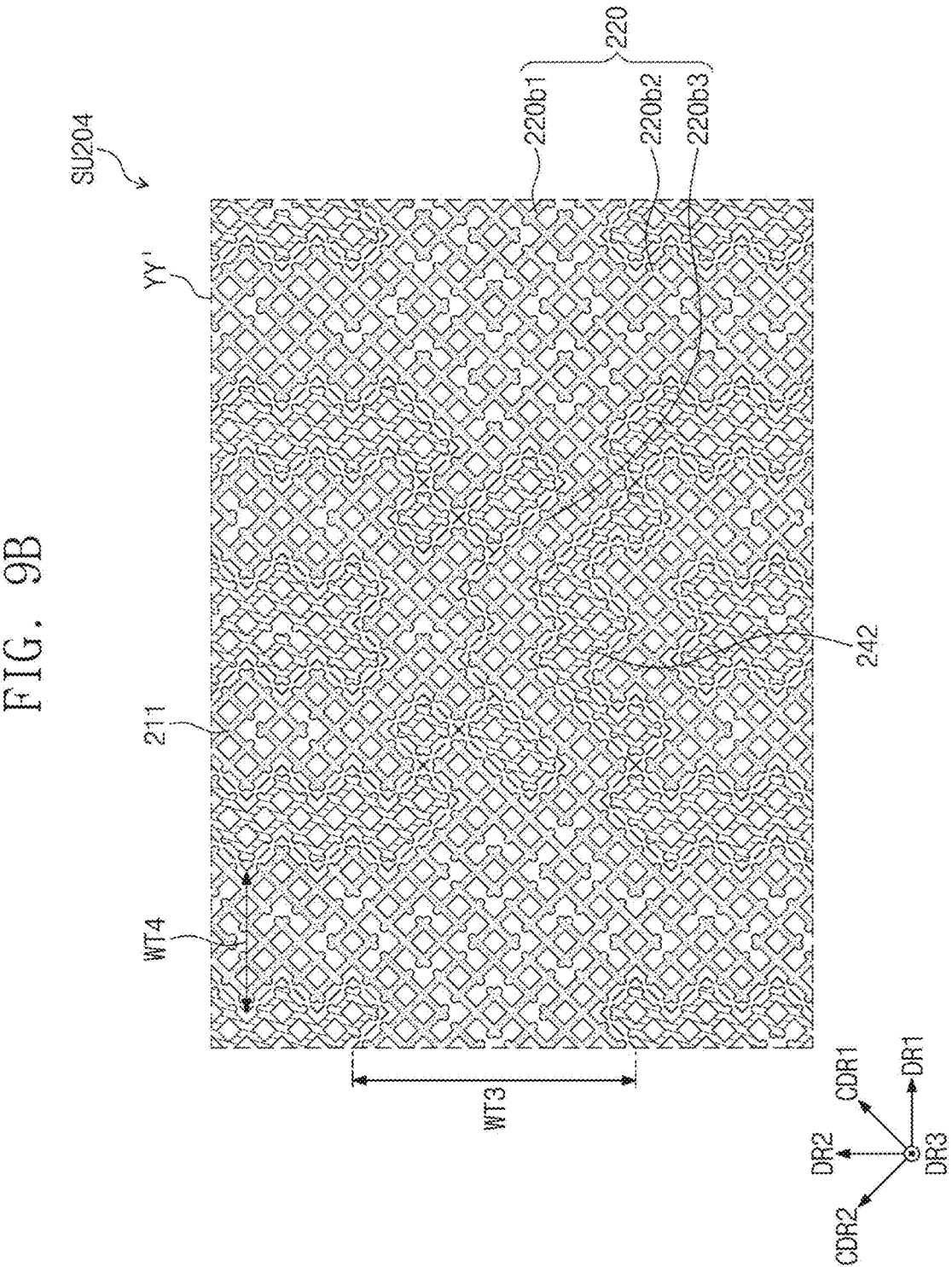
FIG. 9B is an enlarged plan view of the area YY' illustrated in FIG. 9A.

FIG. 8A is a plan view illustrating a first conductive layer SU202 of the sensing unit SU according to an embodiment of the present disclosure. FIG. 8B is an enlarged plan view of the area XX' illustrated in FIG. 8A. FIG. 9A is a plan view illustrating a second conductive layer SU204 of the sensing unit SU according to an embodiment of the present disclosure. FIG. 9B is an enlarged plan view of the area YY' illustrated in FIG. 9A.

FIGS. 8A and 9A briefly illustrate boundaries of respective components by simply using lines, and do not illustrate a shape of a mesh structure. In other words, the lines illustrated in FIGS. 8A and 9A may be understood as corresponding to cutting lines obtained by cutting a mesh structure illustrated in FIGS. 8B and 9B, and the cutting lines are illustrated in FIGS. 8B and 9B using dotted or dashed lines.

However, the shape of the sensing unit SU shown in FIGS. 7, 8A, 8B, 9A, and 9B are illustrated as an example, and the present disclosure is not limited thereto. In other words, the shape of the sensing unit SU may be variously modified as needed or desired.

Referring to FIGS. 7, 8A, 8B, 9A, and 9B, the first electrode 210 may include a plurality of first segmented electrodes 210-$dp$ spaced apart from each other in the first direction DR1. Each of the first segmented electrodes 210-$dp$ may include a plurality of first patterns 211, and a plurality of first bridge patterns 212 electrically connected to the first patterns 211. The first patterns 211 that are spaced apart from each other in the second direction DR2 may be electrically connected to each other by the first bridge patterns 212. Thus, each of the first segmented electrodes 210-$dp$ may extend in the second direction DR2, and the first segmented electrodes 210-$dp$ may be spaced apart from each other in the first direction DR1.

The third electrode 230 may include a plurality of second segmented electrodes 230-$dp$ spaced apart from each other in the first direction DR1. Each of the second segmented electrodes 230-$dp$ may extend in the second direction DR2. The second segmented electrodes 230-$dp$ may be spaced apart from each other in the first direction DR1.

When viewed in the third direction DR3 (e.g., in a plan view), the second segmented electrodes 230-$dp$ may overlap with the first segmented electrodes 210-$dp$ in a one-to-one correspondence. The term "overlapping" as used herein may also include the meaning that at least a portion of the one first segmented electrode 210-$dp$ and at least a portion of the one second segmented electrode 230-$dp$ overlap with each other.

FIGS. 8A and 9A illustratively show that the one sensing unit SU includes three first segmented electrodes 210-$dp$ and three second segmented electrodes 230-$dp$, but the present disclosure is not particularly limited thereto. For example, the number of first segmented electrodes 210-$dp$ and the number of second segmented electrodes 230-$dp$ included in one sensing unit SU may be one, two, or four or more. Each of the first segmented electrodes 210-$dp$ and the second segmented electrodes 230-$dp$ may correspond to a resistance path or a signal transmitting path through which a signal is transmitted.

When compared to a case in which the first electrode 210 inside the one sensing unit SU has a single shape and is not divided, the first electrode 210 inside the one sensing unit SU according to some embodiments includes the first segmented electrodes 210-$dp$, and thus, the first segmented electrodes 210-$dp$ may be arranged inside the one sensing unit SU in a relatively uniform distribution. In this case, the signal may be uniformly provided or sensed inside the one sensing unit SU.

Further, when compared to a case in which the first electrode 210 inside the one sensing unit SU is not divided, the first electrode 210 inside the one sensing unit SU according to some embodiments includes the first segmented electrodes 210-$dp$, and thus, the number of first bridge patterns 212 inside the one sensing unit SU may increase. FIG. 8A illustratively shows that, when the two first bridge patterns 212 connected to the same two first patterns 211 are considered as a pair, nine pairs of first bridge patterns 212 are arranged. In other words, a total of 18 first bridge patterns 212 are illustrated.

In more detail, an increase in the number of first bridge patterns 212 arranged in the first direction DR1 intersecting or crossing the second direction DR2 that is an extension direction of the first electrode 210 may correspond to an increase in a signal path. Thus, as the number of signal paths is increased, a resistance of the first electrode 210 may be decreased. As a result, a sensing sensitivity of the sensor layer 200 may be improved.

Further, the shape of each of the first segmented electrodes 210-$dp$ may be similar to a bar shape extending in the second direction DR2, and as the shape is more similar to the bar shape, a path of the resistance path may be shortened. Thus, when the path of the resistance path is shortened, and the number of resistance paths connected in parallel to each other inside the one first electrode 210 is increased, the resistance of the first electrode 210 may be decreased. As a result, the sensing sensitivity of the sensor layer 200 may be improved.

Further, as the shape of each of the first segmented electrodes 210-*dp* is more similar to the bar shape extending in the second direction DR2, a ratio of an area that may be used in a pattern design inside the entire area of the one sensing unit SU may be increased. Thus, a degree of freedom in a pattern design may be improved.

In an embodiment of the present disclosure, the degree of freedom in the pattern design of the sensing unit SU may be improved, and the resistance of the electrode included in the sensing unit SU may be decreased. In this case, a frequency range (e.g., a bandwidth) applicable to the signal provided to the sensor layer 200 may be more secured. Thus, the degree of freedom in selecting a frequency may be improved.

In an embodiment of the present disclosure, each of the first patterns 211 may have a ring shape, and a portion of each of the second segmented electrodes 230-*dp*, which overlaps with the first patterns 211, may be similar to a bar shape. In this case, an overlapping area between the first electrode 210 and the third electrode 230 may be easily adjusted by adjusting a size of an inner diameter of each of the first patterns 211, a width of each of the second segmented electrodes 230-*dp*, or the like.

In an embodiment of the present disclosure, the first segmented electrode 210-*dp* may include the first patterns 211 and the first bridge patterns 212 arranged at (e.g., in or on) different layers from each other, and the first patterns 211 and the first bridge patterns 212 may be electrically connected to each other through a contact. In this case, the resistance may be relatively increased as compared to a case in which the first patterns 211 and the first bridge patterns 212 are arranged at (e.g., in or on) the same layer as each other and integrally provided with each other.

In an embodiment of the present disclosure, a resistance of a portion of the second segmented electrode 230-*dp*, which overlaps with the first pattern 211, may be lower than a resistance of the first pattern 211. However, the present disclosure is not limited thereto, and a resistance relationship may be changed depending on a width of the ring of the first pattern 211 or a size of a width of the portion of the second segmented electrode 230-*dp*.

The second segmented electrode 230-*dp* may extend in the second direction DR2 inside the same layer. Thus, the resistance due to a layer change inside the second segmented electrode 230-*dp* may not be increased. The second segmented electrode 230-*dp* may be an electrode to which a signal is applied in a charging drive mode, which will be described in more detail below. Thus, as the resistance of the second segmented electrode 230-*dp* is decreased, intensities of a current and a magnetic field for charging a resonant circuit of the pen PN (e.g., see FIG. 5) may be increased.

In an embodiment of the present disclosure, because the portion of each of the second segmented electrodes 230-*dp*, which overlaps with the first patterns 211, is similar to the bar shape, the second segmented electrode 230-*dp* may have a shape of which a width is relatively smaller than that of the first segmented electrode 210-*dp*. In this case, a parasitic capacitance caused in each of the second segmented electrodes 230-*dp* may be decreased. Thus, a performance of the sensor layer 200 may be improved.

Referring to FIG. 8B, the second segmented electrode 230-*dp* may include a first part having a first width WT1 in the first direction DR1, and a second part having a second width WT2 in the first direction DR1. The first width WT1 may be greater than the second width WT2. For example, the first part having the first width WT1 may be closer to the first bridge patterns 212 than the second part having the second width WT2.

On a plane (e.g., in a plan view), the first part having the first width WT1 may overlap with the first patterns 211 to form a capacitance therewith. Further, the second part having the second width WT2 may overlap with a dummy pattern surrounded (e.g., around a periphery thereof) by the first patterns 211. The overlapping area between the first electrode 210 and the third electrode 230 may be easily adjusted by adjusting the second width WT2.

An opening 230*op* may be defined in the second segmented electrode 230-*dp*, and the two first bridge patterns 212 may be arranged in the opening 230*op*. When the first bridge patterns 212 are surrounded (e.g., around peripheries thereof) by the second segmented electrode 230-*dp*, capacitances having values that change depending on temperatures among capacitances generated in the first electrode 210 may be decreased. Thus, temperature characteristics of the sensor layer 200 may be improved.

The second electrode 220 may include a plurality of first branch parts 220*b*1 extending in the first direction DR1, a plurality of second branch parts 220*b*2 extending in the second direction DR2 intersecting or crossing the first direction DR1, and a connection part 220*b*3 disposed between the first patterns 211. The first branch parts 220*b*1 may be spaced apart from each other in the second direction DR2, and the second branch parts 220*b*2 may be spaced apart from each other in the first direction DR1. The first branch parts 220*b*1, the second branch parts 220*b*2, and the connection part 220*b*3 may be connected to each other to have an integral shape.

The fourth electrode 240 may include a plurality of third segmented electrodes 240-*dp* spaced apart from each other in the second direction DR2. Each of the third segmented electrodes 240-*dp* may extend in the first direction DR1. Each of the third segmented electrodes 240-*dp* may include a plurality of second patterns 241, and a plurality of second bridge patterns 242 electrically connected to the second patterns 241. Each of the second patterns 241 may have a ring shape. The second patterns 241 and the second bridge patterns 242 may be electrically connected to each other through contact holes defined in the intermediate insulating layer 203 (e.g., see FIG. 6A). Two adjacent second patterns 241 may be spaced apart from each other with one second segmented electrode 230-*dp* and two first bridge patterns 212 interposed therebetween.

In an embodiment of the present disclosure, a third width WT3 of the first branch parts 220*b*1 in the second direction DR2 may be greater than a fourth width WT4 of the second branch parts 220*b*2 in the first direction DR1. For example, the first branch parts 220*b*1 may overlap with the second patterns 241 and a dummy pattern surrounded (e.g., around a periphery thereof) by the second patterns 241. An overlapping area between the second electrode 220 and the fourth electrode 240 may be easily adjusted by adjusting the third width WT3. As another example, the overlapping area between the second electrode 220 and the fourth electrode 240 may be easily adjusted by adjusting a size of an inner diameter of the ring shape surrounding (e.g., around a periphery of) the dummy pattern of each of the second patterns 241.

In an embodiment of the present disclosure, each of the third segmented electrodes 240-*dp* may include the second patterns 241 and the second bridge patterns 242 arranged at (e.g., in or on) different layers from each other, and the second patterns 241 and the second bridge patterns 242 may be electrically connected to each other through a contact. In this case, the resistance may be relatively increased as compared to a case in which the second patterns 241 and the second bridge patterns 242 are arranged at (e.g., in or on) the same layer as each other and integrally provided with each other.

In an embodiment of the present disclosure, the third electrode 230 corresponds to a component that transmits a signal when a touch is sensed and the pen PN (e.g., see FIG. 5) is sensed, and the fourth electrode 240 corresponds to a component that forms a capacitance together with the third electrode 230 when the pen PN is sensed. Thus, it may be more desirable to reduce a resistance of the third electrode 230 than to reduce a resistance of the fourth electrode 240. Thus, the third electrode 230 may be implemented in the same one layer, and the fourth electrode 240 may be implemented in two different layers.

Referring to FIGS. 9A and 9B, the second bridge pattern 242 may include one line (e.g., only one line) extending in a first intersection direction CDR1 or a second intersection direction CDR2 in a partial section. In this case, the first bridge patterns 212 overlapping with the second bridge patterns 242 may be insulated from and intersect or cross each other in the partial section. In this case, a capacitance between the first bridge pattern 212 and the second bridge pattern 242 may be minimized or reduced.

Referring to FIGS. 8B and 9B, each of the second segmented electrodes 230-dp, the second patterns 241, the first patterns 211, the second electrode 220, and the second bridge patterns 242 may have a mesh structure. Each of the mesh structures may include a plurality of mesh lines. Each of the plurality of mesh lines may have a suitable shape extending in a suitable direction (e.g., a predetermined direction), and the mesh lines may be connected to one another. The shape may be various suitable shapes, such as a straight line, a line having a protrusion, and an uneven line. Openings at least partially surrounded (e.g., around peripheries thereof) by the mesh lines may be defined (e.g., may be provided or formed) in each of the mesh structures. The openings may overlap with the light emitting area PXA (e.g., see FIG. 6A), and the mesh lines may overlap with the non-light emitting area NPXA. However, the present disclosure is not particularly limited thereto.

FIGS. 8B and 9B illustratively show that the mesh structure includes mesh lines extending in the first intersection direction CDR1 that intersects or crosses the first direction DR1 and the second direction DR2, and mesh lines extending in the second intersection direction CDR2 that intersects or crosses the first intersection direction CDR1. However, the extension directions of the mesh lines constituting the mesh structure are not particularly limited to those illustrated in FIGS. 8B and 9B. For example, the mesh structure may include only mesh lines extending in the first direction DR1 and the second direction DR2, or mesh lines extending in the first direction DR1, the second direction DR2, the first intersection direction CDR1, and the second intersection direction CDR2. In other words, the mesh structure may be variously modified into various suitable forms as needed or desired.

In an embodiment of the present disclosure, a first capacitance may be defined between the first electrode 210 and the third electrode 230, and a second capacitance may be defined between the second electrode 220 and the fourth electrode 240. A magnitude of the first capacitance and a magnitude of the second capacitance may be adjusted by the overlapping area between the first electrode 210 and the third electrode 230 and the overlapping area between the second electrode 220 and the fourth electrode 240.

As the first capacitance and the second capacitance are increased, an amount of an induced current transmitted from the third electrode 230 to the first electrode 210 may be increased, and an amount of an induced current transmitted from the fourth electrode 240 to the second electrode 220 may be increased. Thus, as the first capacitance and the second capacitance are increased, a sensing performance of the pen PN (e.g., see FIG. 5) in the sensor layer 200 may be improved. Further, the first capacitance and the second capacitance may act as loads when the touch is sensed. Thus, as the first capacitance and the second capacitance are decreased, a touch sensing performance may be improved.

According to some embodiments of the present disclosure, the overlapping area between the first electrode 210 and the third electrode 230 and the overlapping area between the second electrode 220 and the fourth electrode 240 may be easily adjusted. Thus, the sensor layer 200 having appropriate capacitances considering a desired touch sensitivity and a desired sensing sensitivity of the pen PN (e.g., see FIG. 5) may be provided. As a result, the electronic device 1000 (e.g., see FIG. 1A) having both an improved touch sensitivity and an improved sensing sensitivity of the pen PN (e.g., see FIG. 5) may be provided.

In an embodiment of the present disclosure, in the second conductive layer SU204 inside the one sensing unit SU, an area occupied by the components included in the first electrode 210 and the second electrode 220 may be greater than an area occupied by the components included in the third electrode 230 and the fourth electrode 240. A change in a capacitance due to the first input 2000 (e.g., see FIG. 4) may be greater as a distance therefrom becomes shorter. Thus, components for sensing the first input 2000 (e.g., see FIG. 4) may be arranged in a relatively larger area in a layer adjacent to (e.g., closer to) a surface of the electronic device 1000 (e.g., see FIG. 1A). As a result, a touch performance may be improved.

Figure 10:
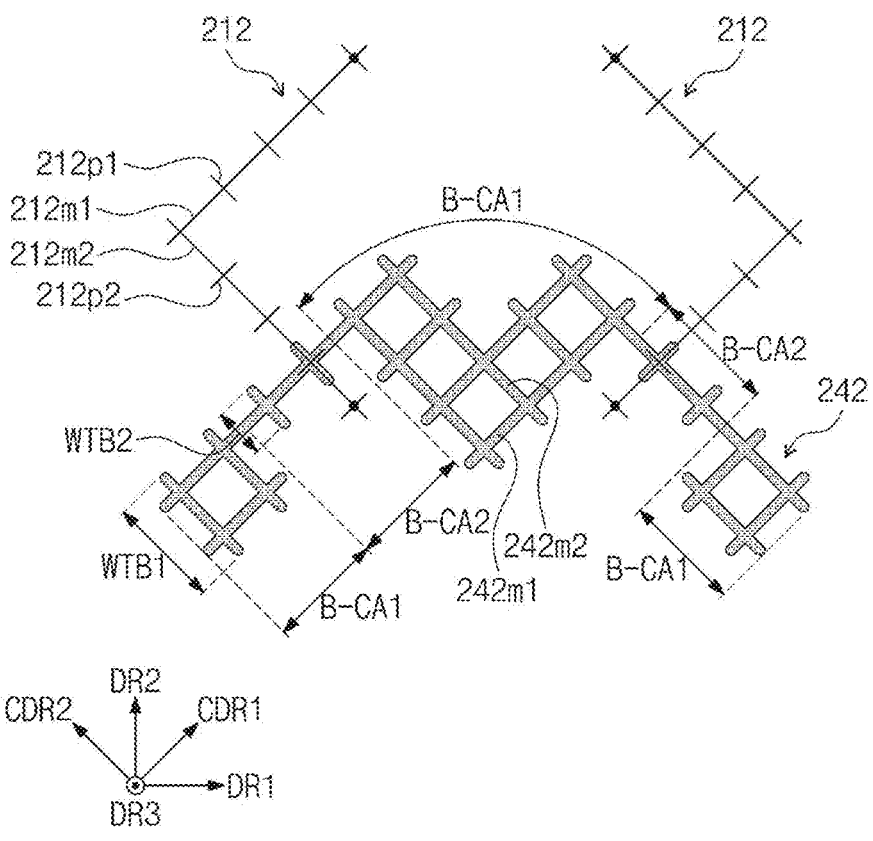
FIG. 10 is a plan view illustrating some components of the sensing unit according to an embodiment of the present disclosure.

FIG. 10 is a plan view illustrating some components of the sensing unit SU according to an embodiment of the present disclosure.

FIG. 10 illustratively shows one second bridge pattern 242, and two first bridge patterns 212 overlapping with the one second bridge pattern 242.

Each of the first bridge patterns 212 may include a first main line 212m1 extending in the first intersection direction CDR1, and a second main line 212m2 extending in the second intersection direction CDR2. One end of the first main line 212m1 and one end of the second main line 212m2 may intersect or cross each other. The first bridge pattern 212 may further include a plurality of first protrusion lines 212p1 intersecting or crossing the first main line 212m1, and a plurality of second protrusion lines 212p2 intersecting or crossing the second main line 212m2. The first protrusion lines 212p1 may be spaced apart from each other in the first intersection direction CDR1, and the second protrusion lines 212p2 may be spaced apart from each other in the second intersection direction CDR2. In an embodiment of the present disclosure, the first protrusion lines 212p1 and the second protrusion lines 212p2 may be omitted as needed or desired.

The second bridge pattern 242 may include first lines 242m1 extending in the first intersection direction CDR1, and second lines 242m2 extending in the second intersection direction CDR2. In an embodiment of the present disclosure, the second bridge pattern 242 may include first parts B-CA1 in which the two or more first lines 242m1 and the two or more second lines 242m2 intersect or cross each other, and second parts B-CA2 in which the one first line 242m1 and the one or more second lines 242m2 intersect or cross each other, or the one or more first lines 242m1 and the one second line 242*m*2 intersect or cross each other. The second parts B-CA2 may intersect or cross the first bridge patterns 212, respectively.

In an embodiment of the present disclosure, each of the first parts B-CA1 may include at least two lines extending in the same direction as each other, and each of the second parts B-CA2 may include only one line extending in the same direction. Thus, a first minimum width WTB1 of the first parts B-CA1 may be greater than a second minimum width WTB2 of the second parts B-CA2.

The first bridge patterns 212 overlapping with the second bridge patterns 242 may be insulted from and intersect or cross each other in the second parts B-CA2. In this case, a capacitance between the first bridge patterns 212 and the second bridge patterns 242 may be decreased. Further, the remaining portions of the second bridge patterns 242, which do not overlap with the first bridge patterns 212, are provided in the form in which the two or more first lines 242*m*1 and the two or more second lines 242*m*2 intersect or cross each other, and thus, a probability that the second bridge patterns 242 may be visually recognized may be decreased due to a difference in an external light reflectance.

Figure 11:
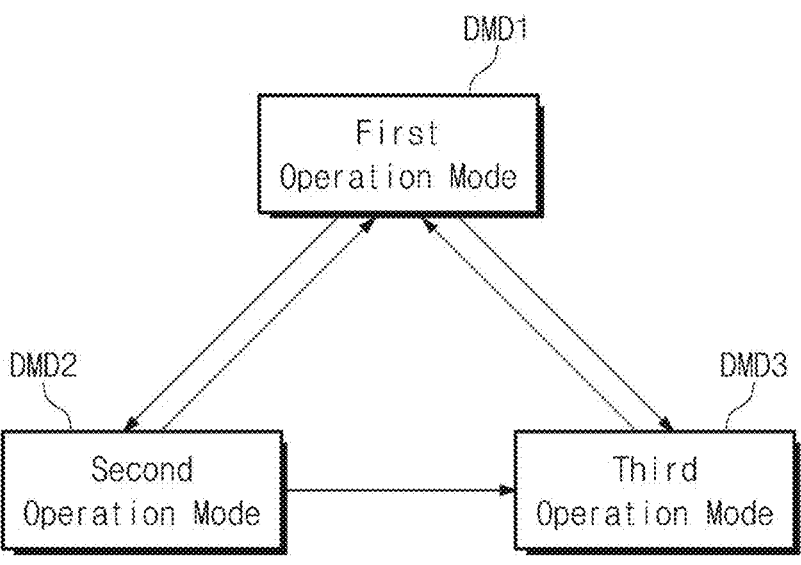
FIG. 11 is a view illustrating an operation of a sensor driving circuit according to an embodiment of the present disclosure.

FIG. 11 is a view illustrating an operation of the sensor driving circuit 2000 according to an embodiment of the present disclosure.

Referring to FIGS. 5 and 11, the sensor driving circuit 2000 may be selectively driven in one of a first operation mode DMD1, a second operation mode DMD2, and a third operation mode DMD3.

The first operation mode DMD1 may be referred to as a touch and pen PN waiting mode, the second operation mode DMD2 may be referred to as a touch activation and pen PN waiting mode, and the third operation mode DMD3 may be referred to as a pen PN activation mode. The first operation mode DMD1 may be a mode that waits for the first input 2000 and the second input 3000. The second operation mode DMD2 may be a mode that senses the first input 2000, and waits for the second input 3000. The third operation mode DMD3 may be a mode that senses the second input 3000.

In an embodiment of the present disclosure, the sensor driving circuit 2000 may be first driven in the first operation mode DMD1. When the first input 2000 is sensed in the first operation mode DMD1, the sensor driving circuit 2000 may be switched (e.g., changed) to the second operation mode DMD2. As another example, when the second input 3000 is sensed in the first operation mode DMD1, the sensor driving circuit 2000 may be switched (e.g., changed) to the third operation mode DMD3.

In an embodiment of the present disclosure, when the second input 3000 is sensed in the second operation mode DMD2, the sensor driving circuit 2000 may be switched to the third operation mode DMD3. When the first input 2000 is released (e.g., not sensed) in the second operation mode DMD2, the sensor driving circuit 2000 may be switched to the first operation mode DMD1. When the second input 3000 is released (e.g., not sensed) in the third operation mode DMD3, the sensor driving circuit 2000 may be switched to the first operation mode DMD1.

Figure 12:
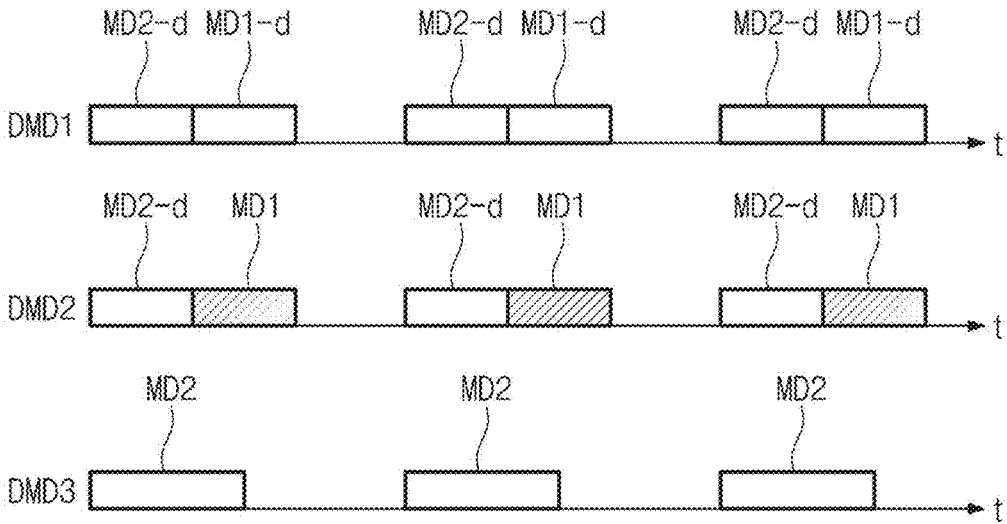
FIG. 12 is a view illustrating an operation of the sensor driving circuit according to an embodiment of the present disclosure.

FIG. 12 is a view illustrating the operation of the sensor driving circuit 2000 according to an embodiment of the present disclosure.

FIGS. 5, 11, and 12 illustratively show operations in the first operation mode DMD1, the second operation mode DMD2, and the third operation mode DMD3 in the order of time "t."

In the first operation mode DMD1, the sensor driving circuit 2000 may be repeatedly driven in a second mode MD2-*d* and a first mode MD1-*d*. During the second mode MD2-*d*, the sensor layer 200 may be scan-driven to detect the second input 3000. During the first mode MD1-*d*, the sensor layer 200 may be scan-driven to detect the first input 2000. FIG. 12 illustratively shows that the sensor driving circuit 2000 is continuously operated in the first mode MD1-*d* after the second mode MD2-*d*, but the order thereof is not limited thereto.

In the second operation mode DMD2, the sensor driving circuit 2000 may be repeatedly driven in the second mode MD2-*d* and a first mode MD1. During the second mode MD2-*d*, the sensor layer 200 may be scan-driven to detect the second input 3000. During the first mode MD1, the sensor layer 200 may be scan-driven to detect coordinates by the first input 2000.

In the third operation mode DMD3, the sensor driving circuit 2000 may be driven in a second mode MD2. During the second mode MD2, the sensor layer 200 may be scan-driven to detect coordinates by the second input 3000. In the third operation mode DMD3, the sensor driving circuit 2000 may not be operated in the first mode MD1-*d* or MD1 until the second input 3000 is released (e.g., not sensed).

Referring to FIG. 7 together, in the first mode MD1-*d* and the first mode MD1, all the third electrodes 230 and fourth electrodes 240 may be grounded, or a constant or substantially constant voltage may be applied thereto. As another example, in the first mode MD1-*d* and the first mode MD1, all the third electrodes 230 and the fourth electrodes 240 may be floating (e.g., electrically floating). As another example, in the first mode MD1-*d* and the first mode MD1, a signal having the same or substantially the same phase as that of a transmission signal provided to the first electrodes 210 may be applied to the third electrodes 230 and the fourth electrodes 240. In this case, a touch noise may be prevented or substantially prevented from being introduced through the third electrodes 230 and the fourth electrodes 240.

In the second mode MD2-*d* and the second mode MD2, one end of each of the third electrodes 230 and the fourth electrodes 240 may be floating. Further, in the second mode MD2-*d* and the second mode MD2, the other end (e.g., the opposite end) of each of the third electrodes 230 and the fourth electrodes 240 may be grounded or floating. Thus, a compensation for the sensing signal may be maximized or increased by a coupling between the first electrodes 210 and the third electrodes 230 and a coupling between the second electrodes 220 and the fourth electrodes 240.

Figure 13:
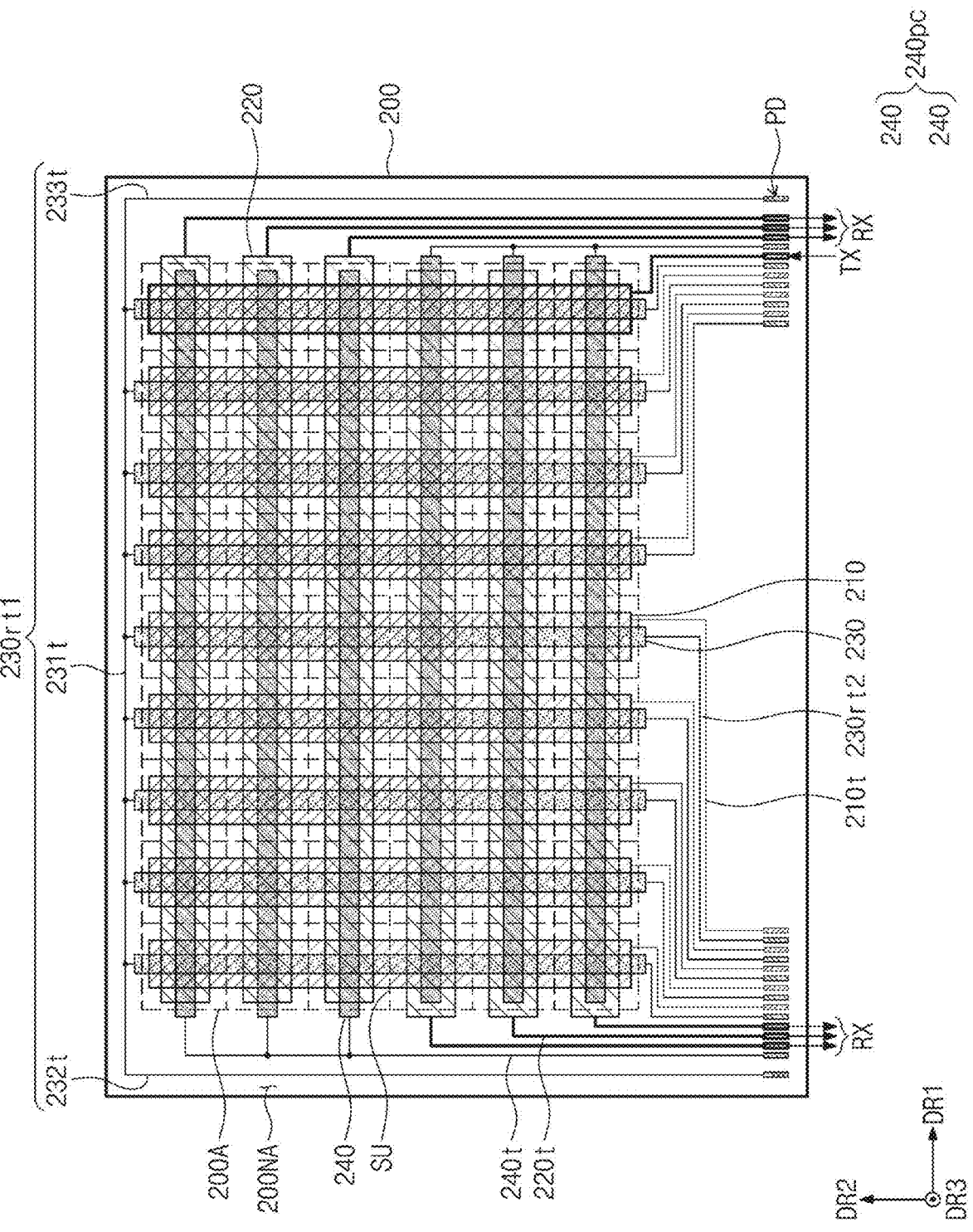
FIG. 13 is a view illustrating a first mode according to an embodiment of the present disclosure.

FIG. 13 is a view illustrating the first modes MD1-*d* and MD1 according to an embodiment of the present disclosure.

Referring to FIGS. 5, 12, and 13, the first mode MD1-*d* of the first operation mode DMD1 and the first mode MD1 of the second operation mode DMD2 may include a mutual capacitance detecting mode. FIG. 13 is a view illustrating the mutual capacitance detecting mode in the first mode MD1-*d* of the first operation mode DMD1 and the first mode MD1 of the second operation mode DMD2.

In the mutual capacitance detecting mode, the sensor driving circuit 2000 may sequentially provide a transmission signal TX to the first electrodes 210, and may detect coordinates for the first input 2000 using a reception signal RX detected through the second electrodes 220. For example, the sensor driving circuit 2000 may calculate input coordinates by sensing a change in a mutual capacitance between the first electrodes 210 and the second electrodes 220.

FIG. 13 illustratively shows that the transmission signal TX is provided to one first electrode 210, and the reception signal RX is output from the second electrodes 220. For convenience of illustration of the signal, in FIG. 13, the one first electrode 210 to which the transmission signal TX is provided is indicated in bold. The sensor driving circuit 2000 may detect input coordinates for the first input 2000 by sensing the change in the capacitance between the first electrodes 210 and the second electrodes 220.

In an embodiment of the present disclosure, at least one of the first mode MD1-*d* of the first operation mode DMD1 or the first mode MD1 of the second operation mode DMD2 may further include a self-capacitance detecting mode. In the self-capacitance detecting mode, the sensor driving circuit 2000 may output driving signals to the first electrodes 210 and the second electrodes 220, and may calculate input coordinates by sensing a change in a capacitance of each of the first electrodes 210 and the second electrodes 220.

Figure 14:
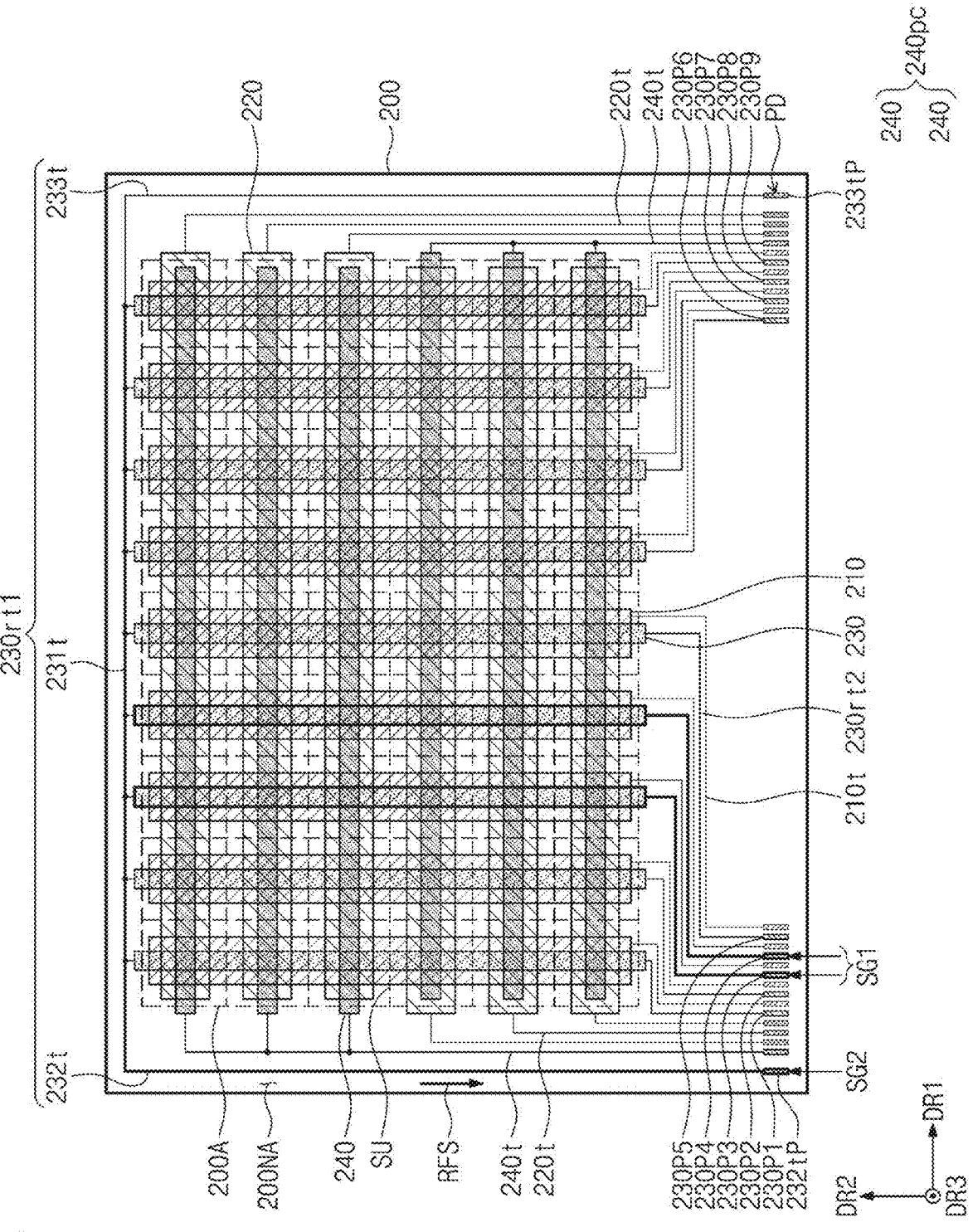
FIG. 14 is a view illustrating a second mode according to an embodiment of the present disclosure.
Figure 15A:
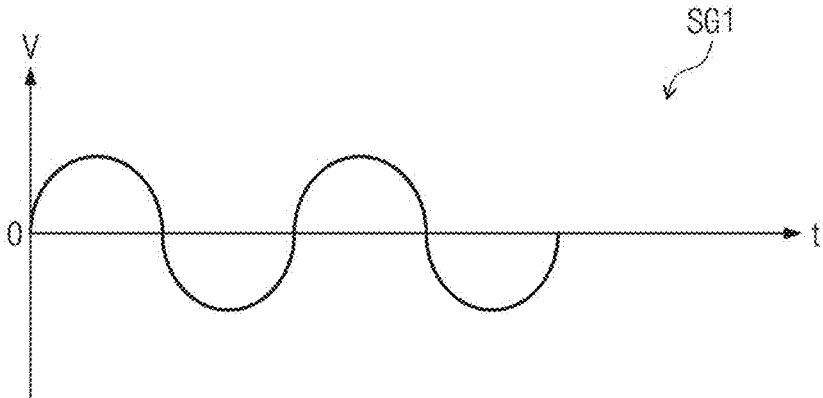
FIG. 15A is a graph depicting a waveform of a first signal according to an embodiment of the present disclosure.
Figure 15B:
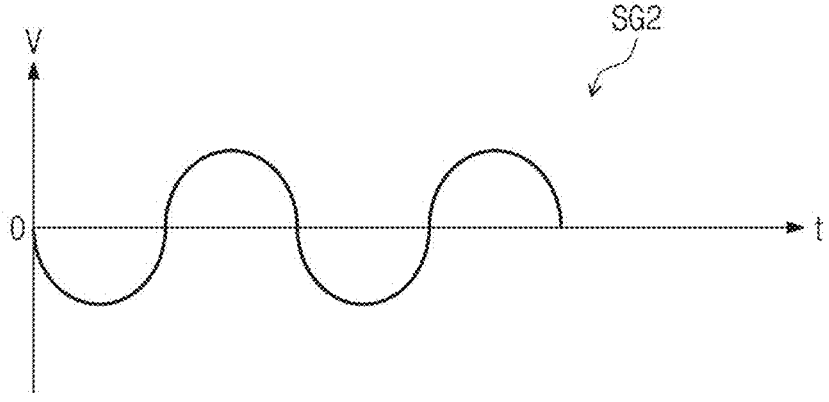
FIG. 15B is a graph depicting a waveform of a second signal according to an embodiment of the present disclosure.

FIG. 14 is a view illustrating the second modes MD2-*d* and MD2 according to an embodiment of the present disclosure. FIG. 15A is a graph depicting a waveform of a first signal SG1 according to an embodiment of the present disclosure. FIG. 15B is a graph depicting a waveform of a second signal SG2 according to an embodiment of the present disclosure.

Referring to FIGS. 14, 15A, and 15B, the second modes MD2-*d* and MD2 may include the charging drive mode. The charging drive mode may include a searching charging drive mode and a tracking charging drive mode.

The searching charging drive mode may be a drive mode before a position of the pen is sensed. Thus, the sensor driving circuit 2000 may sequentially output the first signal SG1 or the second signal SG2 to all of the pads PD included in the sensor layer 200. In other words, in the searching charging drive mode, the entire area of the sensor layer 200 may be sequentially scanned. In the searching charging drive mode, when the pen PN is sensed, the sensor layer 200 may be driven for tracking charging. For example, in the tracking charging drive mode, the sensor driving circuit 2000 may output the first signal SG1 and the second signal SG2 to an area overlapping with a point at which the pen PN is sensed, instead of (e.g., not) to the entire sensor layer 200.

In the charging drive mode, the sensor driving circuit 2000 may apply the first signal SG1 to one or more pads and the second signal SG2 to another pad. The second signal SG2 may be an inverse signal of the first signal SG1. For example, the first signal SG1 may be a sinusoidal signal.

Because the first signal SG1 and the second signal SG2 may be output to at least two pads, a current RFS may have a current path flowing through the one or more pads to the one or more other pads. The current path may also be referred to as a charging loop. Further, because the first signal SG1 and the second signal SG2 may be sinusoidal signals having an inverse phase relationship with each other, a direction of the current RFS may be changed periodically. In an embodiment of the present disclosure, the first signal SG1 and the second signal SG2 may be square wave signals having an inverse phase relationship with each other.

When the first signal SG1 and the second signal SG2 have the inverse phase relationship with each other, a noise caused in the display layer 100 (e.g., see FIG. 4) by the first signal SG1 may be canceled with a noise caused by the second signal SG2. Thus, a flicker phenomenon may not occur in the display layer 100, and a display quality of the display layer 100 may be improved.

In an embodiment of the present disclosure, the first signal SG1 may be a sinusoidal signal. However, the present disclosure is not limited thereto, and the first signal SG1 may be a square wave signal. Further, the second signal SG2 may have a constant or substantially constant voltage (e.g., a predetermined constant voltage). For example, the second signal SG2 may be a ground voltage. In other words, the pad to which the second signal SG2 is applied may be considered as being grounded. Even in this case, the current RFS may flow from the one or more pads to the other one pad. Further, even when the other one pad is grounded, the first signal SG1 may be a sinusoidal wave signal or a square wave signal, and thus, the direction of the current RFS may be changed periodically.

FIG. 14 illustrates that the first signal SG1 is provided to two pads 230P3 and 230P4 connected to the two third trace lines 230*rt*2, and the second signal SG2 is provided to one pad 232*t*P connected to the second line portion 232*t* of the loop trace line 230*rt*1. The current RFS may flow through the charging loop defined by the two third trace lines 230*rt*2, the two third electrodes 230 connected to the two third trace lines 230*rt*2, and a portion of the loop trace line 230*rt*1. The charging loop may have a coil shape. Thus, in the charging drive mode of the second modes MD2-*d* and MD2, a resonance circuit of the pen PN (e.g., refer to FIG. 5) may be charged by the charging loop.

According to some embodiments of the present disclosure, the charging loop having a loop coil pattern may be implemented by the components included in the sensor layer 200. Thus, the electronic device 1000 (e.g., see FIG. 1A) may charge the pen PN (e.g., see FIG. 5) using the sensor layer 200. Thus, because a component having a coil for charging the pen PN (e.g., see FIG. 5) may not be separately added, an increase in a thickness, an increase in a weight, and a decrease in a flexibility of the electronic device 1000 (e.g., see FIG. 1A) due to a separately added component may not occur.

In the charging drive mode, the first electrodes 210, the second electrodes 220, and the fourth electrodes 240 may be grounded or electrically floating, or a constant or substantially constant voltage may be applied thereto. In more detail, the first electrodes 210, the second electrodes 220, and the fourth electrodes 240 may be floating. In other words, no signal may be provided to the pads PD connected to the first electrodes 210, the second electrodes 220, and the fourth electrodes 240. In this case, the current RFS may not flow through the first electrodes 210, the second electrodes 220, and the fourth electrodes 240.

FIG. 16A is a table representing signals provided to the sensor layer 200 according to an embodiment of the present disclosure.

FIGS. 14 and 16A illustratively show signals provided from first to eighth time sections t1, t2, t3, t4, t5, t6, t7, and t8 to the charging pads 232*t*P, 230P1, 230P2, 230P3, 230P4, 230P5, 230P6, 230P7, 230P8, 230P9, and 233*t*P.

The signals listed in the table illustrated in FIG. 16A are signals provided to the sensor layer 200 in the searching charging drive mode. Thus, because a position of the pen PN (e.g., see FIG. 5) is not sensed, the first signal SG1 or the second signal SG2 may be sequentially provided to the total charging pads 232*t*P, 230P1, 230P2, 230P3, 230P4, 230P5, 230P6, 230P7, 230P8, 230P9, and 233*t*P included in the sensor layer 200. In other words, in the searching charging drive mode, the entire area of the sensor layer 200 may be scanned.

In the second mode MD2, the charging drive mode and the pen sensing drive mode may be alternately repeated. For example, during the first time section t1, the sensor layer 200 may be operated in the charging drive mode, and then may be operated in the pen sensing drive mode. When the pen PN is not sensed, the sensor layer 200 may be operated in the charging drive mode again during the second time section t2.

As another example, when the pen PN is sensed, the sensor layer 200 may provide the first signal SG1 or the second signal SG2 to some pads including the sensed position of the pen PN, which may be referred to as the tracking charging drive mode. For example, during the tracking charging drive mode, operations corresponding to at least some of the first to eighth time sections t1, t2, t3, t4, t5, t6, t7, and t8 illustrated in FIG. 16A may be performed depending on the position of the pen PN (e.g., see FIG. 5).

The charging pads 232tP, 230P1, 230P2, 230P3, 230P4, 230P5, 230P6, 230P7, 230P8, 230P9, and 233tP may be referred to as the first charging pad 232tP, the second charging pad 230P1, the third charging pad 230P2, the fourth charging pad 230P3, the fifth charging pad 230P4, the sixth charging pad 230P5, the seventh charging pad 230P6, the eighth charging pad 230P7, the ninth charging pad 230P8, the tenth charging pad 230P9, and the eleventh charging pad 233tP.

The first charging pad 232tP and the eleventh charging pad 233tP may be electrically connected to both ends (e.g., opposite ends) of the loop trace line 230rt1. For example, the first charging pad 232tP may be electrically connected to the second line portion 232t of the loop trace line 230rt1, and the eleventh charging pad 233tP may be electrically connected to the third line portion 233t of the loop trace line 230rt1.

The second charging pad 230P1, the third charging pad 230P2, the fourth charging pad 230P3, the fifth charging pad 230P4, the sixth charging pad 230P5, the seventh charging pad 230P6, the eighth charging pad 230P7, the ninth charging pad 230P8, and the tenth charging pad 230P9 may be electrically connected to the third trace lines 230rt2 in a one-to-one correspondence.

In an embodiment of the present disclosure, in the first time section t1, the first signal SG1 may be provided to the fourth charging pad 230P3 and the fifth charging pad 230P4, and the second signal SG2 may be provided to the first charging pad 232tP. A signal may not be provided to the other charging pads 230P1, 230P2, 230P5, 230P6, 230P7, 230P8, 230P9, and 233tP.

When the pen PN is still not sensed, in the second time section t2, the first signal SG1 may be provided to the fifth charging pad 230P4 and the sixth charging pad 230P5, and the second signal SG2 may be provided to the first charging pad 232tP and the second charging pad 230P1. A signal may be not provided to the other charging pads 230P2, 230P3, 230P6, 230P7, 230P8, 230P9, and 233tP. Thereafter, when the pen PN is not continuously sensed, the pads to which the first signal SG1 and the second signal SG2 are provided may be shifted by one pad during the third to eighth time sections t3, t4, t5, t6, t7, and t8.

In an embodiment of the present disclosure, before the position of the pen PN is sensed, in the first to eighth time sections t1, t2, t3, t4, t5, t6, t7, and t8, the number of gap pads between the pads to which the first signal SG1 is provided and the pads to which the second signal SG2 is provided may be maintained to be the same. Thereafter, when the pen PN is sensed or the mode is changed, at least one of the number of gap pads, the number of charging pads to which the first signal SG1 is provided, and the number of charging pads to which the second signal SG2 is provided may be changed.

FIG. 16B is a table representing signals provided to the sensor layer 200 according to an embodiment of the present disclosure.

FIGS. 14 and 16B illustratively show signals provided from first to seventh time sections t1, t2, t3, t4, t5, t6, and t7 to the charging pads 232tP, 230P1, 230P2, 230P3, 230P4,

230P5, 230P6, 230P7, 230P8, 230P9, and 233tP. Hereinafter, the same or substantially the same components as those described above with reference to FIG. 16A are designated by the same reference numerals, and thus, redundant description thereof may not be repeated.

The signals shown in the table illustrated in FIG. 16B may be signals provided to the sensor layer 200 in a searching drive mode and a tracking drive mode. Thus, the signals may be provided in both a state in which the position of the pen PN (e.g., see FIG. 5) is sensed and a state in which the position of the pen PN is not sensed.

Because the position of the pen PN (e.g., see FIG. 5) is not sensed in the searching drive mode, the entire area of the sensor layer 200 may be scanned as described above with reference to FIG. 16A. Thus, the signals provided to the sensor layer 200 in the first time section t1 may be the same as those illustrated in FIG. 16A.

In an embodiment of the present disclosure, when the pen PN is still not sensed, in the second time section t2, the first signal SG1 may be provided to the fifth charging pad 230P4 and the sixth charging pad 230P5, and the second signal SG2 may be provided to the second charging pad 230P1 and the third charging pad 230P2. A signal may be not provided to the other charging pads 232tP, 230P3, 230P6, 230P7, 230P8, 230P9, and 233tP.

Thereafter, when the pen PN is not continuously sensed, the pads to which the first signal SG1 and the second signal SG2 are provided may be shifted by one pad during the third to seventh time sections t3, t4, t5, t6, and t7. For example, when the pen PN is still not sensed in the seventh time section t7, the first signal SG1 may be provided to the eleventh charging pad 233tP, and the second signal SG2 may be provided to the seventh charging pad 230P6 and the eighth charging pad 230P7. A signal may be not provided to the other charging pads 232tP, 230P1, 230P2, 230P3, 230P4, 230P5, 230P8, and 230P9.

In an embodiment of the present disclosure, even in the tracking drive mode, the signals shown in the table illustrated in FIG. 16B may be provided to the sensor layer 200. Thus, in the tracking drive mode, because the position of the pen PN (e.g., see FIG. 5) is sensed, an operation corresponding to at least some of the first to seventh time sections t1, t2, t3, t4, t5, t6, and t7 illustrated in FIG. 16B may be performed depending on a position of the pen PN that approaches the sensor layer 200.

In an embodiment of the present disclosure, when the first time section t1 and the second time section t2 are compared with each other, the numbers of charging pads to which the first signal SG1 and the second signal SG2 are provided may different from each other. For example, the number of charging pads 230P3, 230P4, and 232tP to which the first signal SG1 and the second signal SG2 are provided may be three in the first time section t1, and the number of charging pads 230P1, 230P2, 230P4, and 230P5 to which the first signal SG1 and the second signal SG2 are provided may be four in the second time section t2.

In an embodiment of the present disclosure, when the first time section t1 and the second time section t2 are compared with each other, the number of charging pads to which a signal is not provided between the charging pads to which the first signal SG1 is provided and the charging pads to which the second signal SG2 is provided may be different from each other. For example, in the first time section t1, the number of charging pads 230P1 and 230P2 between the charging pads 230P3 and 230P4 to which the first signal SG1 is provided and the charging pad 232tP to which the second signal SG2 is provided may be two, and in the second time section t2, and the number of charging pads 230P3 between the charging pads 230P4 and 230P5 to which the first signal SG1 is provided and the charging pads 230P1 and 230P2 to which the second signal SG2 is provided may be one.

Referring to FIG. 14 together, in the first time section t1, the first charging pad 232tP to which the second signal SG2 is provided is electrically connected to the second line portion 232t of the loop trace line 230rt1, and in the second time section t2, the second charging pad 230P1 and the third charging pad 230P2 to which the second signal SG2 is provided are electrically connected to the third electrodes 230. The loop trace line 230rt1 may have a solid shape in which an opening is not defined, and the third electrodes 230 may be formed in a mesh wiring line structure in which an opening is defined. Thus, a difference in a resistance between the loop trace line 230rt1 and each of the third electrodes 230 may occur, and the resistances of the second line portion 232t and the third line portion 233t may be smaller than the resistance of the one third electrode 230.

In FIG. 16B, as compared to the first time section t1 and the seventh time section t7 in which the second line portion 232t and the third line portion 233t of the loop trace line 230rt1, in the other time sections t2, t3, t4, t5, and t6, the number of charging pads to which the first signal SG1 and the second signal SG2 are provided, and the number of charging pads, to which a signal is not provided, between the charging pads to which the first signal SG1 is provided and the charging pads to which the second signal SG2 is provided is decreased. In this case, a difference between a resistance (hereinafter, referred to as a first resistance) of the charging loop (hereinafter, referred to as a first charging loop) formed in each of the first time section t1 and the seventh time section t7 and a resistance (hereinafter, referred to as a second resistance) of a charging loop (hereinafter, referred to as a second charging loop) formed in each of the other time sections t2, t3, t4, t5, and t6 may be reduced.

Even when the difference between the first resistance and the second resistance is reduced, the second resistance may be greater than the first resistance. For example, when it is referenced that the resistance of the first charging loop is 100%, the resistance of the second charging loop may be 126%.

According to an embodiment of the present disclosure, a contact sensitivity may be made uniform by adjusting the number of gap pads. For example, the number of gap pads in each of the first time section t1 and the seventh time section t7 is two, and may be different from the number of gap pads in each of the other time sections t2, t3, t4, t5, and t6. For example, the number of gap pads in each of the first time section t1 and the seventh time section t7 is two, and the number of gap pads in each of the other time sections t2, t3, t4, t5, and t6 may be one. As the number of gap pads decreases, an area of a magnetic field may decrease, and a magnetic flux density may increase.

For example, when it is referenced that a current flowing to the first charging loop is 100%, a current flowing to the second charging loop may be 79%. In this case, when the number of gap pads is adjusted, and when it is referenced that contact sensitivity of the first charging loop is 100%, a contact sensitivity of the second charging loop may be 103%. Thus, a difference between the contact sensitivity in each of the first time section t1 and the seventh time section t7 and the contact sensitivity in each of the other time sections t2, t3, t4, t5, and t6 may be reduced. According to an embodiment of the present disclosure, the contact sensitivity may be improved by adjusting the number of gap pads without increasing a charging current.

Figure 17:
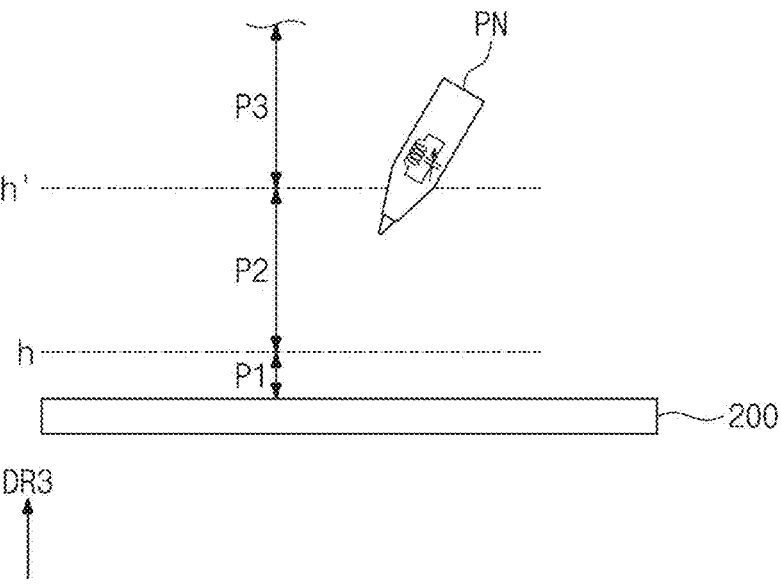
FIG. 17 is a view illustrating a charging drive mode according to a position of a pen according to an embodiment of the present disclosure.

FIG. 17 is a view illustrating a charging drive mode according to a position of a pen PN according to an embodiment of the present disclosure.

Referring to FIG. 17, a first section P1, a second section P2, and a third section P3 may be defined according to a height from the sensor layer 200 in the third direction DR3. When the pen PN is located in the first section P1 and the second section P2, the sensor layer 200 may sense the position or the presence of the pen PN. The first section P1 may refer to a case in which the pen PN is in contact with the sensor layer 200, or is substantially in contact with the sensor layer 200. The first section P1 may be a section from the sensor layer 200 to a first height h in the third direction DR3. The first section P1 may be referred to as a contact section P1 in which the pen PN is in contact. Hereinafter, the first section P1 is referred to as the contact section P1.

The second section P2 may refer to a section in which the pen PN is not in contact, but an approach of the pen PN is sensed or the position of the pen PN is sensed. The second section P2 may be a section from the first height h on the sensor layer 200 to a second height h' in the third direction DR3. The second section P2 may be referred to as a distance section (e.g., a predetermined distance) section P2 or a hovering section P2 in which the pen PN may be sensed. Hereinafter, the second section P2 is referred to as the distance section P2 or the predetermined distance section P2.

The third section P3 may refer to a section in which the pen PN may not be sensed, unlike in the contact section P1 and the predetermined distance section P2. The third section P3 may be a section further deviating from (e.g., further aways from) the second height h' on the sensor layer 200 in the third direction DR3. The third section P3 may be referred to as an out-hovering section P3 or a pen non-sensing section P3.

In an embodiment of the present disclosure, referring to FIG. 16B together, when the pen PN is located in the contact section P1 and the predetermined distance section P2, and the sensor layer 200 senses the pen PN, the charging drive mode may be switched to the tracking charging drive mode. Thus, an operation corresponding to at least some of the first to seventh time sections t1, t2, t3, t4, t5, t6, and t7 illustrated in FIG. 16B may be performed depending on the position of the pen PN.

When the pen PN is located in the third section P3, because the sensor layer 200 may not sense the pen PN, the charging drive mode may be the searching charging drive mode. In the third section P3, the first signal SG1 or the second signal SG2 may be sequentially provided to the total charging pads 232tP, 230P1, 230P2, 230P3, 230P4, 230P5, 230P6, 230P7, 230P8, 230P9, and 233Tp (e.g., see FIG. 16b) included in the sensor layer 200 until the pen PN is sensed.

Figure 18A:
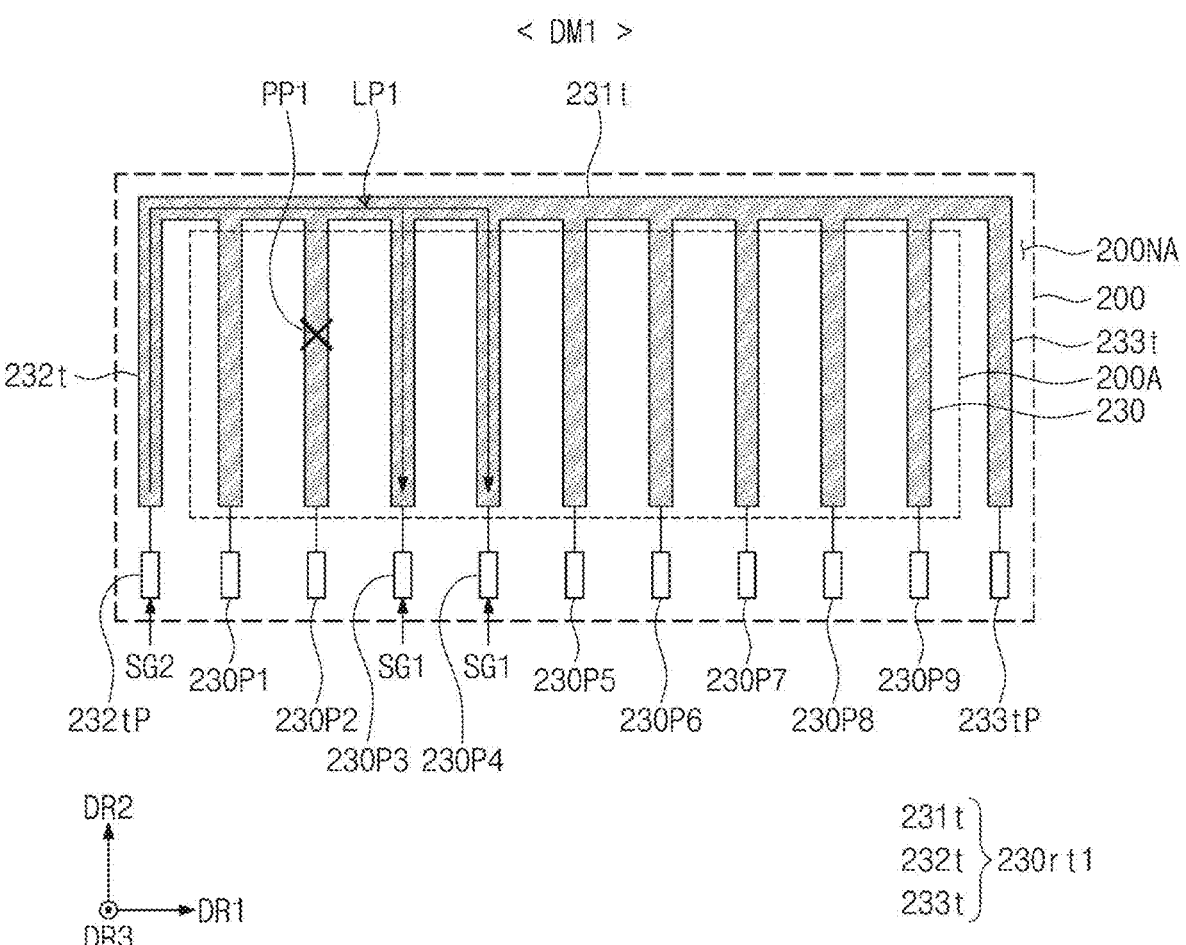
FIG. 18A is a view illustrating a first driving mode according to an embodiment of the present disclosure.
Figure 18B:
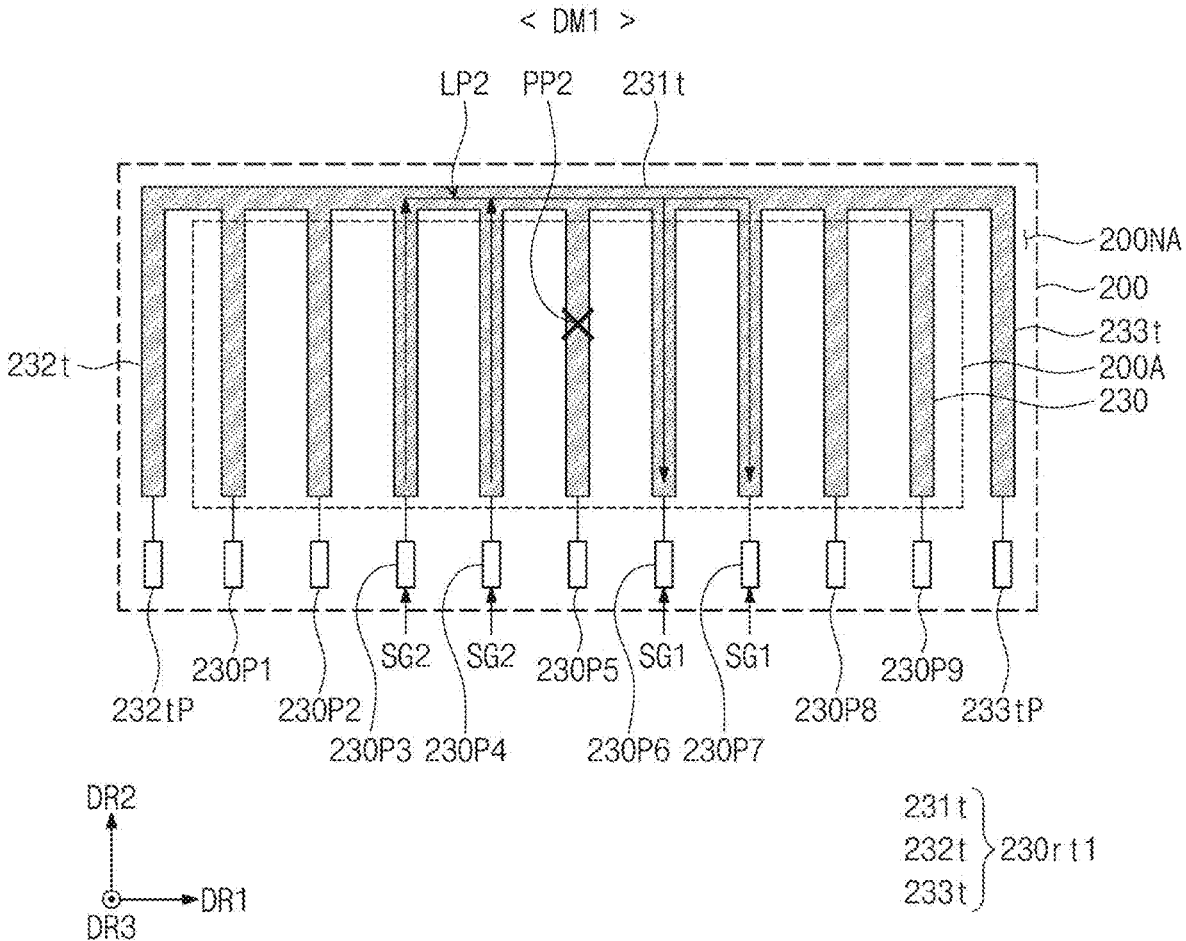
FIG. 18B is a view illustrating the first driving mode according to an embodiment of the present disclosure.

FIG. 18A is a view illustrating a first drive mode DM1 according to an embodiment of the present disclosure. FIG. 18B is a view illustrating the first drive mode DM1 according to an embodiment of the present disclosure.

FIGS. 18A and 18B briefly illustrate the charging pads 232tP, 230P1, 230P2, 230P3, 230P4, 230P5, 230P6, 230P7, 230P8, 230P9, and 233Tp (hereinafter, 232tP, 230P1 to 230P9, and 233tP), the third electrodes 230 arranged in the sensing area 200A, and the loop trace line 230rt1. FIG. 18A is a view illustrating a first charging loop LP1 formed in the first time section t1 illustrated in FIG. 16B. FIG. 18B is a view illustrating a second charging loop LP2 formed in the fourth time section t4 illustrated in FIG. 16B.

Referring to FIGS. 5, 18A, and 18B, the first signal SG1 may be provided to some first charging drive pads of the charging pads 232tP, 230P1 to 230P9, and 233tP, and the second signal SG2 may be provided to some second charging drive pads of the charging pads 232tP, 230P1 to 230P9, and 233tP. A signal may not be provided to the other charging pads, except for the first charging drive pad and the second charging drive pad, among the charging pads 232tP, 230P1 to 230P9, and 233tP.

The sensor driving circuit 2000 may output the first signal SG1 to "X" first charging drive pads among the charging pads 232tP, 230P1 to 230P9, and 233tP, and may output the second signal SG2 to "Y" second charging drive pads among the charging pads 232tP, 230P1 to 230P9, and 233tP. Because the first signal SG1 and the second signal SG2 are different from each other, the charging loop LP1 or LP2 may be formed from the "X" first charging drive pads and the "Y" second charging drive pads, and a current may flow to the formed charging loop LP1 or LP2.

A signal may not be provided to the charging pads (hereinafter, referred to as gap pads or "Z" gap pads) arranged between the "X" first charging drive pads and the "Y" second charging drive pads among the charging pads 232tP, 230P1 to 230P9, and 233tP.

In the "X" first charging drive pads, the "Y" second charging drive pads, and the "Z" gap pads, "X," "Y," and "Z" may each be an integer of 1 or more. Further, at least one of "X," "Y," or "Z" may be a variable value.

In an embodiment of the present disclosure, the charging loop LP1 or LP2 formed from the first charging drive pad and the second charging drive pad may be provided as a plurality of charging loops LP1 or LP2. Thus, the sensor driving circuit 2000 may sequentially form the plurality of charging loops LP1 and LP2 on the sensor layer 200 one by one as the numbers and the positions of the first charging drive pads, the second charging drive pads, and the gap pads vary. Further, as the numbers and the positions of the first charging drive pads, the second charging drive pads, and the gap pads of the charging loops LP1 and LP2 vary, the positions of the charging loops LP1 and LP2, an area of a magnetic field formed by the charging loops LP1 and LP2, or a magnetic flux density of the magnetic field may vary.

FIGS. 18A and 18B illustratively show the two charging loops LP1 and LP2 among the plurality of charging loops LP1 and LP2, which will be described in more detail hereinafter.

Referring to FIGS. 5 and 18A, the sensor driving circuit 2000 may output the first signal SG1 to the two first charging drive pads 230P3 and 230P4 among the charging pads 232tP, 230P1 to 230P9, and 233tP, and may output the second signal SG2 to the one second charging drive pad 232tP among the charging pads 232tP, 230P1 to 230P9, and 233tP. Thus, the first charging loop LP1 including the first charging drive pads 230P3 and 230P4, the two third electrodes 230 connected to the first charging drive pads 230P3 and 230P4, the portion of the loop trace line 230rt1, and the second charging drive pad 232tP may be formed.

The charging pads 230P1 and 230P2 arranged between the first charging drive pads 230P3 and 230P4 to which the first signal SG1 is provided and the second charging drive pad 232tP to which the second signal SG2 is provided may be referred to as gap pads 230P1 and 230P2. In other words, the number of gap pads 230P1 and 230P2 may be two in the first time section t1 (e.g., see FIG. 16B).

Referring to FIGS. 5 and 18B, the sensor driving circuit 2000 may output the first signal SG1 to the two first charging drive pads 230P6 and 230P7 among the charging pads 232tP, 230P1 to 230P9, and 233tP, and may output the second signal SG2 to the two second charging drive pads 230P3 and 230P4 among the charging pads 232tP, 230P1 to 230P9, and 233tP. Thus, the second charging loop LP2 including the first charging drive pads 230P6 and 230P7, the two third electrodes 230 connected to the first charging drive pads 230P6 and 230P7, the portion of the loop trace line 230rt1, and the second charging drive pads 230P3 and 230P4 may be formed. The second charging loop LP2 may be the charging loop LP2 that is moved in the first direction DR1 with respect to the first charging loop LP1.

FIGS. 18A and 18B illustrate a flow of a current due to the charging loops LP1 and LP2 as arrows, but the present disclosure is not limited thereto, and the current may flow in directions opposite to those indicated by the arrows, for example, such as in a counterclockwise direction.

The charging pad 230P5 disposed between the first charging drive pads 230P6 and 230P7 to which the first signal SG1 is provided and the second charging drive pads 230P3 and 230P4 to which the second signal SG2 is provided may be referred to as the gap pad 230P5. In other words, the number of gap pads 230P5 may be one in the fourth time section t4 (e.g., see FIG. 16B).

In an embodiment of the present disclosure, referring to FIGS. 18A and 18B, the number of "Y" second charging drive pads 230P3 and 230P4 of the second charging loop LP2 may be greater than the number of "Y" second charging drive pads 232tP of the first charging loop LP1. For example, the number of second charging drive pads 230P3 and 230P4 of the second charging loop LP2 in FIG. 18B may be two, and the number of second charging drive pads 232tP of the first charging loop LP1 in FIG. 18A may be one.

Because the second charging drive pads 230P3 and 230P4 of each of the charging loops LP1 and LP2 are connected in parallel with each other, a resistance may decrease and a current may increase as the number of second charging drive pads 230P3 and 230P4 increases. Thus, as the number of second charging drive pads 230P3 and 230P4 increases, a sensitivity of the pen PN may be improved, and the height h' at which the pen PN may be sensed may be increased, and thus, the pen PN may be sensed more quickly.

In an embodiment of the present disclosure, the number of "Y" second charging drive pads 232tP of the first charging loop LP1 may be one. In this case, the one second charging drive pad 232tP may be electrically connected to the second line portion 232t of the loop trace line 230rt1.

In an embodiment of the present disclosure, the number of "Z" gap pads 230P5 of the second charging loop LP2 may be smaller than the number of "Z" gap pads 230P1 and 230P2 of the first charging loop LP1. For example, the number of gap pads 230P5 of the second charging loop LP2 in FIG. 18B may be one, and the number of gap pads 230P1 and 230P2 of the first charging loop LP1 in FIG. 18A may be two. As the number of gap pads of each of the charging loops LP1 and LP2 decreases, the area of the magnetic field may decrease, and the magnetic flux density may be concentrated. Thus, a charging of the pen PN may be performed more easily.

In an embodiment of the present disclosure, a difference between the sensitivity of the pen PN sensed at a first position PP1 and sensitivity of the pen PN sensed at a second position PP2 may be caused due to a resistance difference between the portion of the loop trace line 230rt1 and the third electrodes 230 included in the charging loops LP1 and LP2, and the number of "Y" second charging drive pads 230P3 and 230P4 of the second charging loop LP2 being greater than the number of "Y" second charging drive pads 232tP of the first charging loop LP1, and thus, the sensitivity of the pen PN sensed at the first position PP1 and the sensitivity of the pen PN sensed at the second position PP2 may be uniformized.

FIG. 18B illustratively shows that the numbers of the first charging drive pads 230P6 and 230P7 and the second charging drive pads 230P3 and 230P4 are two, but the present disclosure is not particularly limited thereto. For example, the numbers of the first charging drive pads and the second charging drive pads may be three or more.

Further, FIG. 18A illustratively shows the two gap pads 230P1 and 230P2, and FIG. 18B illustratively shows the one gap pad 230P5, but the present disclosure is not particularly limited thereto. For example, in an embodiment, the number of gap pads defined between the first charging loops LP1 may be smaller than the number of gap pads defined between the second charging loops LP2, but the numbers thereof are not limited to a specific number.

The drawings illustrated in FIGS. 18A and 18B may correspond to the first drive mode DM1 in the charging drive mode. The first drive mode DM1 may be a pen sensitivity uniforming mode.

Referring to FIGS. 17, 18A, and 18B, the first drive mode DM1 may be a mode that is driven when the pen PN is located inside the contact section P1 and the predetermined distance section P2. For example, when the pen PN is sensed at the first position PP1, the first charging loop LP1 may be formed, and when the pen PN is sensed at the second position PP2, the second charging loop LP2 may be formed.

Figure 19A:
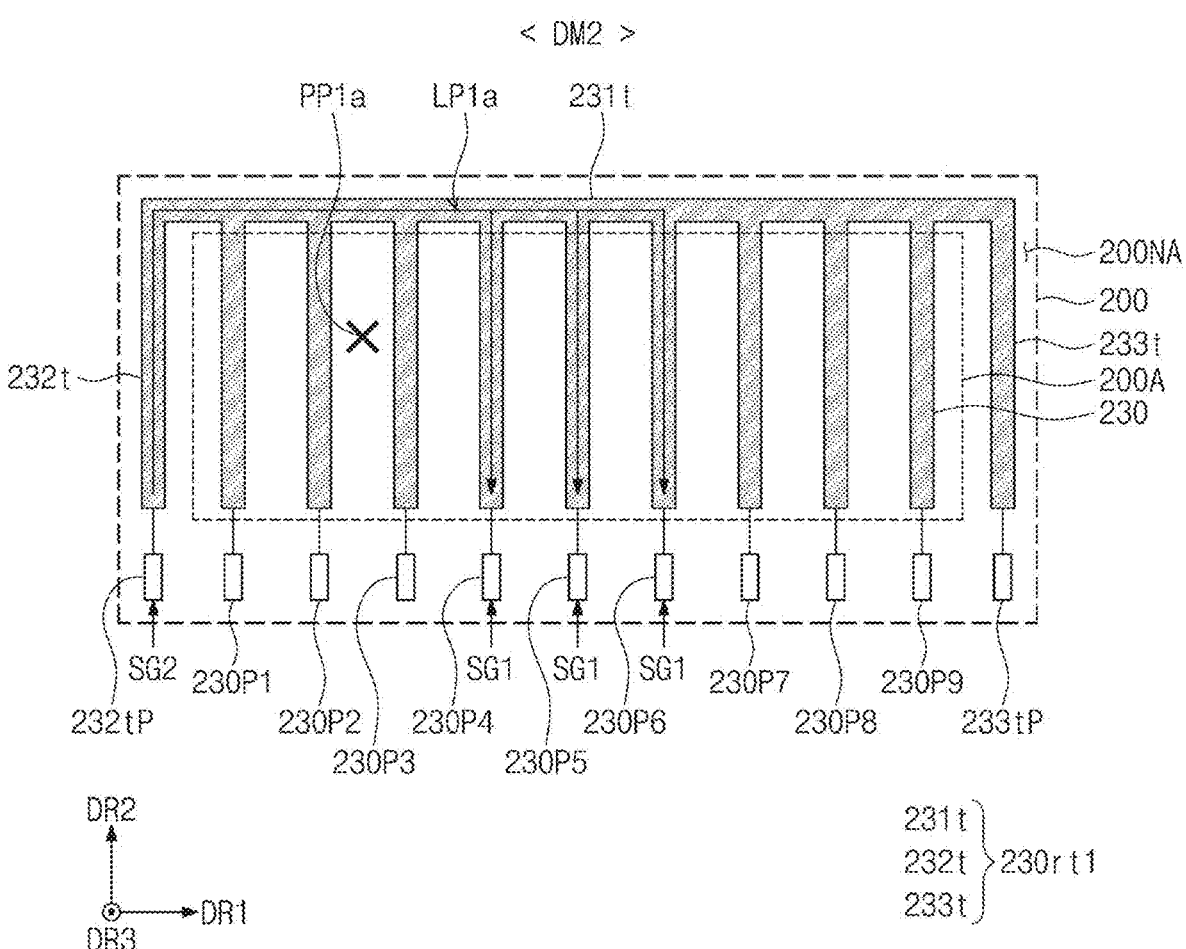
FIG. 19A is a view illustrating a second driving mode according to an embodiment of the present disclosure.
Figure 19B:
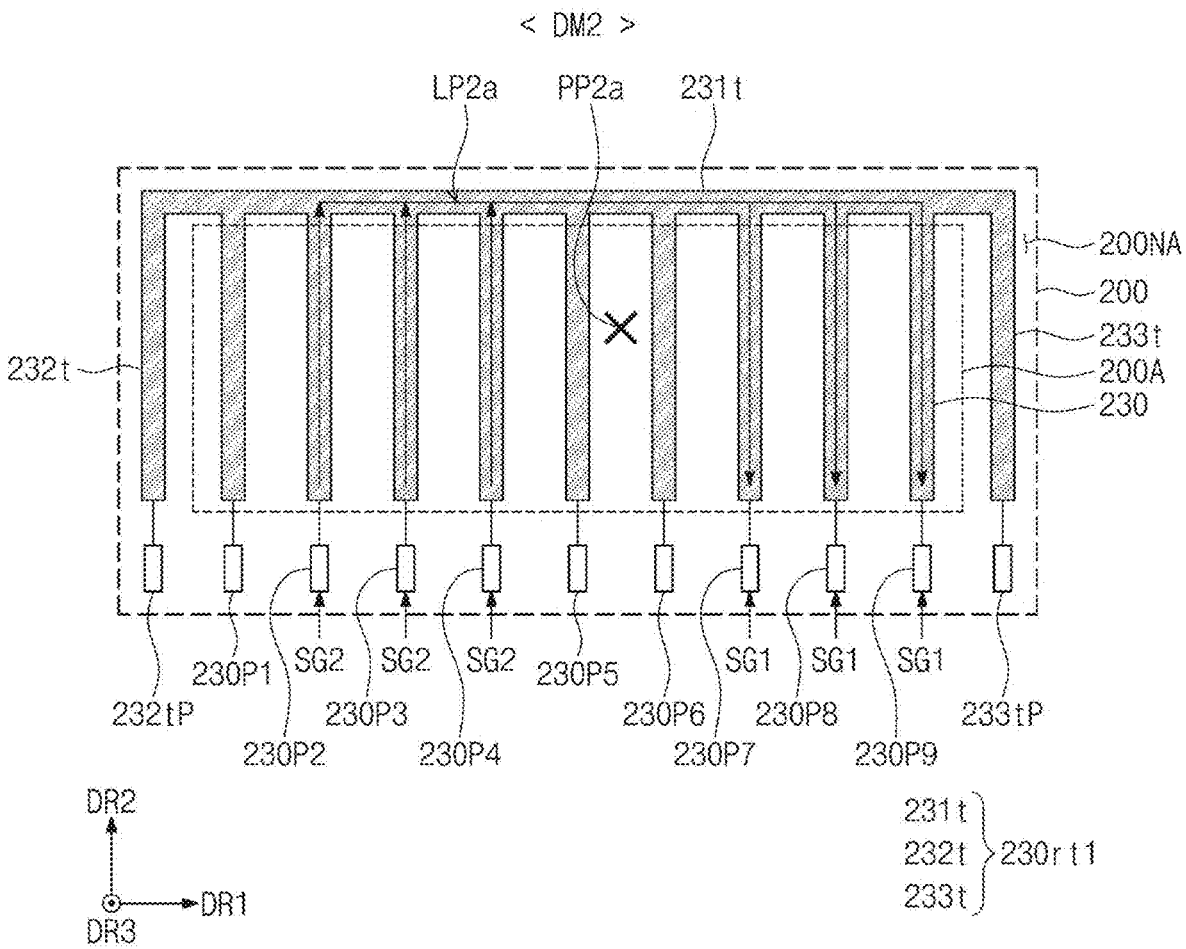
FIG. 19B is a view illustrating the second driving mode according to an embodiment of the present disclosure.

FIG. 19A is a view illustrating a second drive mode DM2 according to an embodiment of the present disclosure. FIG. 19B is a view illustrating the second drive mode DM2 according to an embodiment of the present disclosure.

In FIGS. 19A and 19B, the same or substantially the same components as those described above with reference to FIGS. 18A and 18B are designated by the same reference numerals, and thus, redundant description thereof may not be repeated.

The charging drive mode may include the first drive mode DM1 and the second drive mode DM2. The first drive mode DM1 may be the pen sensitivity uniforming mode, and the second drive mode DM2 may be a pen high-sensitivity mode. FIGS. 18A and 18B are views illustrating the first drive mode DM1 that is the pen sensitivity uniforming mode, and FIGS. 19A and 19B are views illustrating the second drive mode DM2 that is the pen high-sensitivity mode.

The second drive mode DM2 may be a mode having a higher sensitivity than that of the first drive mode DM1. FIG. 19A illustratively shows a first charging loop LP1a, and FIG. 19B illustratively shows a second charging loop LP2a.

Referring to FIGS. 17, 19A, and 19B, the second drive mode DM2 may be a mode that is driven not only when the pen PN is located inside the contact section P1 and the predetermined distance section P2, but also when the pen PN is located in the third section P3. For example, not only when the pen PN is sensed at a first position PP1a and a second position PP2a, but also when the position of the pen PN is not known, the sensor driving circuit 2000 may operate in the second drive mode DM2.

Referring to FIGS. 5 and 19A, the sensor driving circuit 2000 may output the first signal SG1 to three first charging drive pads 230P4, 230P5, and 230P6 among the charging pads 232tP, 230P1 to 230P9, and 233tP, and may output the second signal SG2 to one second charging drive pad 232tP among the charging pads 232tP, 230P1 to 230P9, and 233tP. Thus, the first charging loop LP1a including the first charging drive pads 230P4, 230P5, and 230P6, the three third electrodes 230 connected to the first charging drive pads 230P4, 230P5, and 230P6, the portion of the loop trace line 230rt1, and the second charging drive pad 232tP may be formed.

The charging pads 230P1, 230P2, and 230P3 arranged between the first charging drive pads 230P4, 230P5, and 230P6 to which the first signal SG1 is provided and the second charging drive pad 232tP to which the second signal SG2 is provided may be referred to as gap pads 230P1, 230P2, and 230P3. In other words, the number of gap pads 230P1, 230P2, and 230P3 of the first charging loop LP1a may be three.

Referring to FIGS. 5 and 19B, the sensor driving circuit 2000 may output the first signal SG1 to the three first charging drive pads 230P7, 230P8, and 230P9 among the charging pads 232tP, 230P1 to 230P9, and 233tP, and may output the second signal SG2 to the three second charging drive pads 230P2, 230P3, and 230P4 among the charging pads 232tP, 230P1 to 230P9, and 233tP. Thus, the second charging loop LP2a including the first charging drive pads 230P7, 230P8, and 230P9, the three third electrodes 230 connected to the first charging drive pads 230P7, 230P8, and 230P9, the portion of the loop trace line 230rt1, and the second charging drive pads 230P2, 230P3, and 230P4 may be formed.

FIGS. 19A and 19B illustrate a flow of a current due to the charging loops LP1a and LP2a as arrows in a clockwise direction, but the present disclosure is not limited thereto, and the current may flow in directions opposite to those indicated by the arrows, for example, such as in a counter-clockwise direction.

The charging pads 230P5 and 230P6 arranged between the first charging drive pads 230P7, 230P8, and 230P9 to which the first signal SG1 is provided and the second charging drive pads 230P2, 230P3, and 230P4 to which the second signal SG2 is provided may be referred to as gap pads 230P5 and 230P6. In other words, the number of gap pads 230P5 and 230P6 of the second charging loop LP2a may be two.

In an embodiment of the present disclosure, referring to FIGS. 18A and 19A, the number of "X" first charging drive pads 230P4, 230P5, 230P6 of the first charging loop LP1a in the second drive mode DM2 may be greater than the number of "X" first charging drive pads 230P3 and 230P4 of the first charging loop LP1 in the first drive mode DM1. For example, the number of first charging drive pads 230P4, 230P5, 230P6 of the first charging loop LP1a in FIG. 19A may be three, and the number of first charging drive pad 230P3 and 230P4 of the first charging loop LP1 in FIG. 18A may be two.

When it is referenced that a resistance of the first charging loop LP1 in FIG. 18A is 100%, a resistance of the first charging loop LP1a may be 79%. Further, when it is referenced that a current flowing to the first charging loop LP1 in FIG. 18A is 100%, a current flowing to the first charging loop LP1a may be 126%. In this case, as the charging current increases, the intensity of the magnetic field may increase by about 22%. Thus, the pen at a greater distance may also be sensed. As such, the second drive mode DM2 may be referred to as a hovering high-sensitivity mode.

In an embodiment of the present disclosure, referring to FIGS. 18B and 19B, the number of "X" first charging drive pads 230P7, 230P8, and 230P9 of the second charging loop LP2a in the second drive mode DM2 may be greater than the number of "X" first charging drive pads 230P6 and 230P7 of the second charging loop LP2 in the first drive mode DM1. For example, the number of first charging drive pads 230P7, 230P8, and 230P9 of the second charging loop LP2a in FIG. 19B may be three, and the number of first charging drive pads 230P6 and 230P7 of the second charging loop LP2 in FIG. 18B may be two.

The number of "Y" second charging drive pads 230P2, 230P3, and 230P4 of the second charging loop LP2a in the second drive mode DM2 may be greater than the number of "Y" second charging drive pads 230P3 and 230P4 of the second charging loop LP2 in the first drive mode DM1. For example, the number of second charging drive pads 230P2, 230P3, and 230P4 of the second charging loop LP2a in FIG. 19B may be three, and the number of second charging drive pads 230P3 and 230P4 of the second charging loop LP2 in FIG. 18B may be two.

When it is referenced that a resistance of the second charging loop LP2 in FIG. 18B is 100%, a resistance of the second charging loop LP2a may be 67%. Further, when it is referenced that a current flowing to the second charging loop LP2 in FIG. 18B is 100%, a current flowing to the second charging loop LP2a may be 148%. In this case, as the charging current increases, the intensity of the magnetic field may increase by about 30%. Thus, the pen at a greater distance may also be sensed. Thus, the second drive mode DM2 may be referred to as a hovering high-sensitivity mode.

In other words, according to an embodiment of the present disclosure, as the numbers of first charging drive pads and second charging drive pads increase, the current increases, and as a height (e.g., see FIG. 17) at which the pen PN may be sensed also increases, the pen PN approaching the sensor layer 200 may be sensed more quickly. Thus, the second drive mode DM2 illustrated in FIGS. 19A and 19B may be a mode having a higher sensitivity than that of the first drive mode DM1 illustrated in FIGS. 18A and 18B.

In an embodiment of the present disclosure, the number of "Z" gap pads 230P1, 230P2, and 230P3 of the first charging loop LP1a in the second drive mode DM2 may be greater than the number of "Z" gap pads 230P1 and 230P2 of the first charging loop LP1 in the first drive mode DM1. For example, the number of gap pads 230P1, 230P2, and 230P3 of the first charging loop LP1a in FIG. 19A may be three, and the number of gap pads 230P1 and 230P2 of the first charging loop LP1 in FIG. 18A may be two.

The number of "Z" gap pads 230P5 and 230P6 of the second charging loop LP2a in the second drive mode DM2 may be greater than the number of "Z" gap pads 230P5 of the second charging loop LP2 in the first drive mode DM1. For example, the number of gap pads 230P5 and 230P6 of the second charging loop LP2a in FIG. 19B may be two, and the number of gap pads 230P5 of the second charging loop LP2a in FIG. 18B may be one.

As the number of gap pads increases, the area of the magnetic field may further increase. For example, when a width of a rechargeable area by the first charging loop LP1 in FIG. 18A is 28 mm, a width of a rechargeable area by the first charging loop LP1a in of FIG. 19A may be 40 mm. For example, when a width of a rechargeable area by the second charging loop LP2 in FIG. 18B is 32 mm, a width of a rechargeable area by the second charging loop LP2a in of FIG. 19B may be 40 mm.

In an embodiment of the present disclosure, the second drive mode DM2 may be selectively operated in various environments. Various operation modifications will be described in more detail below.

In an embodiment of the present disclosure, to quickly sense the pen PN, the sensor layer 200 and the sensor driving circuit 2000 may operate in the second drive mode DM2 when the pen PN is not sensed. When the pen PN is located in the first section P1 (e.g., see FIG. 17) or the second section P2, an operation of the sensor layer 200 and the sensor driving circuit 2000 may be switched to the first drive mode DM1 described above with reference to FIGS. 16B, 18A, and 18B. As another example, when the pen PN is located in the second section P2 (e.g., see FIG. 17), the sensor layer 200 and the sensor driving circuit 2000 may be maintained in the second drive mode DM2, and when the pen PN is located in the third section P3, the sensor layer 200 and the sensor driving circuit 2000 may be switched to the first drive mode DM1. As another example, depending on a request of the user or a system setting, the sensor layer 200 and the sensor driving circuit 2000 may be maintained in the second drive mode DM2 even when the pen PN is located in the second section P2 and the third section P3.

In an embodiment of the present disclosure, to reduce a power consumption, the sensor layer 200 and the sensor driving circuit 2000 may operate in the drive mode illustrated in FIG. 16A or in the first drive mode DM1 described above with reference to FIGS. 16B, 18A and 18B when the pen PN is not sensed. Thereafter, when it is sensed that the pen PN is located in the second section P2, the sensor layer 200 and the sensor driving circuit 2000 may be switched to the second drive mode DM2 and operated. For example, when it is determined that the pen PN is located in the second section P2 and remains for a period of time (e.g., a predetermined period of time), the sensor layer 200 and the sensor driving circuit 2000 may be switched to the second drive mode DM2. The period of time may be several seconds, for example, such as 1 second to 3 seconds. Thus, when the pen PN is used as a special function, such as a pointer function, as the sensor layer 200 and the sensor driving circuit 2000 are driven in the second drive mode DM2, a feedback time for an input by the pen PN may be reduced, and thus, a usability may be further improved. When the pen PN deviates from the second section P2 and moves to the first section P1 or the third section P3, the sensor layer 200 and the sensor driving circuit 2000 may be switched to the first drive mode DM1 to reduce a power consumption.

FIGS. 19A and 19B illustratively show a high-sensitivity mode in which the number of gap pads in the second drive mode DM2 is greater than the number of gap pads in the first drive mode DM1, but the present disclosure is not limited thereto. In an embodiment of the present disclosure, the number of gap pads in the second drive mode DM2 may be smaller than the number of gap pads in the first drive mode DM1. In this case, the area of the magnetic field of each of the charging loops LP1a and LP2a may be narrowed, and the magnetic flux density may be concentrated. Thus, a charging of the pen PN may be performed more easily.

Figure 20A:
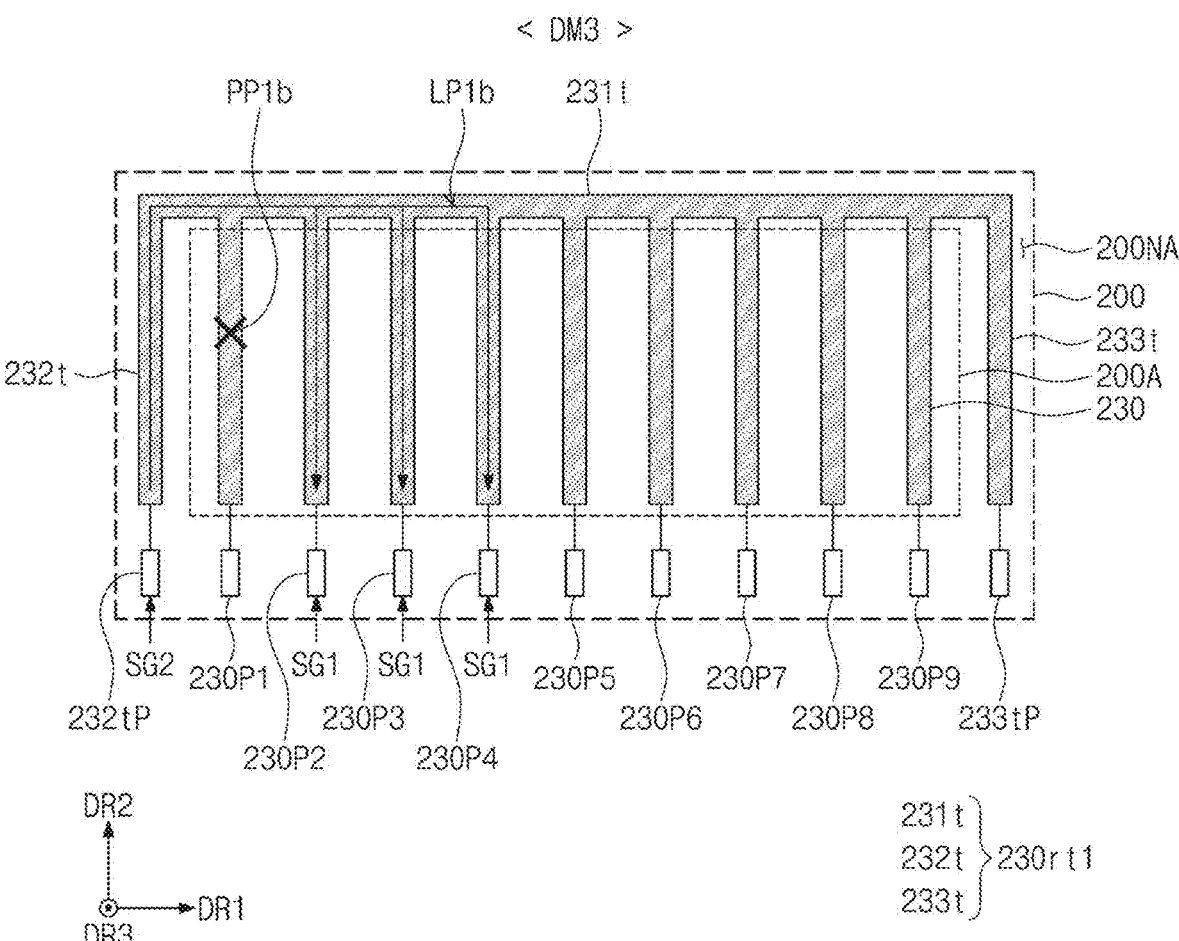
FIG. 20A is a view illustrating a third driving mode according to an embodiment of the present disclosure.
Figure 20B:
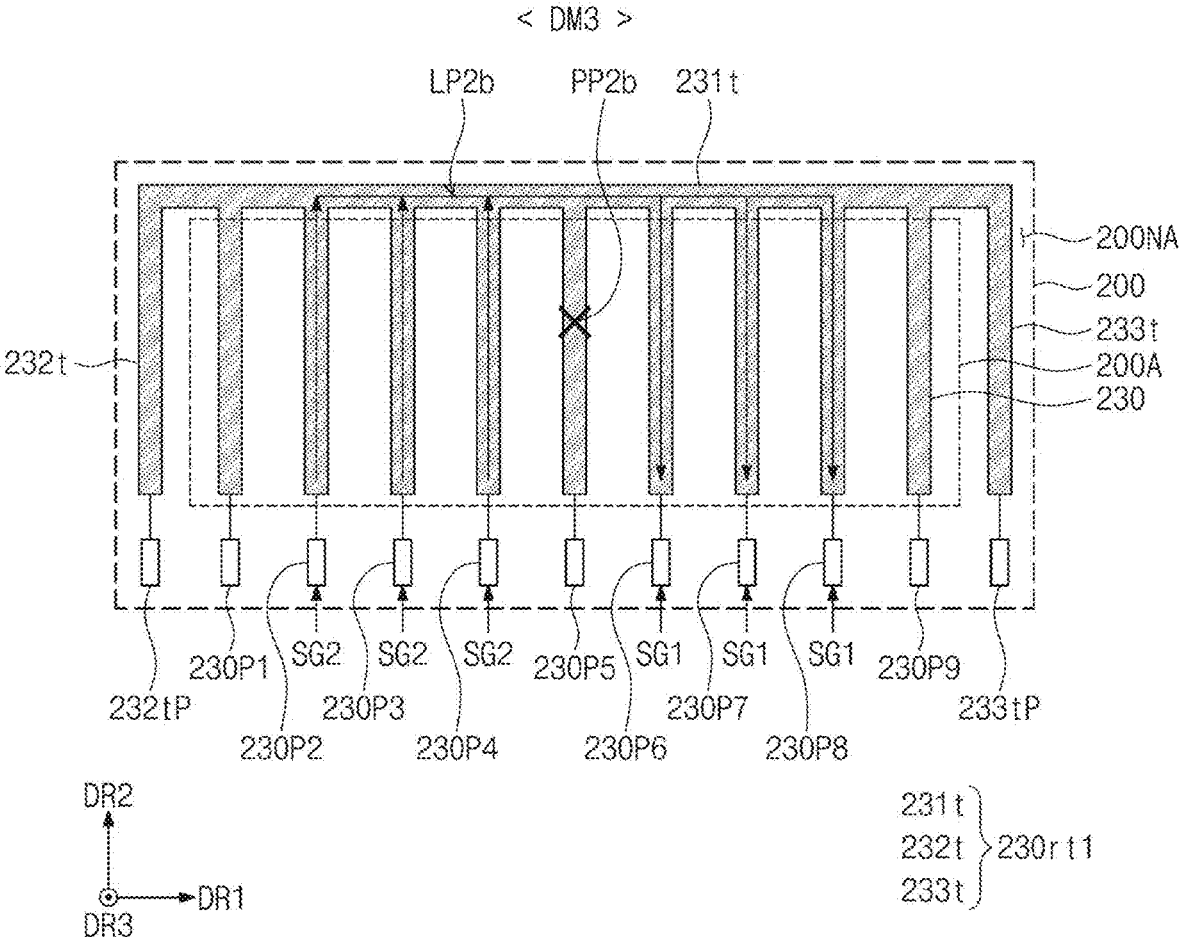
FIG. 20B is a view illustrating the third driving mode according to an embodiment of the present disclosure.

FIG. 20A is a view illustrating a third drive mode DM3 according to an embodiment of the present disclosure. FIG. 20B is a view illustrating the third drive mode DM3 according to an embodiment of the present disclosure.

In FIGS. 20A and 20B, the same or substantially the same components as those described above with reference to FIGS. 18A and 18B are designated by the same reference numerals, and thus, redundant description thereof may not be repeated.

Referring to FIGS. 17, 20A, and 20B, the charging drive mode may include the first drive mode DM1, the second drive mode DM2 (e.g., see FIG. 19A), and the third drive mode DM3. The third drive mode DM3 may be a mode having a higher sensitivity than that of the first drive mode DM1, and may be a mode different from the second drive mode DM2 (e.g., see FIG. 19A).

In an embodiment of the present disclosure, the third drive mode DM3 may be a mode that is driven when the pen PN is located inside the contact section P1. The contact section P1 may refer to a case in which the pen PN deviates from the predetermined distance section P2, and is closer to the sensor layer 200 than to the predetermined distance section P2. In other words, when it is determined that the pen PN deviates from the predetermined distance section P2 and becomes closer to the sensor layer 200 than to predetermined distance section P2, the sensor driving circuit 2000 (e.g., see FIG. 5) may operate in the third drive mode DM3. For example, when the pen PN is in contact at a first position PP1b and a second position PP2b, the sensor driving circuit 2000 may operate in the third drive mode DM3.

Referring to FIGS. 5 and 20A, the sensor driving circuit 2000 may output the first signal SG1 to three first charging drive pads 230P2, 230P3, and 230P4 among the charging pads 232tP, 230P1 to 230P9, and 233tP, and may output the second signal SG2 to one second charging drive pad 232tP among the charging pads 232tP, 230P1 to 230P9, and 233tP. Thus, the first charging loop LP1a including the first charging drive pads 230P2, 230P3, and 230P4, the three third electrodes 230 connected to the first charging drive pads 230P2, 230P3, and 230P4, the portion of the loop trace line 230rt1, and the second charging drive pad 232tP may be formed.

The charging pad 230P1 disposed between the first charging drive pads 230P2, 230P3, and 230P4 to which the first signal SG1 is provided and the second charging drive pad 232tP to which the second signal SG2 is provided may be referred to as the gap pad 230P1. In other words, the number of gap pads 230P1 of a first charging loop LP1b may be one.

Referring to FIGS. 5 and 20B, the sensor driving circuit 2000 may output the first signal SG1 to three first charging drive pads 230P6, 230P7, and 230P8 among the charging pads 232tP, 230P1 to 230P9, and 233tP, and may output the second signal SG2 to three second charging drive pads 230P2, 230P3, and 230P4 among the charging pads 232tP, 230P1 to 230P9, and 233tP. Thus, a second charging loop LP2b including the first charging drive pads 230P6, 230P7, and 230P8, the three third electrodes 230 connected to the first charging drive pads 230P6, 230P7, and 230P8, the portion of the loop trace line 230rt1, and the second charging drive pads 230P2, 230P3, and 230P4 may be formed.

FIGS. 20A and 20B illustrate a flow of a current due to the charging loops LP1b and LP2b as arrows in a clockwise direction, but the present disclosure is not limited thereto, and the current may flow in directions opposite to those indicated by the arrows, for example, such as in a counter-clockwise direction.

The charging pad 230P5 disposed between the first charging drive pads 230P6, 230P7, and 230P8 to which the first signal SG1 is provided and the second charging drive pads 230P2, 230P3, and 230P4 to which the second signal SG2 is provided may be referred to as the gap pad 230P5. In other words, the number of gap pads 230P5 of the second charging loop LP2b may be one.

In an embodiment of the present disclosure, referring to FIGS. 18A and 20A, the number of "Z" gap pads 230P1 of the first charging loop LP1b in the third drive mode DM3 may be smaller than the number of "Z" gap pads 230P1 and 230P2 of the first charging loop LP1 in the first drive mode DM1. For example, the number of gap pad 230P1 of the first charging loop LP1b in FIG. 20A may be one, and the number of gap pads 230P1 and 230P2 of the first charging loop LP1 in FIG. 18A may be two.

When it is referenced that a resistance of the first charging loop LP1 in FIG. 18A is 100%, a resistance of the first charging loop LP1b may be 79%. Further, when it is referenced that a current flowing to the first charging loop LP1 in FIG. 18A is 100%, a current flowing to the first charging loop LP1b may be 126%. In this case, as the number of charging drive pads increases and the charging current increases, the intensity of the magnetic field may increase by 40%.

Referring to the charging loop (hereinafter, referred to as a comparative charging loop) formed in the fifth time section t5 of FIG. 16A and FIG. 20B, the number of "Z" gap pads 230P5 of the second charging loop LP2b in the third drive mode DM3 may be smaller than the number of "Z" gap pads 230P5 and 230P6 of the comparative charging loop. For example, the number of gap pads 230P5 of the second charging loop LP2b in FIG. 20B may be one, and the number of gap pads 230P5 and 230P6 of the comparative charging loop may be two.

When it is referenced that a resistance of the comparative charging loop is 100%, a resistance of the second charging loop LP2b may be 67%. Further, when it is referenced that a current flowing to the comparative charging loop is 100%, a current flowing to the second charging loop LP2b may be 148%. In this case, as the number of charging drive pads increases and the charging current increases, the intensity of the magnetic field may increase by 56%. Further, in the case of the embodiment of FIG. 20B, the number of gap pads 230P5 of the second charging loop LP2b is smaller than the number of gap pads 230P5 and 230P6 in the fifth time section t5, but as the number of charging drive pads increases, the width of the rechargeable area may be substantially the same or similar In an embodiment of the present disclosure, in the third drive mode DM3, the number of gap pads of each of the charging loops LP1b and LP2b is reduced as compared to the second drive mode DM2, and the area of the magnetic field of each of the charging loops LP1b and LP2b in the third drive mode DM3 is narrower than that in the second drive mode DM2, and thus, the magnetic flux density may be concentrated. Thus, in the third drive mode DM3, the pen PN may be more easily charged as compared to the second drive mode DM2.

Figure 21:
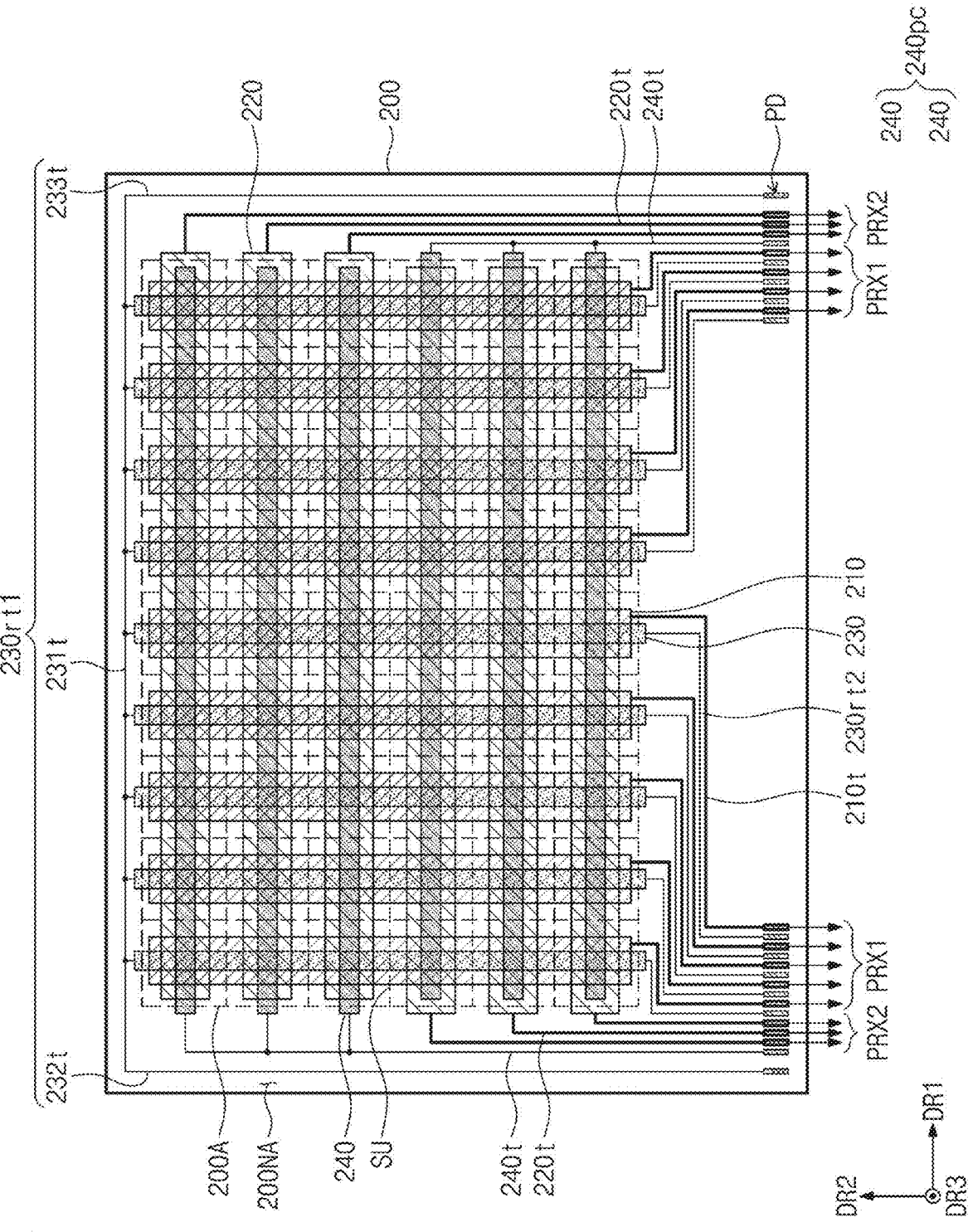
FIG. 21 is a view illustrating a pen sensing drive mode of the second mode according to an embodiment of the present disclosure.
Figure 22:
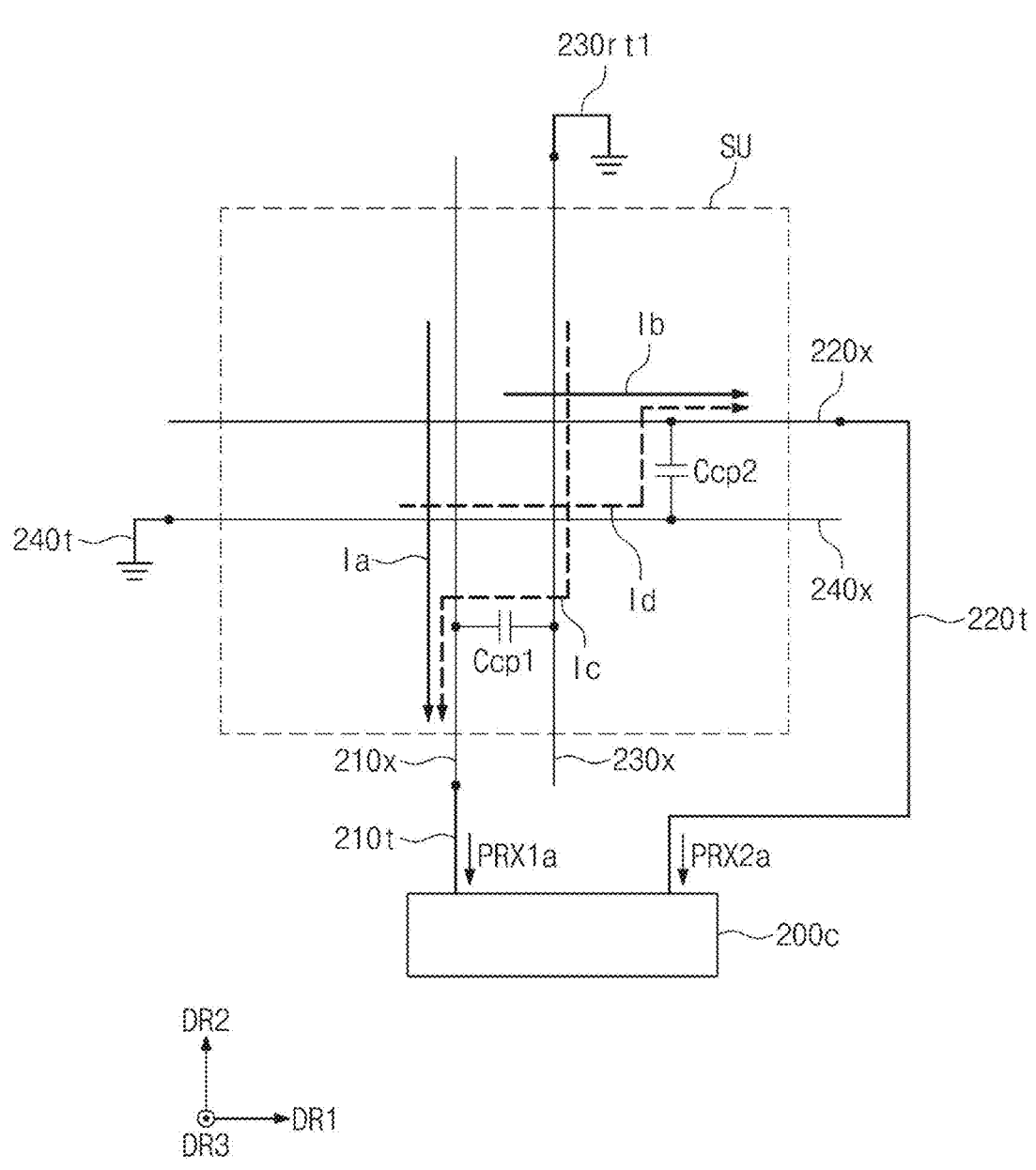
FIG. 22 is a view illustrating the second mode based on one sensing unit according to an embodiment of the present disclosure.

FIG. 21 is a view illustrating a pen sensing drive mode of the second mode according to an embodiment of the present disclosure. FIG. 22 is a view illustrating the second mode based on one sensing unit according to an embodiment of the present disclosure.

Referring to FIGS. 21 and 22, the second mode may include the charging drive mode and the pen sensing drive mode. FIGS. 21 and 22 are views illustrating the pen sensing drive mode. FIG. 22 illustrates the one sensing unit SU through which a first induced current Ia, a second induced current Ib, a third induced current Ic, and a fourth induced current Id generated by the pen PN may flow.

Referring to FIG. 21, in the pen sensing drive mode, first reception signals PRX1 may be output from the first electrodes 210, and second reception signals PRX2 may be output from the second electrodes 220.

In an embodiment of the present disclosure, routing directions of the one electrode and the other one electrode of the sensor layer 200, which overlap with each other, may be different from each other. For example, a routing direction of a first electrode 210x and a routing direction of a third electrode 230x may be different from each other. Further, a routing direction of a second electrode 220x and a routing direction of a fourth electrode 240x may be different from each other. For example, in FIG. 22, the first electrode 210x and the first trace line 210t may be connected to each other on a lower side of the sensing unit SU, and the third electrode 230x and the third trace line 230rt1 may be connected to each other on an upper side of the sensing unit SU. The second electrode 220x and the second trace line 220t may be connected to each other on a right side of the sensing unit SU, and the fourth electrode 240x and the fourth trace line 240t may be connected to each other on a left side of the sensing unit SU.

The RLC resonant circuit of the pen PN may emit a magnetic field having a resonant frequency while discharging the charged charges. By the magnetic field provided in the pen PN, the first induced current Ia may be generated in the first electrode 210x, and the second induced current Ib may be generated in the second electrode 220x. Further, the third induced current Ic may be generated in the third electrode 230x, and the fourth induced current Id may be generated in the fourth electrode 240x.

A first coupling capacitor Ccp1 may be formed between the third electrode 230x and the first electrode 210x, and a second coupling capacitor Ccp2 may be formed between the fourth electrode 240x and the second electrode 220x. The third induced current Ic may be transmitted to the first electrode 210x through the first coupling capacitor Ccp1, and the fourth induced current Id may be transmitted to the second electrode 220x through the second coupling capacitor Ccp2.

The sensor driving circuit 2000 may receive, from the first electrode 210x, a first reception signal PRX1a based on the first induced current Ia and the third induced current Ic, and may receive, from the second electrode 220x, a second reception signal PRX2a based on the second induced current Ib and the fourth induced current Id. The sensor driving circuit 2000 may detect the input coordinates of the pen PN based on the first reception signal PRX1a and the second reception signal PRX2a.

The sensor driving circuit 2000 may receive the first reception signal PRX1a from the first electrode 210x, and may receive the second reception signal PRX2a from the second electrode 220x. In this case, one ends of the third electrode 230x and the fourth electrode 240x may be floating. Thus, the compensation for the sensing signal may be maximized or increased by a coupling between the first electrode 210x and the third electrode 230x and a coupling between the second electrode 220x and the fourth electrode 240x.

Further, the other ends of the third electrode 230x and the fourth electrode 240x may be grounded or floating. Thus, the third induced current Ic and the fourth induced current Id may be sufficiently transmitted to the first electrode 210x and the second electrode 220x by the coupling between the first electrode 210x and the third electrode 230x and the coupling between the second electrode 220x and the fourth electrode 240x.

According to some embodiments of the present disclosure described above, an input by a pen as well as a touch input may be sensed using a sensor layer. Thus, because an electronic device may not use or include an additional separate component (e.g., a digitizer) for pen sensing, an increase in a thickness, an increase in a weight, and a decrease in a flexibility of the electronic device due to the addition of the additional separate component (e.g., the digitizer) may not occur. Further, as the numbers and the positions of a first charging drive pad, a second charging drive pad, and a gap pad are varied, a position of each of charging loops, an area of a magnetic field formed by the charging loops, or a magnetic flux density of the magnetic field may be varied. Thus, a sensor driving circuit may be operated in a pen sensitivity uniforming mode at a first position and a second position, and a pen high-sensitivity mode for each position.

The foregoing is illustrative of some embodiments of the present disclosure, and is not to be construed as limiting thereof. Although some embodiments have been described, those skilled in the art will readily appreciate that various modifications are possible in the embodiments without departing from the spirit and scope of the present disclosure. It will be understood that descriptions of features or aspects within each embodiment should typically be considered as available for other similar features or aspects in other embodiments, unless otherwise described. Thus, as would be apparent to one of ordinary skill in the art, features, characteristics, and/or elements described in connection with a particular embodiment may be used singly or in combination with features, characteristics, and/or elements described in connection with other embodiments unless otherwise specifically indicated. Therefore, it is to be understood that the foregoing is illustrative of various example embodiments and is not to be construed as limited to the specific embodiments disclosed herein, and that various modifications to the disclosed embodiments, as well as other example embodiments, are intended to be included within the spirit and scope of the present disclosure as defined in the appended claims, and their equivalents.

What is claimed is:

1. An electronic device comprising:
   a sensor layer; and
   a sensor driving circuit configured to drive the sensor layer, and selectively operate in a first mode for sensing a touch input and a second mode for sensing a pen input by a pen, the second mode comprising a charging drive mode and a pen sensing drive mode,
   wherein the sensor layer comprises:
      a plurality of first electrodes along a first direction;
      a plurality of second electrodes along a second direction crossing the first direction;
      a plurality of third electrodes along the first direction, and overlapping with the plurality of first electrodes;
      a loop trace line electrically connected to the plurality of third electrodes, and comprising a first line portion electrically connected to the plurality of third electrodes, a second line portion extending from a first end of the first line portion in the second direction, and a third line portion extending from a second end of the first line portion in the second direction; and
      a plurality of charging pads electrically connected to the second line portion, the plurality of third electrodes, and the third line portion,
   wherein, in the charging drive mode, the sensor driving circuit is configured to output a first signal to "X" first charging drive pads among the plurality of charging pads, output a second signal different from the first signal to "Y" second charging drive pads among the plurality of charging pads, and sequentially form a plurality of charging loops one by one on the sensor layer, where "X" and "Y" are integers greater than or equal to 1, wherein, in the charging drive mode, the sensor driving circuit is configured to not output a signal to "Z" gap pads between the "X" first charging drive pads and the "Y" second charging drive pads among the plurality of charging pads, where "Z" is an integer greater than or equal to 1, and wherein at least one of "X," "Y," or "Z" is a variable value.

2. The electronic device of claim 1, wherein the plurality of charging loops comprises a first charging loop, and a second charging loop shifted in the first direction with respect to the first charging loop, and wherein a number of the "Y" second charging drive pads of the second charging loop is greater than a number of the "Y" second charging drive pads of the first charging loop.

3. The electronic device of claim 2, wherein the number of the "Y" second charging drive pads of the first charging loop is one, and the "Y" second charging drive pads are electrically connected to the second line portion.

4. The electronic device of claim 2, wherein a number of the "Z" gap pads of the second charging loop is smaller than a number of the "Z" gap pads of the first charging loop.

5. The electronic device of claim 1, wherein the charging drive mode comprises a first drive mode, and a second drive mode having a higher sensitivity than that of the first drive mode, and wherein the plurality of charging loops comprises a first charging loop, and a second charging loop shifted in the first direction with respect to the first charging loop.

6. The electronic device of claim 5, wherein a number of the "X" first charging drive pads of the first charging loop in the second drive mode is greater than a number of the "X" first charging drive pads of the first charging loop in the first drive mode.

7. The electronic device of claim 5, wherein a number of the "X" first charging drive pads of the second charging loop in the second drive mode is greater than a number of the "X" first charging drive pads of the second charging loop in the first drive mode, and wherein a number of the "Y" second charging drive pads of the second charging loop in the second drive mode is greater than a number of the "Y" second charging drive pads of the second charging loop in the first drive mode.

8. The electronic device of claim 5, wherein a number of the "Z" gap pads of the first charging loop in the second drive mode is greater than a number of the "Z" gap pads of the first charging loop in the first drive mode, and wherein a number of the "Z" gap pads of the second charging loop in the second drive mode is greater than a number of the "Z" gap pads of the second charging loop in the first drive mode.

9. The electronic device of claim 5, wherein a number of the "Z" gap pads of the first charging loop in the second drive mode is smaller than a number of the "Z" gap pads of the first charging loop in the first drive mode, and wherein a number of the "Z" gap pads of the second charging loop in the second drive mode is smaller than a number of the "Z" gap pads of the second charging loop in the first drive mode.

10. The electronic device of claim 5, wherein the sensor driving circuit is configured to operate in the second drive mode when the pen is not sensed.

11. The electronic device of claim 5, wherein the sensor driving circuit is configured to operate in the second drive mode when the pen is located within a distance section on the sensor layer for a period of time.

12. The electronic device of claim 11, wherein the sensor driving circuit is configured to operate in the first drive mode when determined that the pen deviates from the distance section.

13. The electronic device of claim 11, wherein the charging drive mode further comprises a third drive mode having a higher sensitivity than that of the first drive mode and different from the second drive mode, and wherein the sensor driving circuit is configured to operate in the third drive mode when determined that the pen deviates from the distance section and becomes closer to the sensor layer than to the distance section.

14. An electronic device comprising:

a sensor layer; and a sensor driving circuit configured to drive the sensor layer, and selectively operate in a first mode for sensing a touch input and a second mode for sensing a pen input by a pen, the second mode comprising a charging drive mode and a pen sensing drive mode, wherein the sensor layer comprises:

a plurality of first electrodes;

a plurality of second electrodes crossing the plurality of first electrodes;

a plurality of third electrodes overlapping with the plurality of first electrodes;

a first loop trace line electrically connected to all of one ends of the plurality of third electrodes;

a plurality of second loop trace lines electrically connected to other ends of the plurality of third electrodes in a one-to-one correspondence; and a plurality of charging pads electrically connected to opposite ends of the first loop trace line and to the plurality of second loop trace lines in one-to-one correspondence, wherein, in the charging drive mode, the sensor driving circuit is configured to output a first signal to "X" first charging drive pads among the plurality of charging pads, output a second signal different from the first signal to "Y" second charging drive pads among the plurality of charging pads, and sequentially form a plurality of charging loops one by one on the sensor layer, where "X" and "Y" are integers greater than or equal to 1, wherein, in the charging drive mode, the sensor driving circuit is configured to not output a signal to "Z" gap pads between the "X" first charging drive pads and the "Y" second charging drive pads among the plurality of charging pads, where "Z" is an integer greater than or equal to 1, wherein the plurality of charging loops comprises a first charging loop, and a second charging loop different from the first charging loop, and wherein at least one of "X," "Y," or "Z" is a variable value.

15. The electronic device of claim 14, wherein a number of the "Y" second charging drive pads of the first charging loop is one, wherein a number of the "Y" second charging drive pads of the second charging loop is greater than the number of the "Y" second charging drive pads of the first charging loop, and wherein a number of the "Z" gap pads of the second charging loop is smaller than a number of the "Z" gap pads of the first charging loop.

16. The electronic device of claim 14, wherein the charging drive mode comprises a first drive mode, and a second drive mode having a higher sensitivity than that of the first drive mode, wherein a number of the "X" first charging drive pads of the first charging loop in the second drive mode is greater than a number of the "X" first charging drive pads of the first charging loop in the first drive mode, wherein a number of the "X" first charging drive pads of the second charging loop in the second drive mode is greater than a number of the "X" first charging drive pads of the second charging loop in the first drive mode, and wherein a number of the "Y" second charging drive pads of the second charging loop in the second drive mode is greater than a number of the "Y" second charging drive pads of the second charging loop in the first drive mode.

17. The electronic device of claim 16, wherein a number of the "Z" gap pads of the first charging loop in the second drive mode is greater than a number of the "Z" gap pads of the first charging loop in the first drive mode, and wherein a number of the "Z" gap pads of the second charging loop in the second drive mode is greater than a number of the "Z" gap pads of the second charging loop in the first drive mode.

18. The electronic device of claim 16, wherein a number of the "Z" gap pads of the first charging loop in the second drive mode is smaller than a number of the "Z" gap pads of the first charging loop in the first drive mode, and wherein a number of the "Z" gap pads of the second charging loop in the second drive mode is smaller than a number of the "Z" gap pads of the second charging loop in the first drive mode.

19. The electronic device of claim 16, wherein the sensor driving circuit is configured to operate in the second drive mode when the pen is located within a distance section on the sensor layer for a period of time.

20. The electronic device of claim 19, wherein the charging drive mode further comprises a third drive mode having a higher sensitivity than that of the first drive mode and different from the second drive mode, and wherein the sensor driving circuit is configured to operate in the third drive mode when determined that the pen deviates from the distance section and becomes closer to the sensor layer than to the distance section.

\* \* \* \* \*